US012417631B1

United States Patent
Peddle et al.

(10) Patent No.: US 12,417,631 B1
(45) Date of Patent: Sep. 16, 2025

(54) TECHNIQUES FOR ADAPTIVE FRAME-BASED CLIP MATCHING

(71) Applicant: DeweyVision Corp., Pleasanton, CA (US)

(72) Inventors: Aaron Malcolm Peddle, Pleasanton, CA (US); Majid Bemanian, Pleasanton, CA (US)

(73) Assignee: DeweyVision Corp., Pleasanton, CA (US)

( * ) Notice: Subject to any disclaimer, the term of this patent is extended or adjusted under 35 U.S.C. 154(b) by 892 days.

(21) Appl. No.: 17/480,770

(22) Filed: Sep. 21, 2021

Related U.S. Application Data

(60) Provisional application No. 63/081,318, filed on Sep. 21, 2020.

(51) Int. Cl.
  *G06V 20/40* (2022.01)
  *G06F 18/22* (2023.01)
(52) U.S. Cl.
  CPC .............. *G06V 20/48* (2022.01); *G06F 18/22* (2023.01); *G06V 20/46* (2022.01)
(58) Field of Classification Search
  None
  See application file for complete search history.

(56) References Cited

U.S. PATENT DOCUMENTS

| 9,747,521 | B2 | 8/2017 | Iakovenko et al. |
| 2022/0319718 | A1* | 10/2022 | Eichelberger .......... G16H 10/65 |

FOREIGN PATENT DOCUMENTS

EP   3570186 A1 *  11/2019  ............. G06F 16/41

OTHER PUBLICATIONS

Clay D. Spence, John C. Pearson, and Jim Bergen, "Coarse-to-Fine Image Search Using Neural Networks", National Information Display Laboratory, 1994 (Year: 1994).*

* cited by examiner

*Primary Examiner* — Chan S Park
*Assistant Examiner* — Elisa M Rice
(74) *Attorney, Agent, or Firm* — NovoTechIP International PLLC

(57) ABSTRACT

A data processing system for matching video content implements obtaining first video footage that includes a plurality of first video frames of a first video clip; obtaining second video footage that includes a plurality of second video frames; analyzing the first video footage and the second video footage to generate a plurality of first fingerprints representing each frame of the plurality of first video frames and a plurality of second fingerprints representing the second video frames; comparing the first fingerprints to the second fingerprints to identify one or more candidate clip matches for the first video clip in the second video footage; selecting a best match for the first video clip in the second video footage from the one or more candidate clip matches for the first video clip; and presenting the best match for the first video clip on a user interface.

18 Claims, 45 Drawing Sheets

TECHNIQUES FOR ADAPTIVE FRAME-BASED CLIP MATCHING

CROSS-REFERENCE TO RELATED APPLICATIONS

This application claims the benefit of priority from U.S. Provisional Patent Application Ser. No. 63/081,318, filed on Sep. 21, 2020, and entitled "Adaptive Frame-based Clip Match."

BACKGROUND

Television and movie production typically generate large quantities of digital footage. Cameras may capture footage as high-definition video content, such a 4K or 8K resolution. Furthermore, multiple cameras may be used to capture the footage, which further increases the amount of high-resolution content that must be stored and processed for a particular streaming, television, or movie production. To process this content, the high-resolution content is typically transcoded to create a lower-resolution version of the footage to be used for editing the footage, adding visual effects, and/or other processing. Working with the lower-resolution version of the footage reduces the computing and network resources required to edit the footage and to share the footage among the various parties that are working on the footage. However, the corresponding high-resolution footage is typically required to produce the final version of the television program or movie and matching the lower-resolution footage used during the editing process with the corresponding high-resolution footage can be a time consuming and difficult process. In many cases, decision lists may be supplied as part of the editorial process to assists with cuts, color grading information, and in some cases the process may require manually browsing through large quantities of high-resolution video content to identify the appropriate high-resolution clips of source content. The operator may struggle to identify appropriate clips from the source content, as many clips of the high-resolution content may include subtle differences that are difficult to identify with the human eye. Hence, there is a need for improved systems and methods that enable a technical solution for indexing, searching, and matching video clips independent of timecode and other metadata.

SUMMARY

An example data processing system according to the disclosure may include a processor and a machine-readable medium storing executable instructions. The instructions when executed, cause the processor to perform operations including obtaining first video footage that includes a plurality of first video frames of a first video clip; obtaining second video footage that includes a plurality of second video frames; analyzing the first video footage to generate a plurality of first fingerprints representing each frame of the plurality of first video frames; analyzing the second video footage to generate a plurality of second fingerprints representing each frame of the plurality of second video frames; comparing the first fingerprints to the second fingerprints generate similarity scores representing how similar each of the plurality of first video frames are to the plurality of second video frames; identifying one or more candidate clip matches for the first video clip based on the similarity scores; selecting a best match for the first video clip in the second video footage from the one or more candidate clip matches for the first video clip; and presenting the best match for the first video clip on a user interface of the data processing system.

An example method implemented in a data processing system for matching video content includes obtaining first video footage that includes a plurality of first video frames of a first video clip; obtaining second video footage that includes a plurality of second video frames; analyzing the first video footage to generate a plurality of first fingerprints representing each frame of the plurality of first video frames; analyzing the second video footage to generate a plurality of second fingerprints representing each frame of the plurality of second video frames; comparing the first fingerprints to the second fingerprints generate similarity scores representing how similar each of the plurality of first video frames are to the plurality of second video frames; identifying one or more candidate clip matches for the first video clip based on the similarity scores; selecting a best match for the first video clip in the second video footage from the one or more candidate clip matches for the first video clip; and presenting the best match for the first video clip on a user interface of the data processing system.

An example machine-readable medium according to the disclosure on which are stored instructions which when executed cause a processor of a programmable device to perform operations of obtaining first video footage that includes a plurality of first video frames of a first video clip; obtaining second video footage that includes a plurality of second video frames; analyzing the first video footage to generate a plurality of first fingerprints representing each frame of the plurality of first video frames; analyzing the second video footage to generate a plurality of second fingerprints representing each frame of the plurality of second video frames; comparing the first fingerprints to the second fingerprints generate similarity scores representing how similar each of the plurality of first video frames are to the plurality of second video frames; identifying one or more candidate clip matches for the first video clip based on the similarity scores; selecting a best match for the first video clip in the second video footage from the one or more candidate clip matches for the first video clip; and presenting the best match for the first video clip on a user interface of the data processing system.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1A:
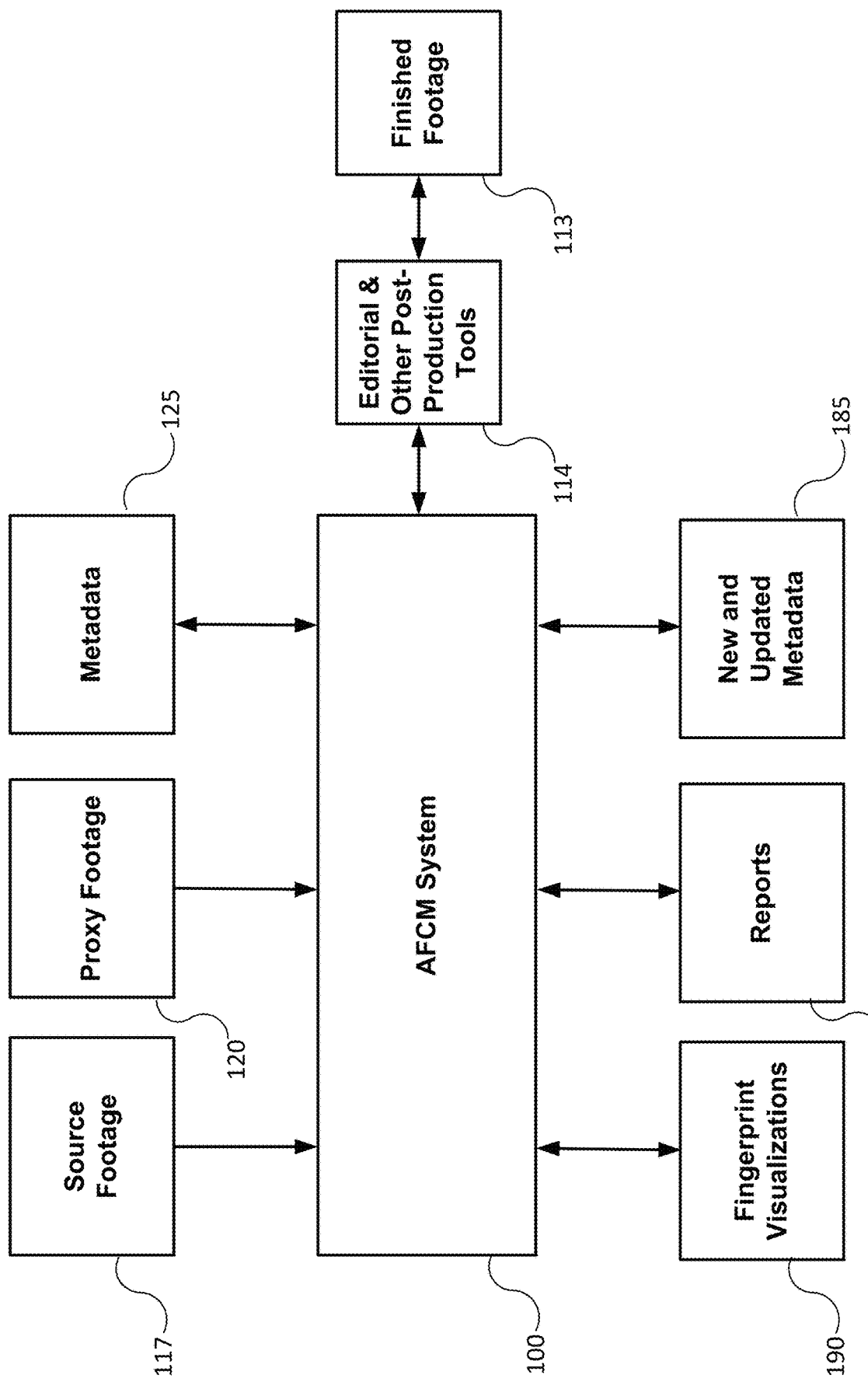
FIG. 1A is an example of an Adaptive Frame-based Clip Match (AFCM) system according to the disclosure.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Techniques are described herein for matching video content. The techniques provide a technical solution to the technical problem of accurately matching two versions of video footage. Extensive amounts of source footage may be captured for a video production. The source footage is typically high-resolution footage that includes many frames per second. The computing resources required to store and manipulate the source footage is significant even for short segments of video content. Consequently, members of the post-production team of a video production often work with lower-resolution proxy footage that serves as a stand-in for the high-resolution source footage but requires less computing resources to store, transmit, and manipulate than the high-resolution source footage. At some point during the post-production process, the original high-resolution source footage corresponding to the proxy footage must be located and edited to produce the final footage for the video production. However, locating the source footage may be a time consuming and error-prone process. Multiple takes of a shot may have been taken during production, and there may be only subtle differences between the takes. A human user may find it difficult to differentiate between these versions of the source footage, requiring the user to painstakingly examine the multiple copies of the footage to attempt to identify the correct source footage. Furthermore, the proxy footage may have been manipulated during various stages of the post-production process and it may no longer be obvious to a human user where the footage to create the proxy footage was obtained from the source footage. The matching techniques provided herein solve these and other technical problems by using fingerprinting techniques to generate a frame-level representations of the proxy footage and the source footage. The fingerprints of the source footage and the proxy footage may be compared to identify candidate clips in the source footage that match one or more clips of footage included in the proxy footage. A best-match clip of source content may be identified for each of the clips in the proxy footage. The matching process is automatic, and much faster and more accurate than current editing tools.

Another technical problem solved by the matching techniques provided herein is that the metadata associated with the proxy footage and/or the source footage may be missing, incomplete, or incorrect making it difficult to identify the correct source footage. This metadata may be used to help identify which source footage corresponds to proxy footage. The techniques provided herein may automatically identify and correct such errors in the metadata. These and other technical benefits of the techniques disclosed herein will be evident from the discussion of the example implementations that follow.

FIG. 1A is a diagram that shows an example of an Adaptive Frame-based Clip Match (AFCM) system 100 that may implement the techniques described herein. The AFCM system 100 may be used in television program, movie, or other video production. As will be discussed in greater detail with respect to FIG. 1B, the video production process typically includes multiple stages of production in which source footage 117 is edited to produce finished footage 113 for the production. The edits may include adding visual effects, credits, voice over, color correction, sound effects, and/or other edits that may be made to source footage 117. The source footage 117 is high-resolution footage that is captured by one or more cameras. The source footage 117 is typically not edited directly. Editing the source footage directly may require significant computing resources, storage resources, and network resources to transfer the source footage 117 among the various participants to the production process. To facilitate the editing process, lower-resolution proxy footage 120 may instead be derived from the source footage 117. The proxy footage 120 may be used in various stages of the post-production production process and later be exchanged for the corresponding high-resolution source footage 120 when the finished footage 113 is produced. The source footage 117 may be associated with metadata 125 that includes references to the locations in the source footage 120 for the specific footage. The proxy footage 120 may also be associated with metadata 125 that includes references to the content in the proxy footage 120 and references to the corresponding source footage 117.

The conventional approach to creating the final footage 113 is typically a semi-manual visual process that involves retrieving clips of source footage 117 based on the available metadata leveraging and not limited to industry editorial or color grading tools. However, this process may be slow and error prone, and existing tools may be very slow and cumbersome to use. The metadata for a particular clip of the proxy footage 120 may be missing or incorrect. However, the AFCM system 100 may be configured to analyze proxy footage 120 using the fingerprinting techniques provided herein to identify the source footage 117 associated with a particular clip of proxy footage 120 quickly and accurately. The AFCM system 100 may generate new and/or updated metadata 185 where the metadata is missing or incorrect. Furthermore, the AFCM system 100 may provide various reports, such as but not limited to reports detailing footage clips or shots included in the proxy footage 120 that could not be found in the source footage 117. The AFCM system 100 may also provide fingerprint visualizations 190 that present a visual representation of the complex fingerprint information generated for frames of proxy footage 120 and/or source footage 117 in a format that allows user to quickly understand the attributes of the frames of footage. The fingerprints are independent both of resolution of the image and of the encoding scheme of the image frame.

The AFCM system 100 may provide a set of editorial tools for performing various types of edits on footage and/or may be integrated with third-party products as plug-ins or libraries. In some implementations, the AFCM system 100 may provide a set of APIs that enable the third-party editorial tools to access the functionality provided by the AFCM system 100. In some implementations, the AFCM system 100 may include web-based or cloud-based components that may be accessed by a third-party tool to provide the fingerprinting and matching functionality described herein. Additional details of these and other features of the AFCM system 100 are provided in the examples which follow.

Figure 1B:
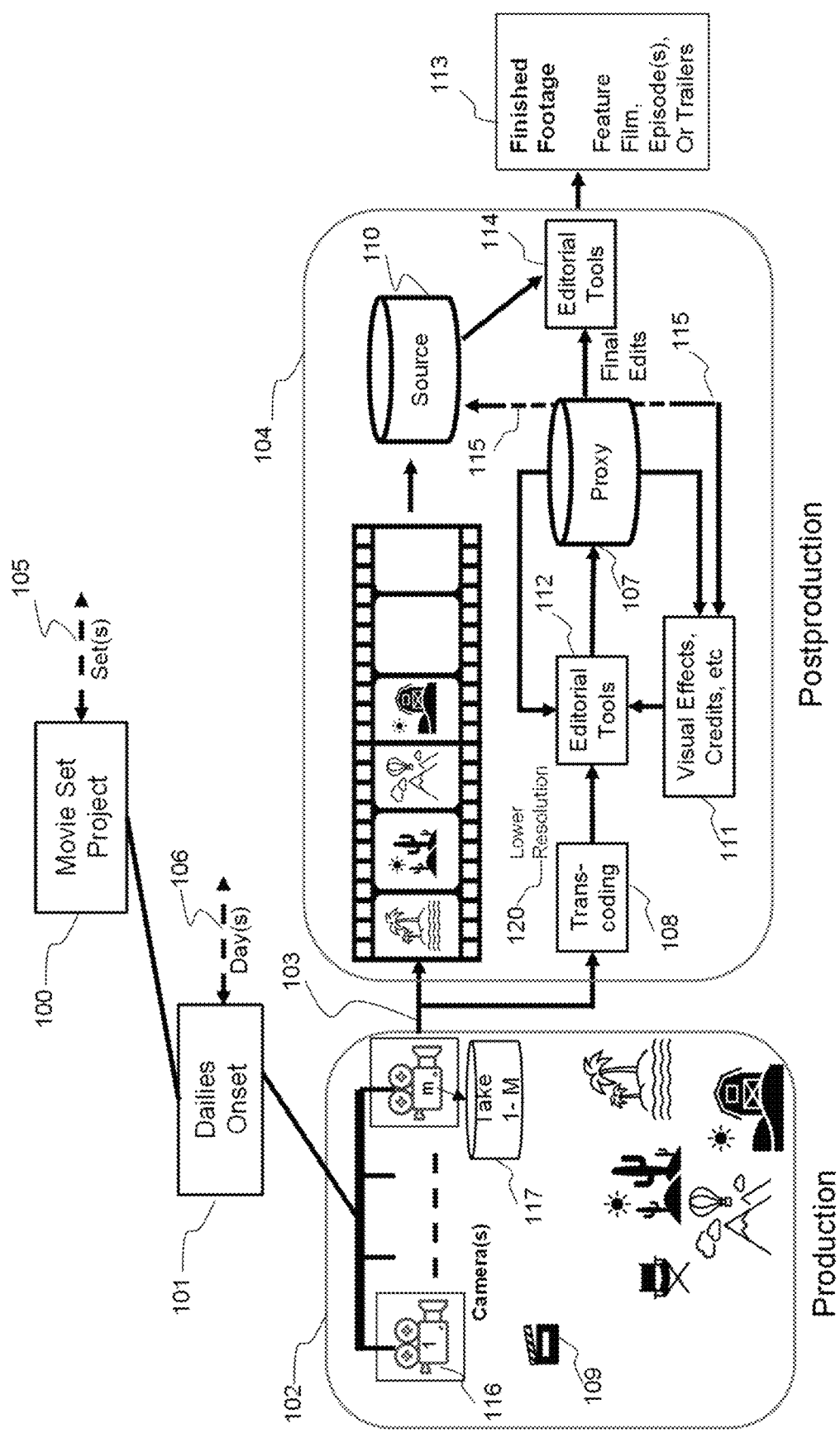
FIG. 1B is a diagram showing an example production process and workflow for a video production that may use the AFCM system shown in FIG. 1A.

FIG. 1B is a diagram showing the post-production workflow in which video footage may be captured and processed for a television program, movie or feature film, or other video production in which the AFCM system 100 shown in FIG. 1A may be used. Activities during the production phase 102 of the workflow may be performed on the set or sets associated with the video production, while activities during the post-production phase 104 may be performed at one or more post-production locations.

A "film shot" or "shot" as used herein refers to a series of frames captured by a camera that runs uninterrupted for a period of time. A "take" as used herein refers to a run of a camera recording a single shot. During filming in the production phase 102, multiple takes 109 are often captured of a single shot, and multiple cameras 116 may capture each take. The high-resolution source footage 117 captured including the multiple takes captured by the cameras 116 may be sent to one or more post-production facilities during the post-production phase 104. Final footage 113 for the video production may be created by taking clips from this high-resolution footage, editing the clips, and combining the clips into the final footage 113. The high-resolution source footage 117 may be stored in the source footage datastore 110. The high-resolution source footage 117 may also be provided to the transcoding unit 108 to generate the proxy footage 120. The lower-resolution proxy footage 120 may be used for faster processing of the footage and more efficient transport of the footage among the various entities that are responsible for performing various tasks to create the finished footage 113 for the television program, movie, or other video production. The proxy footage 120 may include a subset of the source footage 117 stored in the source footage datastore 110 and may be used during the post-production phase 104 of development along with timing information and metadata information that links the proxy footage 120 with the source footage 117 stored in the source footage datastore 110.

Additional content 111 may be created during the post-production phase 104. The additional content 111 may include but is not limited to visual effects (VFX), credits, and other digital content to be inserted into the video production. The additional content 111 may initially be created using the proxy footage 120 to reduce the computational requirements for manipulating the footage, and the low-resolution versions of the additional content 111 may be added to the proxy footage 120 stored in the proxy footage datastore 107. In other implementations, the high-resolution source footage 117 may need to be obtained to perform certain types of edits. For example, the VFX may initially be designed and/or produced using clips from the proxy footage 120 but the corresponding clips of high-resolution source footage 117 may need to be obtained to integrate the VFX into finished footage or footage that may be further edited by other participants in the post-production phase 104 to create the finished footage 113.

Some stages of production phase 102 occur in a sequential manner, such as the filming on set 105 and the production of onset dailies 101 at the end of each day of production 106. The onset dailies 101 may be raw and unedited footage captured during a day of shooting of the content for the video production. The onset dailies 101 may be viewed by the director, cinematographer, editor, and/or other members of the production crew to review the content that was captured for the day, to identify technical problems in the captured content, to evaluate the performance of actors in the scenes captured, and to determine whether the scenes were captured by a sufficient number of camera angles. In contrast, many of the stages of post-production phase 104 may be performed at least in part substantially in parallel. However, there may still be some sequential steps in the post-production workflow where delays in the completion of certain tasks may delay the completion of other tasks which may ultimately delay the creation of the finished footage 113. Domain experts in one stage of post-production may provide their work product to domain experts in the next stage of the post-production phase 104. Delays in these steps may result in expedited efforts to maintain the post-production and release schedule for the finished footage 113. However, these expedited efforts may result in increased post-production costs and provide opportunities to introduce errors which may negatively impact the quality of the finished footage 113.

Errors during the post-production phase 104 may result in the misalignments between the timing information of the proxy footage 120 and the high-resolution source footage 117 may occur during various phases of the post-production phase 104. These misalignments may introduce errors in the finished footage 113 that may result in expenses and delays and corrections to finished footage 113. Such misalignments may occur in various stages of the post-production phase 104, such as but not limited to editing the film to combine shots into sequences of finished footage 113, color correction to adjust the color, contrast, and exposure of the footage, visual effect (VFX) production, sound editing, score editing, subtitling, ad-placement, and other phases of production. Many stages of the post-production workflow deliver additional audio/video/visual effects (A/V/VFX) content to be inserted into existing footage, to modify existing footage, and/or references existing footage. A robust end-to-end tracking and management system would be required to track all the references to the high-resolution source footage 117 included in the added and/or modified proxy footage 120. However, each of the stages of the post-production workflow may utilize different equipment and associated software platforms, which may result in discontinuity errors and may introduce additional complexity in tracking all the references to the high-resolution source footage 117 included in the added and/or modified proxy footage 120. As a result, human intervention is typically required to complete the turnover or handover from one phase to another. Such costly human involvement and other quality control checks can introduce delays and other additional errors and cost. Furthermore, many phases of post-production processes depend on content that has been processed. Thus, delays in one phase of the post-production phase 104 may compound the delays in producing the final footage 113 for a video production.

Figure 2:
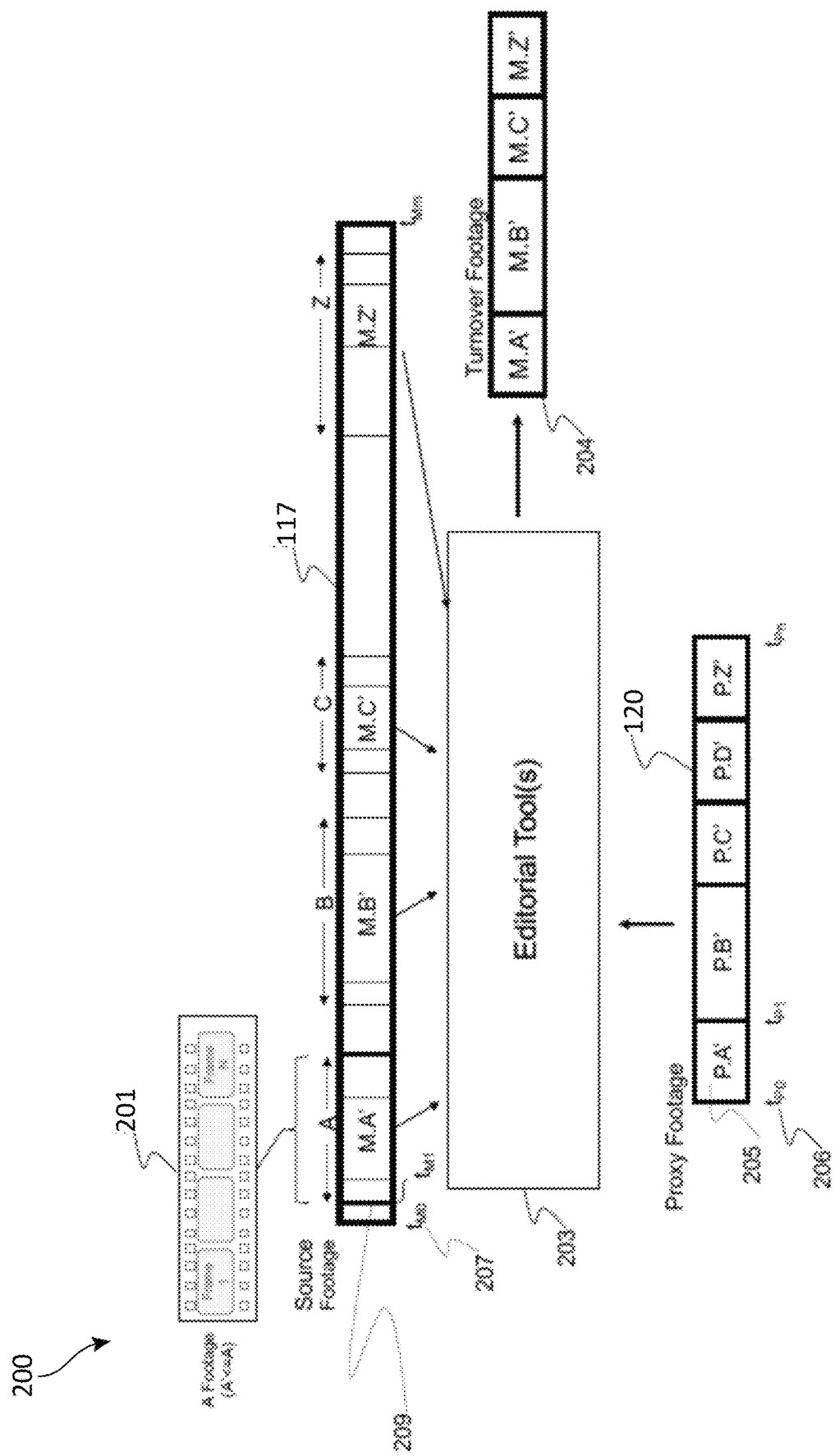
FIG. 2 is a diagram showing an example showing correlation of source footage and proxy footage to generate turnover footage for a final release of the video production.

FIG. 2 is a diagram showing a process in which source footage 117 and the proxy footage 120 derived from the source footage 117 are correlated and matched during the post-production workflow to obtain turnover footage 204. The turnover footage 204 includes high-resolution footage from the source footage 117 and may be integrated into the final footage 113 or may be further processed before being integrated into the final footage 113. For example, the turnover footage 204 may be used by a VFX team to add VFX to the high-resolution content to high-resolution content from the source footage 117. The producer, director or creative editorial team members may initially work with content from the lower-resolution proxy footage 120 to reduce the computing resources required to process the higher-resolution source footage 117. The turnover footage 204 may then be passed on to another participant in the post-production workflow to further edit the footage or may be utilized for generating the final footage 113 of the video production. The process 200 may be implemented in one or more editorial tools 203, such as the editorial tools 112 and 114 shown in FIG. 1B. The AFCM system 100 may provide a set of editorial tools for performing various types of edits on footage and/or may be integrated into third-party products as plug-ins or libraries. The AFCM system 100 may provide a set of APIs that permit the third-party products to access the functionality provided by the AFCM system 100. In some implementations, the AFCM system 100 may include web-based or cloud-based components that may be accessed by a third-party tool to provide the fingerprinting and matching functionality described herein.

The correlation is performed on a portion of the source footage 117 in this example implementation which spans time $t_{Mo}$ to time $t_{Mm}$. The source footage 117 includes a plurality of frames of video content. The source footage 117 includes multiple scenes, including scenes A, B, C, and Z. Scene A is located a time $t_{M1}$ 209 in the section 201 of the source footage 117, where the start of the section the source footage is denoted at $t_{M0}$ 207. The section 201 of the source footage represents the frames of the scene A in this example.

The example shown in FIG. 2 highlights four scenes, but the source footage 117 in other implementations may include a different number of scenes. In this example, the high-resolution versions of the clips may be requested so that they may have VFX added and/or or other processing performed on the clips. The current approach to identifying these clips requires a user to manually browse through the source footage 117 to identify the locations of the desired clips. The user may use timecode information included in the metadata associated with the proxy footage 120 to try to find the clip in the source footage 117. But this approach is time consuming and error prone. Any modifications that were made to the proxy footage using the editor tools 112 or 114 may result in the timecode references associated with the proxy footage no longer matching the correct timecodes in the source footage 117. However, the fingerprinting techniques provided herein provide a means for identifying the locations of the clips within the source footage 117 as will be discussed in greater detail in the examples which follow.

The techniques provided herein may provide 1:1 matching of a clip from the proxy footage 120 with a corresponding clip of the source footage 117. The locations of the clips within the source footage 117 may be represented in the metadata associated with the source footage 117 as frame numbers (also referred to herein as time codes"), which represent the location of the clips within their respective scenes. The clip P.A represented in the proxy footage 120 corresponds to a clip M.A within the scene A of the source footage 117. The clip may include all or subset of the scene A. The clip P.A is found at time $t_{P_0}$ 206 of the proxy footage. The clip P.B represented in the proxy footage 120 corresponds to a clip M.B within the scene B of the source footage 117. The clip may include all or subset of the scene B. The clip P.C represented in the proxy footage 120 corresponds to a clip M.C within the scene C of the source footage 117. The clip may include all or subset of the scene C. The clip P.D represented in the proxy footage 120 does not have a corresponding clip M.D within the source footage 117 in this example. The clip P.Z represented in the proxy footage 120 corresponds to a clip M.Z within the scene Z of the source footage 117. The clip may include all or subset of the scene Z. The source footage 117 may be associated with metadata, and the location of each of the scenes within the source footage 117 may be indicated using timecodes that represent the frames of the source footage 117 that make up each scene. The turnover footage 204 includes the high-resolution content from the source footage 117 that corresponds to the selected clips.

The selected clips represented by P.A, P.B, P.C, P.D, and P.Z in this example may be selected by a user. The corresponding clips M.A, M.B, M.C, and M.Z in the source footage 117 are being sought to be included in the turnover footage 205. The clips M.A, M.B, M.C, and M.Z included in the turnover footage 204 may be further processed in the post-production phase 104 or may be used as is in the final footage. The user may select the clips P.A, P.B, P.C, P.D, and P.Z using one of the editing tools 112 or 114 by reviewing the proxy footage 120 to identify the desired clips. The AFCM system 100 may generate a fingerprint or fingerprints for each of the desired clips of the proxy footage 120 and the fingerprints generated from the proxy footage 120 may be compared to fingerprints generated from the source footage 117 by the AFCM system 100. If a match is found for a desired clip, the high-resolution footage may be extracted from the source footage 117 and the included in the turnover footage 204. If the desired clip is not found, such as clip M.D in the example of FIG. 2, the clip's source may not have been included and may need to be found elsewhere. Furthermore, in some instances, the proxy footage 120 associated with the clip may have been modified by VFX or other processing which caused the fingerprint or fingerprints of the desired clip to no longer match the fingerprint of the corresponding clip in the source footage 117. The AFCM system 100 may identify any clips could not be found in a report of the reports 195 generated by the AFCM system 100. The unmatched clips, such as clip M.D, may need to be manually located in the source footage. The unmatched clips may be missing or mislabeled in the metadata associated with the source footage 117.

Figure 3:
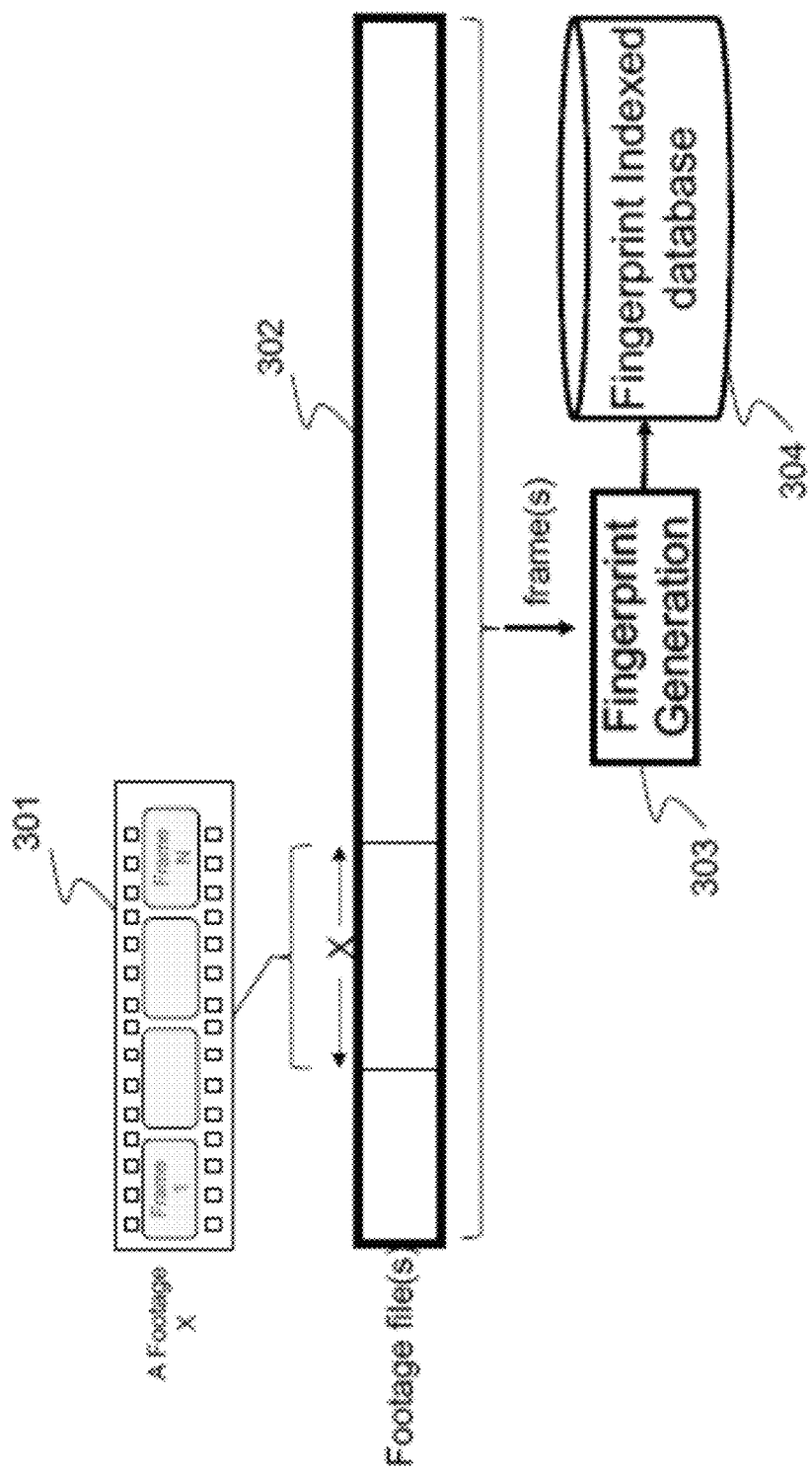
FIG. 3 is a diagram showing an example of an AFCM fingerprint generation process.

FIG. 3 is diagram that shows one example of a high-level AFCM fingerprint computation process that may be implemented by the AFCM system 100. The process shown in FIG. 3 may be performed on high-resolution footage files 302, which may be obtained from the high-resolution source footage 117 stored in the source footage datastore 110. The fingerprinting process may be performed as the footage files 302 are stored in the source footage datastore 110, may be performed on demand as a search is conducted for high-resolution footage 117 stored in the source footage datastore 110, or may be scheduled to be performed periodically for high-resolution source footage 117 that has been added to the source footage datastore 110. In the example shown in FIG. 3, the footage files 302 comprise N frames of footage, where in Nis an integer greater than 1. The footage files 302 may include one or more files of footage. Each footage file of the footage files 302 includes X frames of the high-resolution footage 117, where X is an integer greater than 0. Each frame of the footage files 302 may be processed by the fingerprint generation unit 303 and the fingerprint information associated with the frames of footage may be stored in a fingerprint indexed datastore 304. The process used by the fingerprint generation unit 303 for generating the fingerprints is described in detail in the examples which follow. Furthermore, the fingerprint indexed datastore 304 is also described in detail in the examples which follow. The fingerprint indexed datastore 304 is configured to facilitate searching for frames of footage that have a fingerprint that matches that of a candidate frame of proxy footage. In some implementations, the fingerprint indexed datastore 304 may be stored in the source footage datastore 110. In other implementations, the fingerprint indexed datastore 304 may be a separate datastore.

Figure 4:
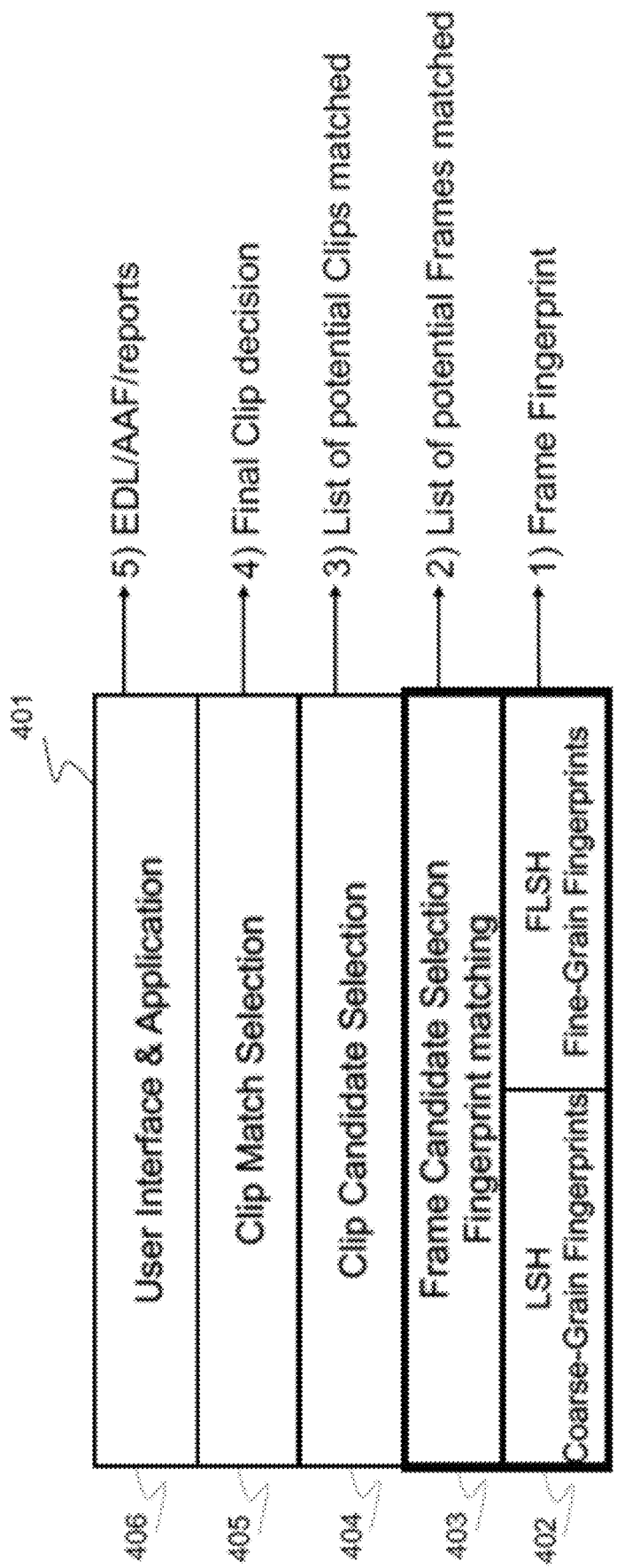
FIG. 4 is a diagram showing an example of the operations associated with generating a fingerprint of a frame of footage, matching the fingerprint to clips of source footage, and generating metadata and/or reports.

FIG. 4 is a diagram that shows an example stack of processes that may be used by the fingerprinting techniques of the AFCM system 100 to match a candidate clip from the proxy footage 120 with a corresponding clip in the high-resolution source footage 117. The matching is done by generating one or more fingerprints for the candidate clip and matching the one or more fingerprints to the fingerprints of the high-resolution source footage 117. As discussed with respect to FIG. 3, the source footage 117 stored in the source footage datastore 110 may be analyzed by the fingerprint generation unit 303 and stored in the fingerprint indexed datastore 304.

In the frame fingerprint operation 402, each frame of digital content is processed to generate a fingerprint the frame. The fingerprint of the frame may be used to search for frames in the source footage datastore 110. The fingerprint may include a coarse-grain fingerprint component and a fine-grain fingerprint component. The details of how the fingerprint is calculated are described in greater detail in the examples which follow.

In the frame candidate selection operation 403, a list of frames of the source footage 117 of the source footage datastore 110 may be determined by comparing the coarse-grain and fine-grain fingerprints with the fingerprint information stored in the fingerprint indexed datastore 304. Potential matches to the reference frame of the proxy footage 120 are provided. The system may automatically select a best match or may present the candidates to a user via user interface configured to present the candidate frames and the user may provide an input selecting a candidate frame.

In the clip candidate selection operation 404, the frame candidates selected in operation 403 are used to generate clip candidates that may match the candidate clip from the proxy footage 120. In the clip match selection operation 405, a best match for the candidate clip may be selected from among the clip candidates if multiple clip candidates are found.

In the user interface and application stage 406, the results of the matching may be presented to the user via a user interface of the system. The system may also generate an edit decision list (EDL) file used in post-production of film and video editing, an advanced authoring format (AAF) file used to exchange digital media and metadata between platforms, and/or other file formats. The system may also generate one or more reports. For example, the system may generate a report for reference frames of the proxy footage 120 for which a match could not be found.

Figure 5:
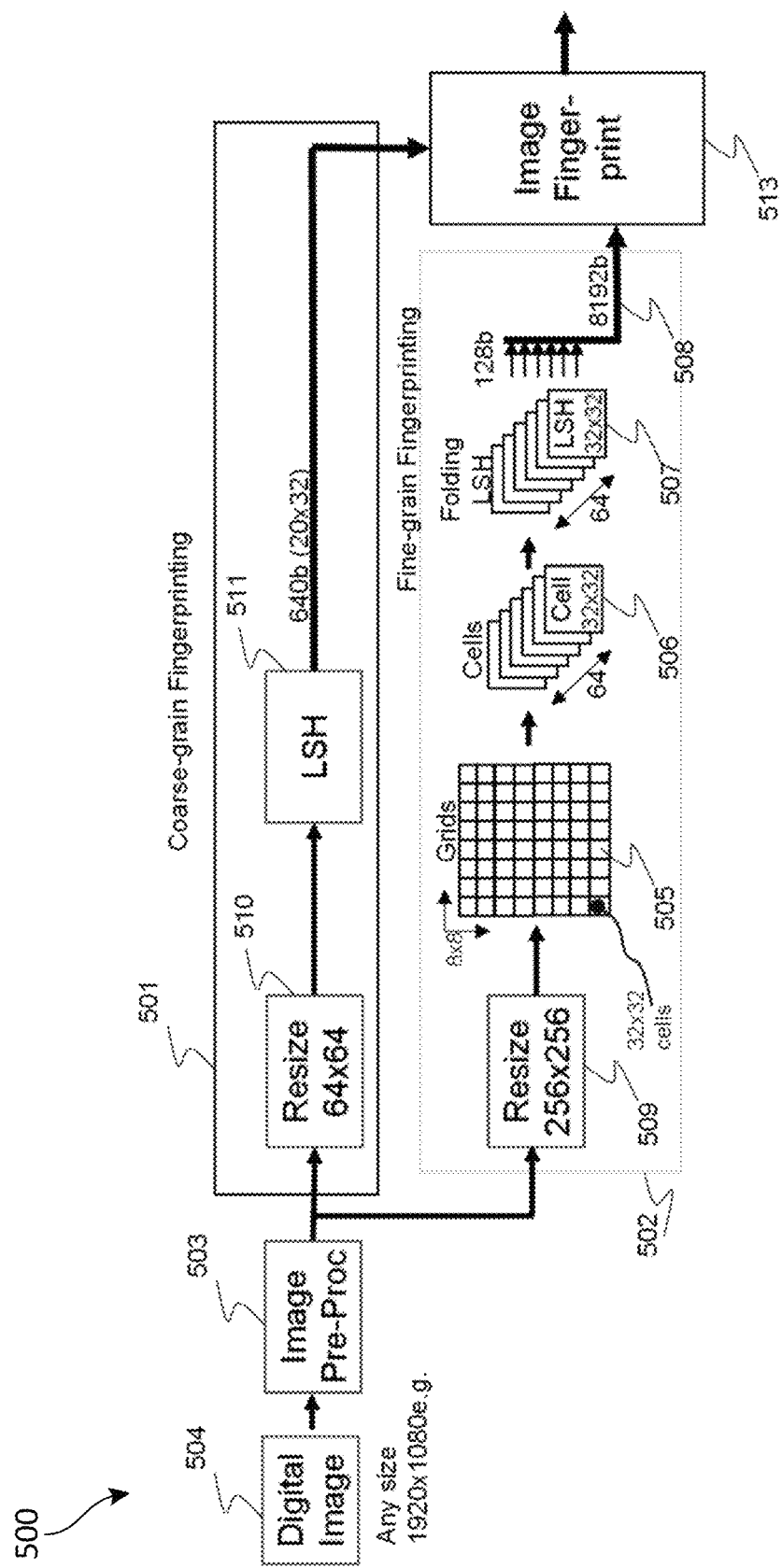
FIG. 5 is a diagram showing an example process for calculating a fingerprint for a digital image including a coarse-grain and fine-grain elements.

FIG. 5 is a diagram showing an example process 500 for generating the fingerprint from a frame of video content. The frame of the video content may be a digital image 504 of any size. The aspect ratio and size of the frame may depend upon the format of the video content from which the frame of video content has been extracted. The process may be generated by a fingerprint generation unit of the AFCM system 100.

The fingerprint process may include an image preprocessing operation 503. The image preprocessing operation 503 may perform various operations on the digital image 504, such as but not limited to converting the image 503 to a grayscale image. The fingerprint generation unit may generate a grayscale image from a color image by converting color values in the image to luminance values. The pre-processing operation 503 may convert a color image to grayscale to reduce errors that may have been introduced by color compression or color correction that have been applied during editing. The pre-processing operation 503 may include applying a Gaussian blur to the digital image 504 to reduce compression errors. The pre-processing operation 503 may include a cropping operation for selecting a portion of the digital image 504 that should be consistent across different aspect ratios. The pre-processing operation 503 may include converting from pixels to a grid of histograms of oriented gradients to decrease sensitivity to minor zooms, translations, and/or color grading changes made during editing. The pre-processing operation 503 may apply one or more of these operations to the digital image 504 and/or other such operations to prepare the image for analysis by the coarse-grain fingerprinting pipeline 501 and the fine-grain fingerprinting pipeline 502. The pre-processed image may then be provided to a coarse-grain fingerprinting pipeline 501 and a fine-grain fingerprinting pipeline 502.

The coarse-grain fingerprinting pipeline may be configured to generate a coarse-grain fingerprint for the image 504. The coarse-grain fingerprinting pipeline 501 may include a resizing operation 510 in which the preprocessed image may be resized to a first smaller standard size. In the example shown in FIG. 5, the resizing operation 510 resizes the preprocessed image to 64×64 W pixels. However, other implementations may resize the preprocessed image to a different standard size that is equal to or smaller than the pre-processed image generated by the pre-processing operation 503. The term "W" refers to the quantized size of each image pixel in bits (the quantization need not be linear). Each pixel may be represented by one or more bits. For example, each pixel may be represented by 4 bits in some implementations and by 64 or more bits in other implementations. The resized image may be flattened into a vector of 4096 dimensions.

The coarse-grain fingerprinting pipeline 501 may include a locality-sensitive hashing (LSH) operation 511 in which a hash of the resized image or the flattened vector representing the resized image may be created. The LSH operation similarly reduces the dimensionality of high-dimensional input data to a lower-dimensional version while preserving relative distances between items. The hash provides a lower-dimensional representation of the resized image (also referred to herein as a "coarse-grain fingerprint") that may be provided as an input to the folding matching operation 513. In some implementations, a random projections LSH operation may be used, while other LSH techniques may be used in other implementations.

The fine-grain fingerprinting pipeline 502 may be configured to generate a fine-grain fingerprint for the image 504. The fine-grain fingerprinting pipeline 502 may include a resizing operation 509 in which the preprocessed image may be resized to a second smaller standard size larger than the first standard size used by the coarse-grain fingerprinting pipeline 501. In the example shown in FIG. 5, the resizing operation 509 resizes the preprocessed image to 256×256 W pixels. The term "W" refers to the quantized size of each image pixel in bits, and each pixel may be represented by one or more bits. However, other implementations may resize the preprocessed image to a different standard size that is smaller than the pre-processed image generated by the pre-processing operation 503 but larger than the first standard size used by the coarse-grain fingerprinting pipeline 501. Furthermore, different quantization sizes may be used in different implementations.

The fine-grain fingerprinting pipeline 502 may include a grid division operation 505 in which the resized image from the resizing operation 509 may be divided into a set of smaller sized cells. In the implementation shown in FIG. 5, the resized image is divided into an 8×8 grid of 32×32 W sized cells 506 for a total of 64 cells. Other implementations may be subdivided into a different number of cells of a different size than that shown in the example of FIG. 5. The size and number of cells may depend, at least in part, on the size of the resized image produced by the resizing operation 505.

Figure 9:
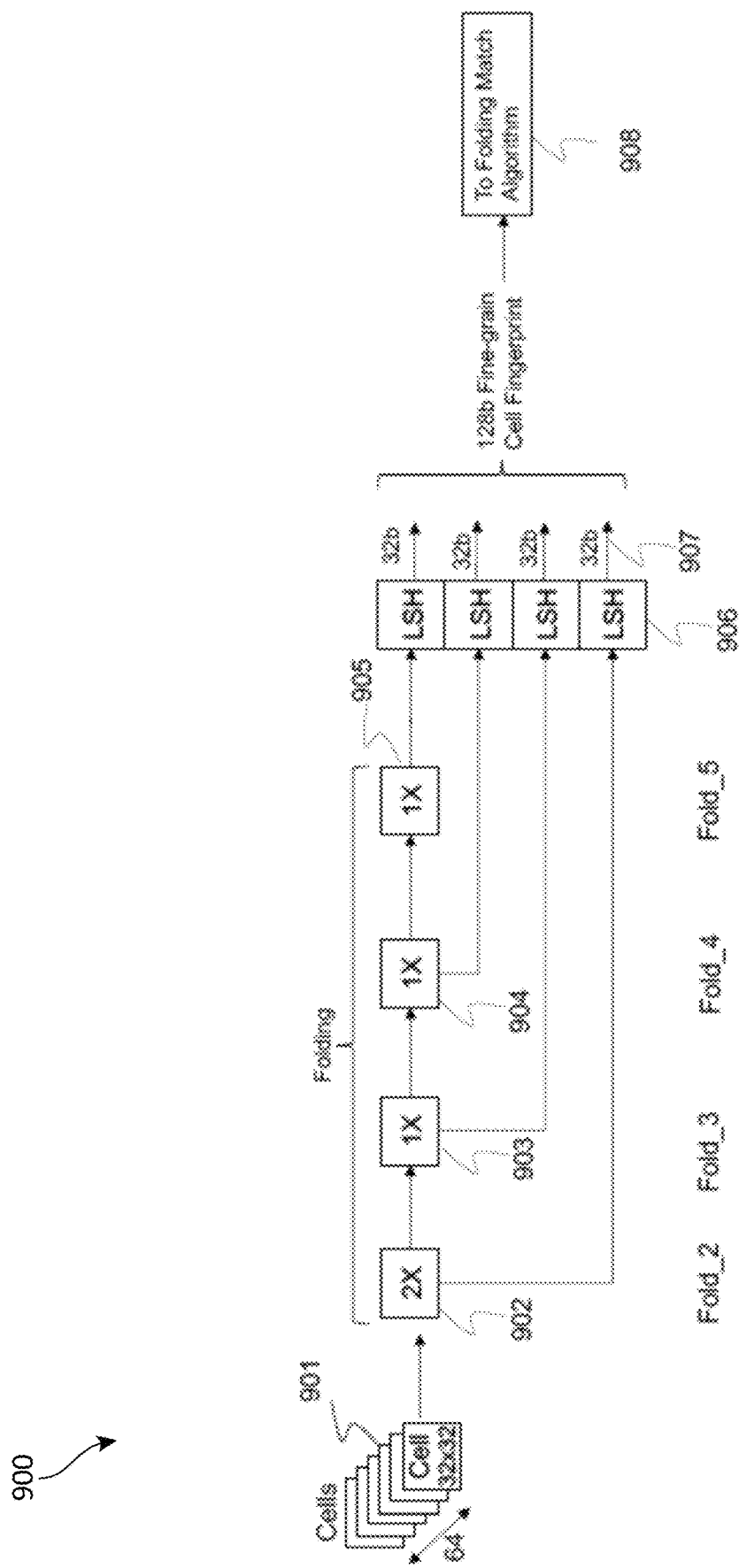
FIG. 9 is a diagram showing an example of a folding process that may be used to generate the fine-grain element of the fingerprint.

The fine-grain fingerprinting pipeline 502 may include a folding LSH operation 507 in which the cells 506 may be analyzed and converted into a bit string 508. Additional details of the folding LSH operation are shown in FIG. 9 which is described in detail the examples which follow. In this example, each of the 64 cells 506 cells may be analyzed to generate a 128-bit string, and these strings may be combined to generate an 8192-bit string. The bit string 508 represents the fine-grain fingerprint. The fine-grain fingerprint may be appended or otherwise combined with the coarse-grain fingerprint to create the fingerprint 513 for the image 504.

Figure 6:
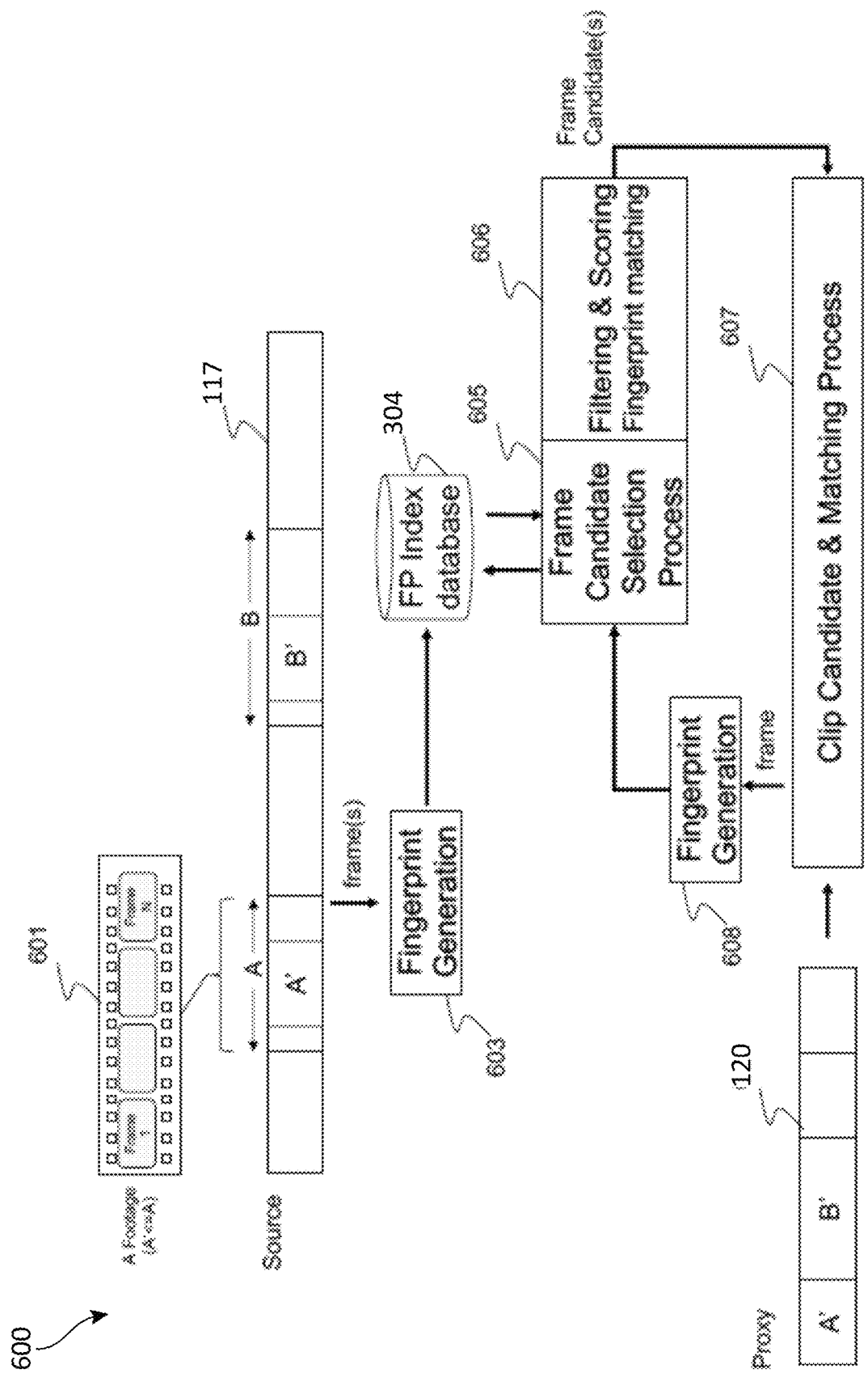
FIG. 6 is a diagram showing an example process for selecting candidate frames from source footage and matching clips of the source footage based on the candidate frames.

FIG. 6 is a diagram of an example clip-matching process 600. The clip-matching process may be implemented by the AFCM system 100. The clip-matching process may use the fingerprint information generated using the process shown in FIG. 5. In this example, the proxy footage 120 includes two clips A' and B' for which the corresponding clips from scenes A and B in the high-resolution footage source footage 117 are desired. The clip-matching process attempts to find these two clips in the source footage 117 by matching the fingerprints of the desired claims with the fingerprints stored in the fingerprint indexed datastore 304. The proxy footage 120 may be the proxy footage 120 of the preceding examples. The section 601 of the source footage 117 represents the frames of the scene A in this example. The clip A' may include all or a subset of the frames of the scene A.

The fingerprint generation operation 603 may generate the fingerprints of frames of the source footage 117 that includes the clips of interest. The fingerprinting operation 603 may use the process shown in FIG. 5 to generate the fingerprints for the source footage 117 and store the fingerprint information in the fingerprint indexed datastore 304. As discussed in the preceding examples, the fingerprint information for the source footage 117 may be generated on demand when a particular clip or clips of the source footage 117 are to be retrieved. In other implementations, the fingerprint information for the source footage 117 may be generated in advance and stored in the fingerprint indexed datastore 304. In implementations where the fingerprints of the source footage 117 are generated on demand, the proxy footage 120 may include reference information that identifies the source footage 117 associated with the desired clips from the proxy footage 120. As discussed in the preceding examples, these references may be timecodes that reference a specific location with the source footage 117. The references may also include additional information, such as a storage location and/or filename or filenames of the source footage 117 from which the proxy footage 120 was derived.

Figure 10:
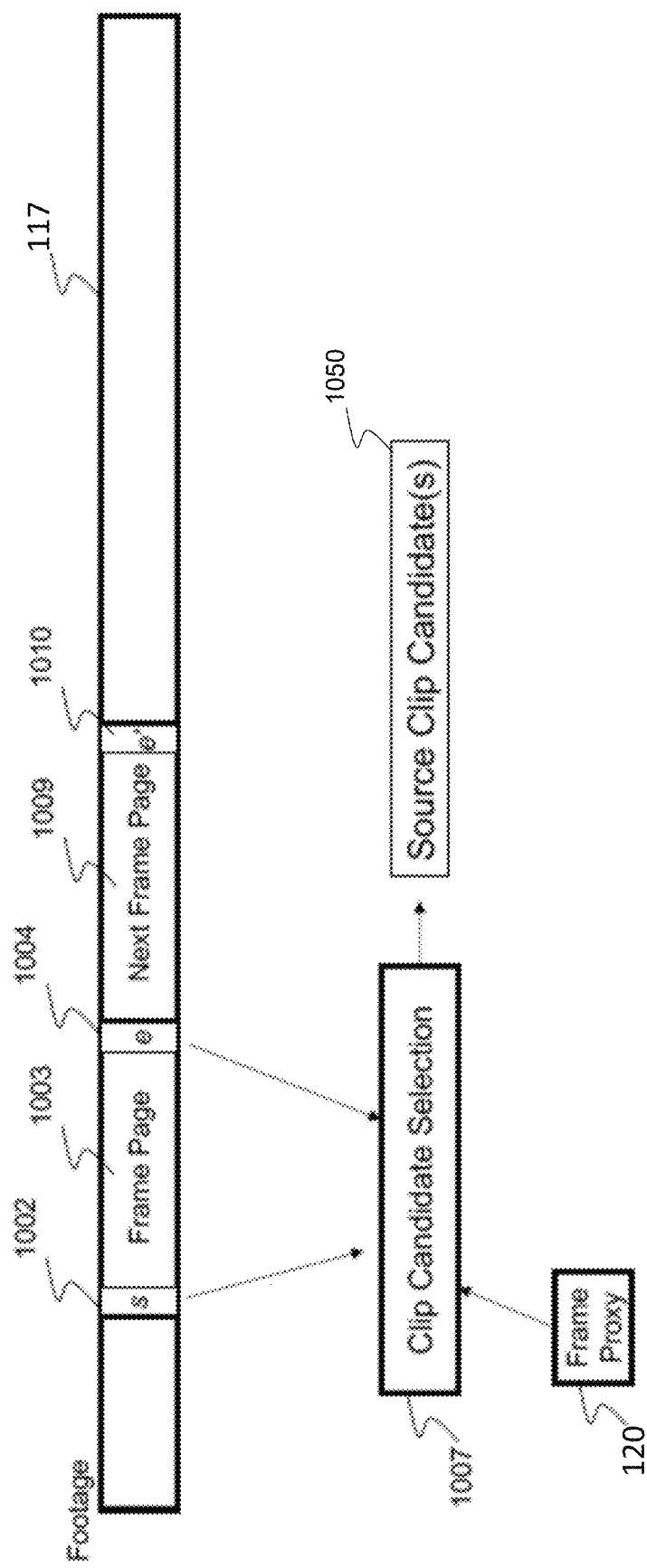
FIG. 10 is a diagram showing an example clip candidate selection process.
Figure 11:
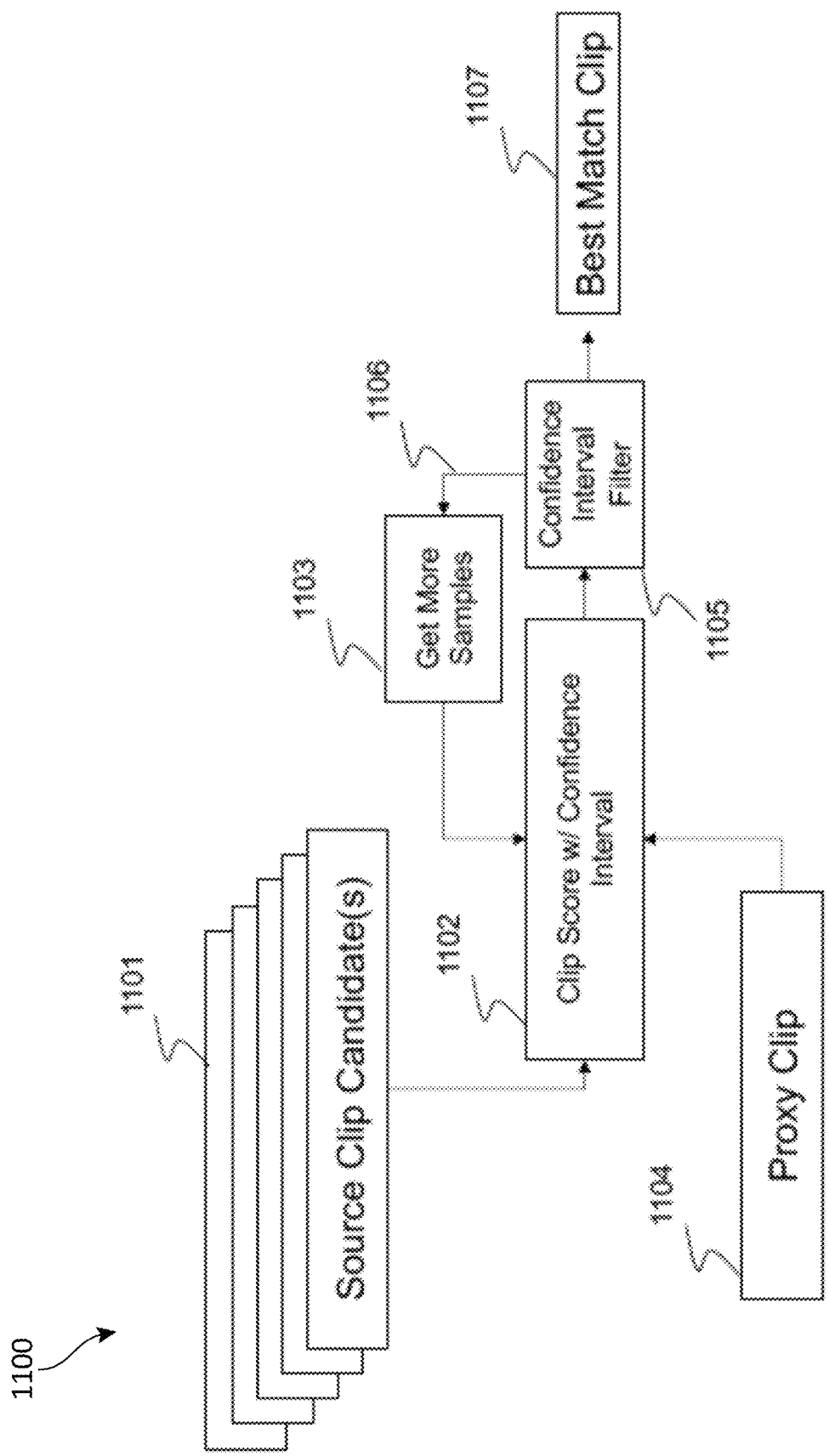
FIG. 11 is a diagram showing an example clip matching process.
Figure 14:
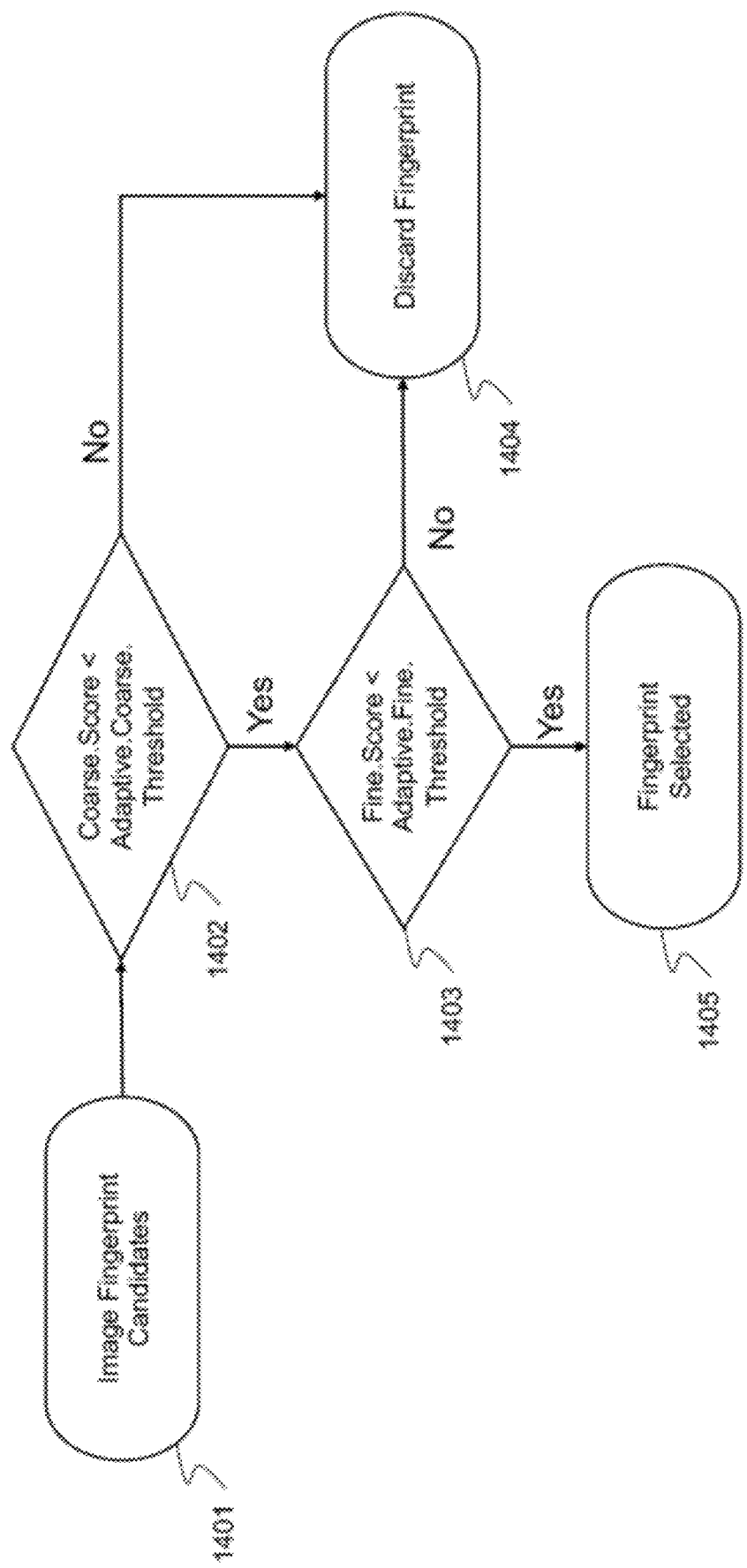
FIG. 14 is a diagram showing an example fingerprint selection process.

The clip candidate and matching operation 607 includes identifying candidate clips from the source footage 117 and selecting a best match from the candidate clips. The clip candidate and matching operation 607 may include a fingerprint generation operation 608 in which the fingerprint or fingerprints for the clips in the proxy footage 120 using the fingerprinting process shown in FIG. 5. The frame candidate selection process 605 uses the fingerprint or fingerprints to identify candidate frames in the fingerprint indexed datastore 304. In some implementations, the frame candidate selection process 605 may include splitting the coarse-grained fingerprint generated by the coarse-grain fingerprinting pipeline 501. The frame candidate selection process 605 may split the coarse-grained fingerprint into N partitions, where N is an integer value greater than 1. The frame candidate selection process 605 may then query the fingerprint indexed datastore 304 to identify frames that contain any of the N partitions. These frames may then be filtered and scored by the filtering and scoring fingerprint matching process 606. Additional details of the filtering and scoring fingerprint matching process 606 are shown in FIG. 14, which is described in detail in the examples which follow. The frame candidates are then provided to the clip candidate and matching process 607 to select clip candidates and to determine a clip that best matches the clip from the proxy footage 120. FIG. 10 provides an example implementation of a clip candidate selection process, and FIG. 11 provides an example implementation of a clip matching process. The examples shown in FIGS. 10 and 11 are discussed in detail below. This process shown in FIG. 6 may be repeated for each of the clips in the proxy footage 120.

Figure 7:
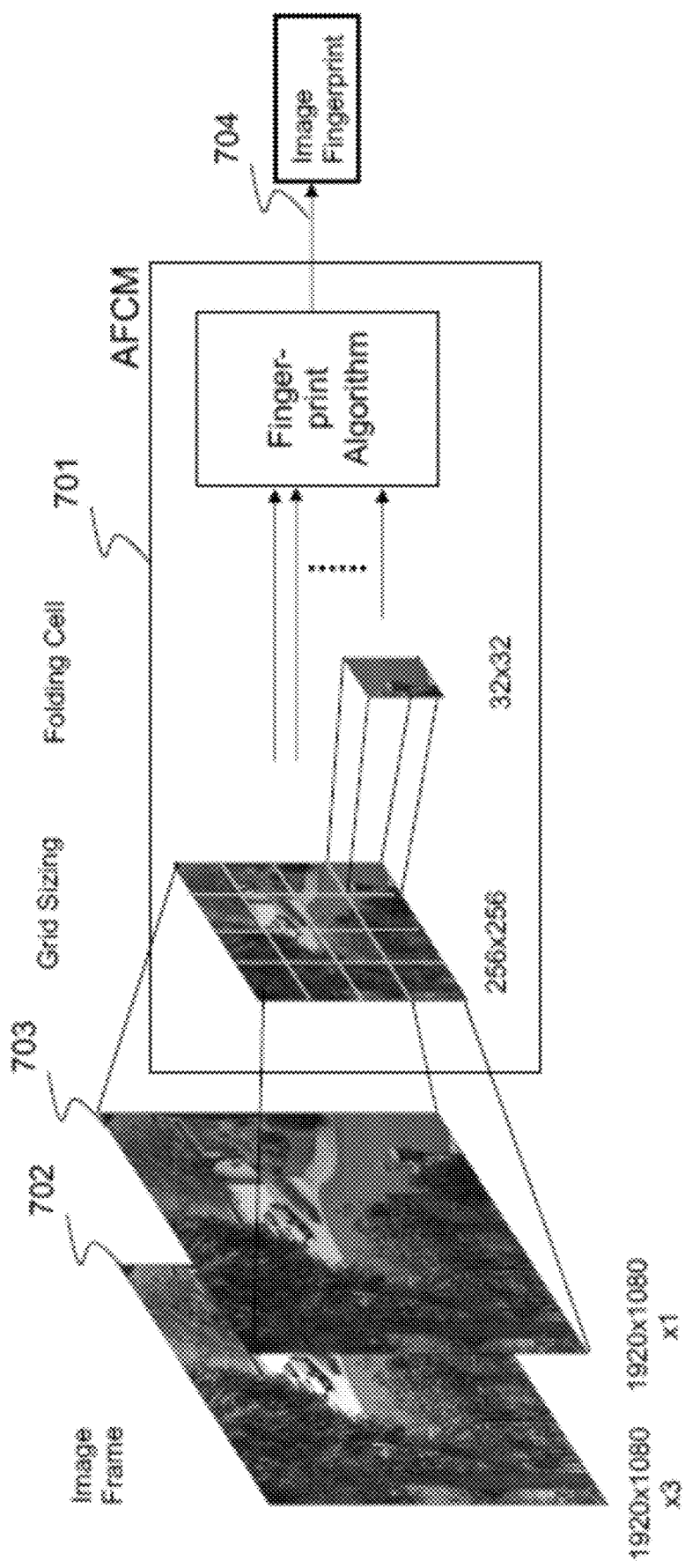
FIG. 7 is a diagram showing an example of a digital image being processed to generate a fingerprint for the digital image.

FIG. 7 is a diagram that illustrates an example of the fingerprinting process shown in FIG. 5 being applied to a color digital image frame 702. The color image frame 702 may be a frame of the source footage 117 or the proxy footage 120. The color image frame 702 may be a Red Green Blue (RGB) color image or may use a different color model to represent the color in the image frame 702. The techniques provided herein are not limited to source images that use a specific color model or set of color models. The color image frame 702 is converted to a grayscale image 703. As discussed in FIG. 5, the preprocessing operation 503 may convert the color image frame 702 to the grayscale image 703 and may also perform other preprocessing operations on the image. The image sizes for the image frame 702 and the grayscale image 703 may be selected based on the particular implementation and the desired output. Furthermore, other settings such as the grid size, the folding cell sizes, and/or other parameters may also be configured based on the particular implementation and the desired input. These and other parameters may be adjusted to trade off for accuracy versus speed. Less detailed fingerprints may be generated to speed up the search process but may result in the reduced accuracy of the matches obtained. In some implementations, the system may provide a user interface that allows the user to configure default settings to be used for fingerprinting generation. In some implementations, the system may also provide options for defining the fingerprint generation process on a user interface in which the user may conduct a search for frames of high-resolution source footage 117 that includes a particular frame.

Figure 8:
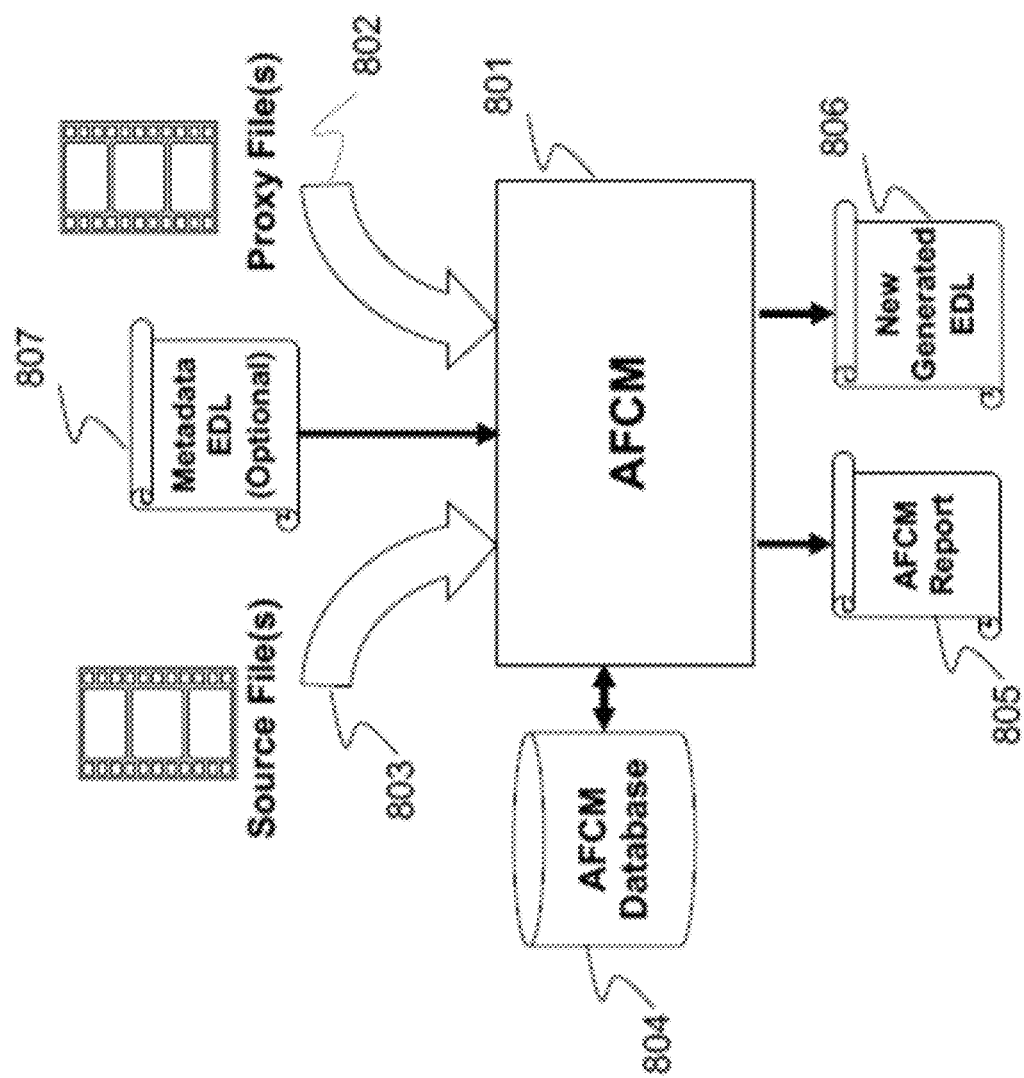
FIG. 8 is a diagram showing an example of an AFCM system and inputs and outputs of the AFCM system.

FIG. 8 is a diagram that shows an example of some types of inputs that the AFCM system 801 may receive and the types of outputs that the AFCM system 801 may output. As discussed above, the AFCM system 801 may receive one or more source files 803 that include high-resolution source footage 117 as an input. The AFCM system 801 may receive one or more proxy files 802 that include proxy footage 120 as another input. The AFCM system 801 may optionally receive EDL files, AAF files, and/or other source files formats that include metadata for the source files 803. The metadata may include timecode references that identify the location of specific scenes, clips, color lookup tables (LUTs), editorial and color grading effects, VFX, or other content in the source files 803. The AFCM database 804 shown in FIG. 8 may be implemented by the source footage datastore 110 and/or the fingerprint indexed datastore 304. The fingerprints generated by the AFCM system 801 and stored in the AFCM database 804 are separate from the metadata.

The AFCM system 801 may do metadata repair and/or metadata generation. The metadata may include but is not limited to a cut list of timecodes (hour, minutes, second, and frame) that indicate where cuts are located within the source footage 117. The metadata may be missing or non-existent for a particular source file or source files. The AFCM system 801 may analyze the source file or source files to generate the missing metadata. The newly generated metadata 806 may include the start and end times of cuts included in the source footage 117.

The AFCM system 801 may output an AFCM report 805 for requested cuts for which a match could not be found. The one or more source files 803 of the source footage 117 may be missing the requested cut or the requested cut may be incorrectly indexed. The report may indicate that a requested clip, missing zoom, or other request content is missing or incorrectly indexed. This allows problems to be quickly identified and addressed, thereby providing improved quality control in the post-production workflow.

FIG. 9 is a diagram that shows an example folding process 900 that may be used to implement the folding LSH operation 507 performed by the fine-grain fingerprinting pipeline 502 shown in FIG. 5. The folding technique shown in FIG. 9 may be performed on a set of cells, such as the cells 506, derived from the resized image created by the resizing operation 509 of the fine-grain fingerprinting pipeline 502.

The folding LSH operation shown in FIG. 9 are folded two times by folding operation 902. The folding operation

Figure 12:
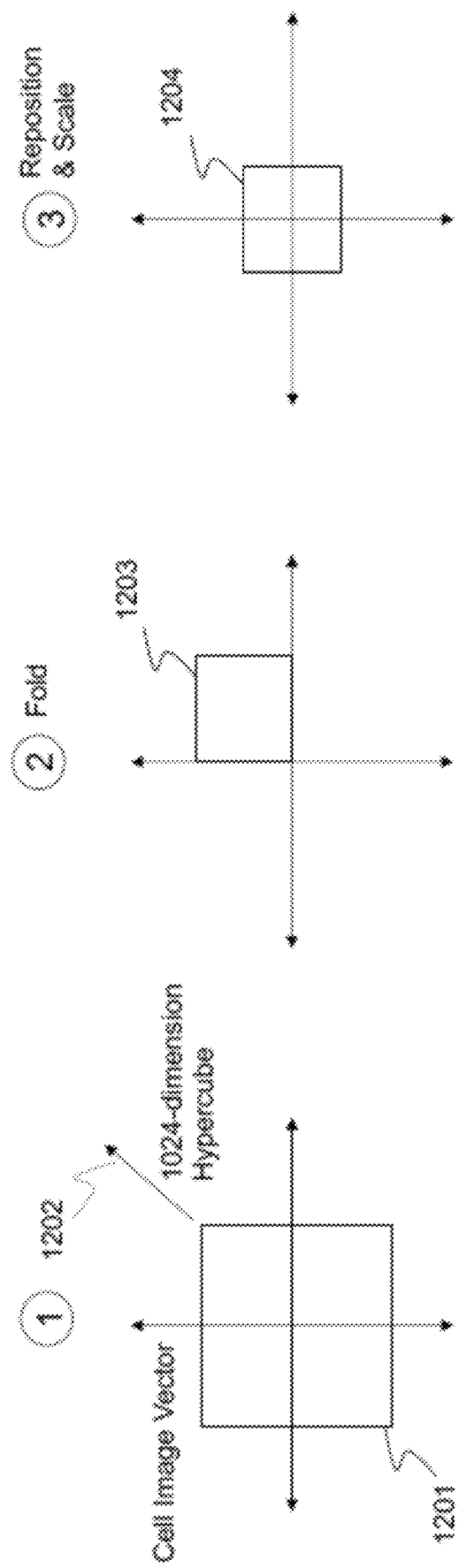
FIG. 12 is a diagram showing an example folding process for folding a multidimensional hypercube that may be used by the process of FIG. 9 to generate the fine-grain elements of the fingerprint.

902 may be implemented by the folding process shown in FIG. 12, which is described in detail in the examples which follow. The output from the folding operation 902 is provided as an input to the LSH operation 906, and the LSH operation 906 outputs a first 32-bit hash of the hashes 907.

The output of the folding operation 902 is provided to the folding operation 903 as an input. The folding operation 903 performs one folding operation on the input. The folding operation may also be implemented using the technique shown in FIG. 12. The output of the folding operation 903 may be input to an LSH operation 906 to obtain a second 32-bit hash of the hashes 907.

The output of the folding operation 903 is provided to the folding operation 904 as an input. The folding operation 904 also performs one folding operation on the input. The folding operation may also be implemented using the technique shown in FIG. 12. The output of the folding operation 904 may be input to an LSH operation 906 to obtain a third 32-bit hash of the hashes 907.

The output of the folding operation 904 is provided to the folding operation 905 as an input. The folding operation 905 also performs one folding operation on the input. The folding operation may also be implemented using the technique shown in FIG. 12. The output of the folding operation 904 may be input to an LSH operation 906 to obtain a fourth 32-bit hash of the hashes 907.

The first, second, third, and fourth hashes may be combined together to form the fine-grain cell fingerprint, which is passed as a parameter to the folding matching operation 908, which may implement the folding matching operation 513 shown in FIG. 5. While the example shown in FIG. 9 includes 64 32×32 cells as the input and outputs 32-bit hashes from each of the folding operations to produce a 128-bit fine-grain cell fingerprint, other implementations may receive a different number of cells of a different size and may be configured to output a different number of bits from each of the LSH operations. Thus, the fine-grain fingerprint may be a different length in other implementations.

FIG. 12 is a diagram that shows an example of the folding techniques that may be used to generate a fingerprint according to the techniques provided herein. The folding technique shown in FIG. 12 may be used to implement the folding operations 902, 903, 904, and 905 shown in FIG. 9. The folding technique shown in FIG. 12 may be used to determine a portion of the fine-grain cell fingerprint.

The possible space for all image vectors may be thought of as a hypercube. In the example shown in FIG. 12, this space is represented by a 1024-dimension hypercube 1202. The cell image vector 1201 may be folded by taking the absolute value of the values included in the vector to generate the folded vector 1203 so that all the values fall into the positive orthant. The values in the folded vector 1203 may then have 0.5 subtracted from them to shift the possibility space of the vector 1204 to be distributed around the origin. This folding process compresses the values used to generate the fingerprint into a smaller space. As a result, differences between similar frames of content are increased and differences between frames of content that are less similar are decreased. As a result, the results produced using the matching techniques described herein may provide more accurate results. Many frames of the source footage 117 may be very similar. The source footage 117 may include multiple shots of a scene and/or other footage that may appear very similar. By emphasizing the differences between similar frames, the AFCM system may find candidate clips that more accurately match those of the proxy footage. The folding process shown in FIG. 12 allows the AFCM to express the difference between very similar frames of content using a limited number of bits to represent the content of the frames.

FIG. 10 is a diagram showing an example of a clip candidate selection process 1007 which may be used to identify clips in the source footage 117 that are similar to clips in the proxy footage 120. One or more clip candidates from the source footage 117 may be identified.

The source footage 117 may be accessed in blocks of frames, referred to herein as frame pages, that include a plurality of frames of source footage 117. In some implementations, the fingerprints associated with the plurality of frames of source footage 117 may be accessed from the fingerprint indexed datastore 304 rather than obtaining the frames of the source footage. In implementations where the frames of the source footage 117, the fingerprints for at least a portion of the source footage 117 may be generated using the fingerprint generation techniques discussed in the examples provided herein and stored in the fingerprint indexed datastore 304. The fingerprints of the frames of the proxy footage 120 may also be generated if they have not yet been generated.

The process 1007 may include an operation of finding the start and end of the clip candidate(s) 1050 in the source footage 117 frames or fingerprint data representing the frame. The length of the clip of the proxy footage 120 should typically match the length of the clip in the source footage 117. Once a candidate frame has been found that is similar to the start or end frame of the clip of the proxy footage, the frame at the other end of the clip should be found at the respective number of frames from the candidate frame that is similar to the start or end frame of the clip of the proxy footage.

As indicated above, the clip being sought in the source footage 117 may be a subset of the frame page 1003 or a superset of the frame page 1003. The first frame 1002 of the page 1003 is denoted by "s" which represents the initial estimated of the start of the clip. The last frame 1004 of the frame page 1003 is denoted by "e" on the diagram. The search may include additional frame pages, such as the frame page 1009 which has a last frame 1010 denoted by "e" on the diagram.

The search for the start and end frames of the clip candidate(s) 1050 may begin with searching for the start frame of the clip at the first frame 1002 of the frame page 1003 and for the end frame of the clip at the last frame 1004 of the frame page 1003. The fingerprint of the start frame from the proxy footage 120 may be compared to each candidate frame to determine a similarity score and the candidate frame may be selected as a start frame of a clip candidate if the similarity score meets a predetermined threshold. Similarly, the fingerprint of the end frame from the proxy footage 120 may be compared to each candidate frame to determine a similarity score and the candidate frame may be selected as an end frame of a clip candidate if the similarity score meets a predetermined threshold.

A candidate clip may be identified for each pair of start and end frames that satisfy the similarity score requirements. The candidate clips may be identified by conducting a binary search of the frames of the frame page being searched. The candidate clip may be added to the clip candidates 1050 for additional processing to identify a best match for the clip. There may be multiple clips that appear to be quite similar, and thus multiple clips may need to be considered when selecting which clip to be used from the source footage 117. The clip candidate information may include the information that identifies the location of each candidate clip in the source footage, such as timecode information, filename information, and/or other information that may be used to locate and obtain the high-resolution footage of the clip from the source footage 117.

FIG. 11 is an example clip match selection process 1100. The process 1100 may implement, at least in part, the clip candidate and matching operation 607 shown in FIG. 6 or for selecting a best match clip from the clip candidates 1050 determined in the process 1007 shown in FIG. 10. In operation 1102, the source clip candidates 1101 are analyzed and a clip score and confidence interval are calculated for each clip. The clip score and confidence level are based on the average score of the matched frames within the clip. In operation 1105, a confidence interval filter is applied and any clips whose confidence interval does not overlap the confidence interval of the lowest (i.e., the best) clip score is discarded. If there is only one clip remaining to be processed, the remaining clip is selected as the best match clip 1107. Otherwise, in operation 1103 more samples are obtained, and one or more fame from each clip candidate 1101 is scored against a proxy clip 1104.

Figure 13:
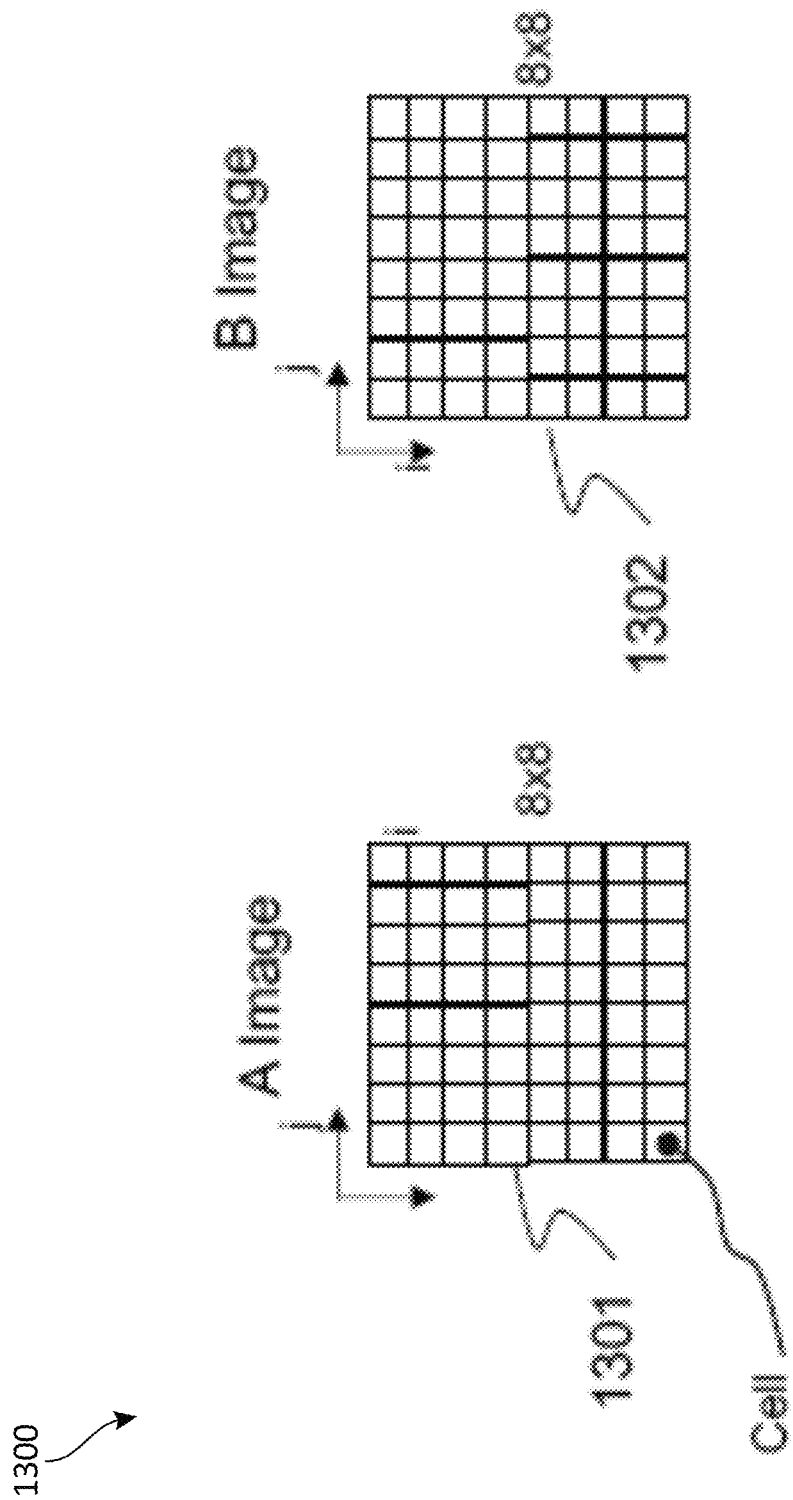
FIG. 13 is a diagram showing an example fine-grain scoring process.

FIG. 13 is a diagram that shows an example of a fine-grain scoring process 1300. The fine-grain scoring process 1300 may be used by the frame candidate selection process 605 shown in FIG. 6 when selecting candidate frames from the fingerprint indexed datastore 304. In the example shown in FIG. 6, the fine-grain scoring process 1300 compares Image A from the source footage 117 with Image B from the proxy footage 120. Image A and image B have been divided into cells such as those generated by the grid division operation 505 of the fine-grain fingerprinting pipeline 502.

The process 1300 calculates the maximum error of all cell errors, wherein 'w' is a weight vector of constants, and 'HD' represents the Hamming Distance, the maximum error is calculated by calculating the error of each cell by comparing cell Aij of the grid 1301 with cell Bij of the grid 1302 for each value of i and j, where 'i' represents a column and 'j' represents a row of the grids 1301 and 1302:

Ve=HD (Fold_2_LSH, Fold_2_LSH),
  HD (Fold_3_LSH, Fold_3_LSH),
  HD(Fold_4_LSH, Fold_4_LSH), and
  HD(Fold_5_LSH, Fold_5_LSH).
Cell Error=(w·Ve)

The weight vector may, for example, include a plurality of numerical weight values. An example weight vector w may be [1, 0.5, 0.25, 0.1]. The specific weights applied to each of the elements may vary depending upon the specific implementation.

The error values for each pair of cells are computed based on the values produced by the first, second, third, and fourth fold operations performed on the respective cell values from the grids 1301 and 1302 and calculating the Hamming Distance between values from the grid 1301 and the gride 1302. The Cell Error for each cell is calculated by taking the dot product of the vector of error values Ve calculated for each pair of cells and the weight vector. The maximum Cell Error value may then be determined for the two images.

FIG. 14 is a flow diagram of an example process 1400 that the AFCM system may use to generate and prune a set of fingerprint candidates based on similarity scores. The similarity score in process 1400 includes a coarse-grain score and a fine-grain score component. The process 1400 may be used to implement, at least in part, the filtering and scoring fingerprint matching process 606 shown in FIG. 6.

The process 1400 uses the following threshold values when selecting fingerprint candidates:
  Adaptive.Coarse.Threshold=min (minCandidateCoarseScore*1.5+3, C1)
  Adaptive.Fine.Threshold=min(minCandidateFineScore*1.5+3, C2)
where C1 and C2 are threshold constants, minCandidateCoarseScore refers to the minimum coarse score from all candidates, and the minCandidateFineScore refers to the minimum fine score from all candidates. The multipliers applied to the minCandiateCoarseScore and the minCandidateFineScore and the constants C1 and C2 are examples of one implementation. Other multipliers and constant values may be used in other implementations.

The process 1400 may include an operation 1401 of accessing image fingerprint candidates. The image fingerprint candidates may be obtained from the fingerprint indexed datastore 304.

The process 1400 may include an operation 1402 in which the coarse-grain score of the candidate is compared to the adaptive coarse threshold value. If the coarse-grain score of the candidate is greater than or equal to the adaptive coarse threshold value, then the process continues with operation 1404 in which the image fingerprint candidate is discarded. Otherwise, if the coarse-grain score of the candidate is less than the adaptive coarse threshold value, the process 1400 may continue with operation 1403.

In operation 1403, the fine-grain score is compared to the adaptive fine threshold value. If the fine-grain score of the candidate is greater than or equal to the adaptive fine threshold value, then the process continues with operation 1404 in which the image fingerprint candidate is discarded. Otherwise, if the fine-grain score of the candidate is less than the adaptive fine threshold value, the process 1400 may continue with operation 1406 in which the candidate fingerprint is selected.

Figure 15:
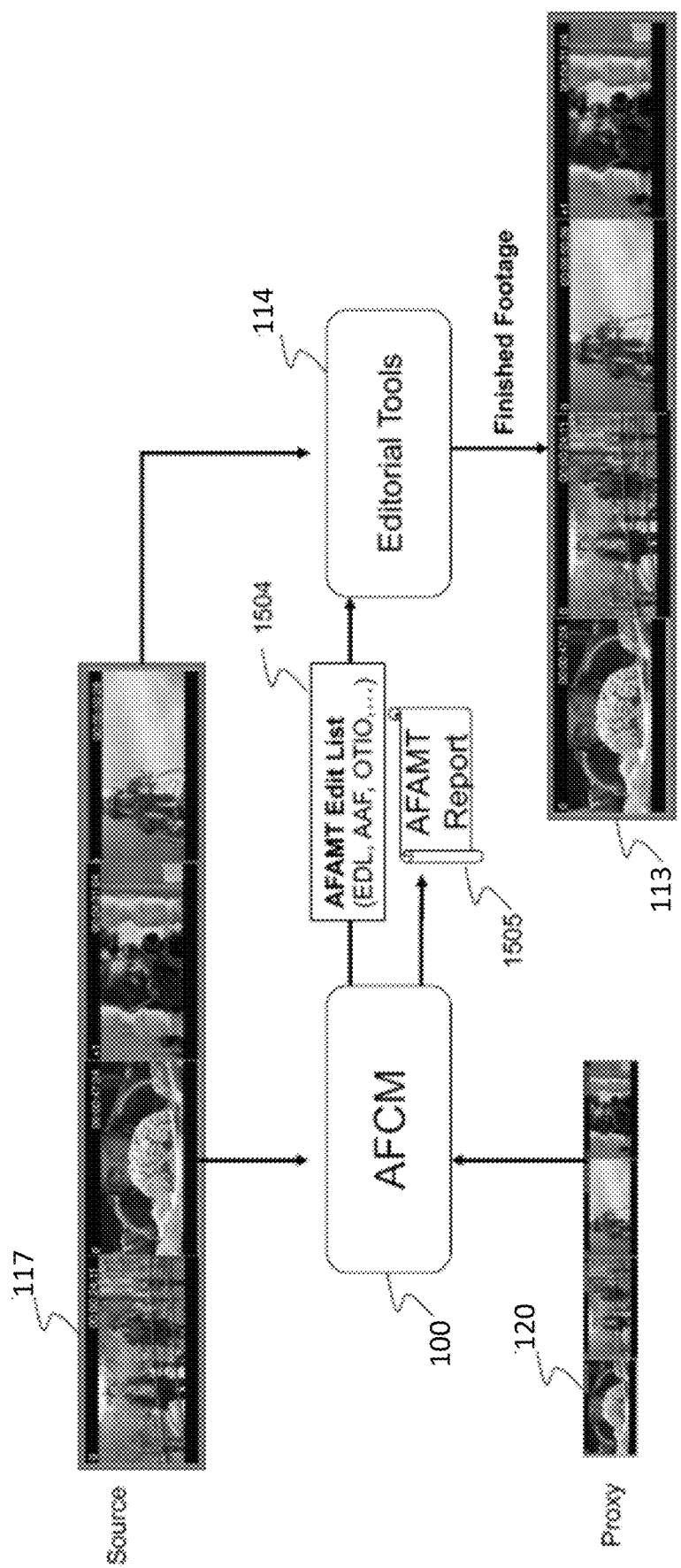
FIG. 15 is a diagram showing an example process of matching proxy footage without embedded or side-channel metadata to source footage and computing a cut list for high-resolution deliverable footage.

FIG. 15 is an example use case in which the AFCM system performs matching with proxy footage without any embedded or side-channel metadata to the corresponding source footage, and the AFCM system 100 computes the metadata for the for the high-resolution deliverables. The proxy footage 120 may not have metadata or timecode information attached or available. However, the AFCM system 100 may be configured to use the fingerprint determination processes discussed in the preceding examples to correlate the proxy footage 120 with the source footage 117. The AFCM system 100 uses the fingerprint matches to create new metadata cut list and effect list 1504 for the proxy footage 120. The AFCM system 100 can generate a report 1505 that identifies clips that from the proxy footage 120 for which a matching clip in the source footage 117 could not be found. The metadata cut list and effect list 1504 may be provided to editorial tools 114 to complete the post-production workflow. The finished footage 113 may be generated by extracting the clips from the source footage 117 that match those included in the proxy footage 120.

Figure 16:
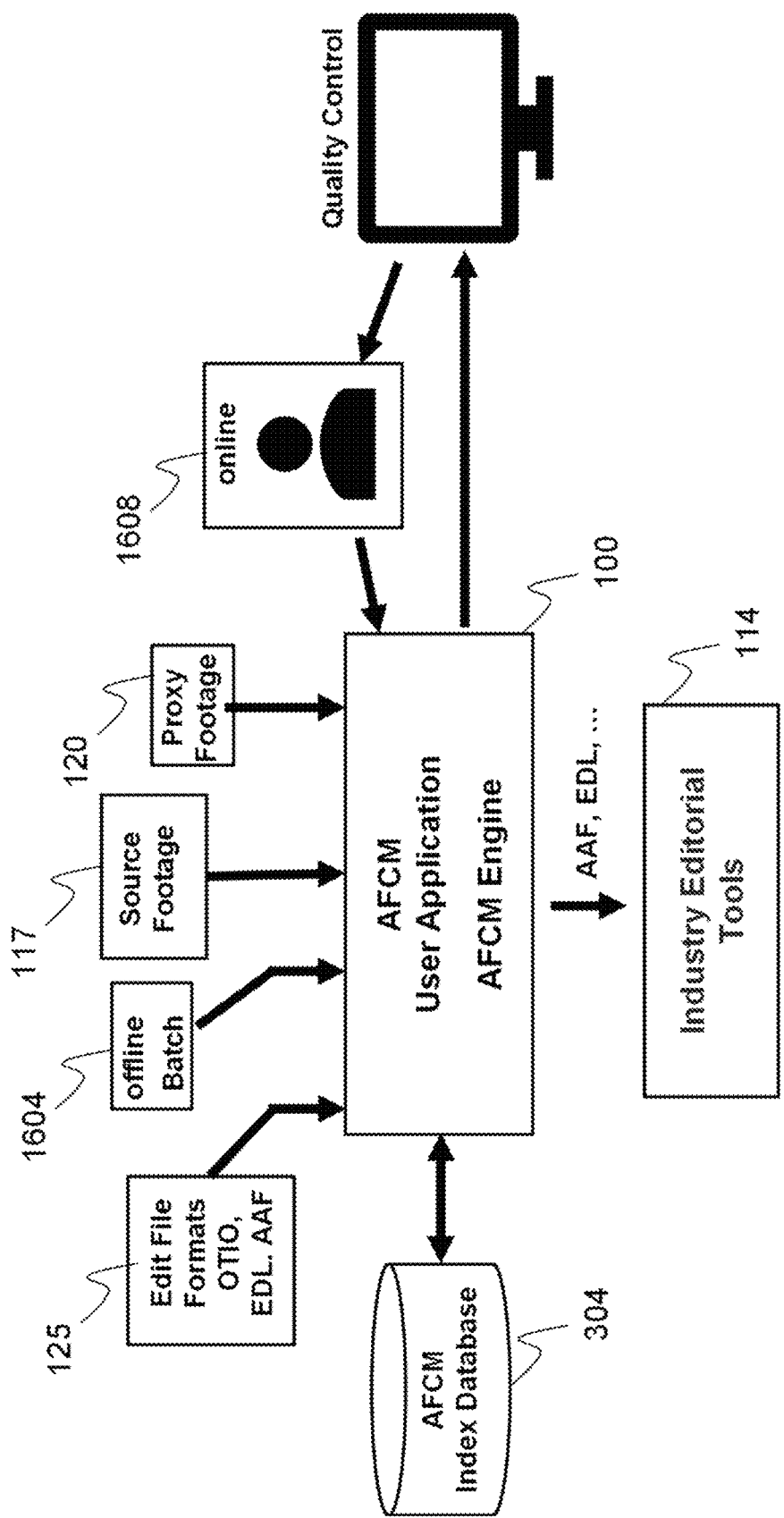
FIG. 16 is a diagram that shows how the AFCM system may be utilized in a studio environment.

FIG. 16 is a diagram that shows how the AFCM system may be utilized in a studio environment. The AFCM system 100 may include a user application and an AFCM engine. The user application may provide a user interface 1608 that allows the user to select proxy footage from the proxy footage 120 for which the corresponding clips of high-resolution source footage 117 of the source footage 117 are desired. The user interface may also provide a means for the user to select metadata 125 to be corrected by the AFCM system 100 using the fingerprinting and matching techniques provided herein and/or to generate new metadata for source footage 117 for which the metadata is unavailable or inaccurate. The matching technique may use the fingerprint information stored in the database 1603.

The metadata and the source footage 117 output by the AFCM system 100 may be utilized by video production editorial tools to add VFX, credits, color correction, and/or other actions on the post-production workflow. As discussed in the preceding examples, the AFCM system 100 may be configured to generate a report that identify clips included in the proxy footage 120 that could not be matched in the source footage 117 as well as other relevant information regarding the source and proxy files and footage. The report may be provided to a quality control team associated with a video production. The quality control team may be able to manually identify mislabeled proxy content and/or to notify the post-production team that certain requested content is missing. Alternative clips may also be selected if the missing clips cannot be located. The AFCM system 100 may also output a metadata cut list and effect list which may be utilized by editorial tools 114.

The AFCM system 100 may be configured to operate in a batch mode in which a user may select a batch of content to be processed offline by the AFCM system 100. The user may submit the batch of content to be processed. The batch of content to be processed may include footage for which the metadata is to be repaired or created. The batch of content may also include proxy footage 120 for which clips of high-resolution source footage 117 are being requested. The batch processing allows the user to schedule tasks to be performed by the AFCM system 100 without requiring the user to monitor the progress of the tasks. The AFCM system 100 may notify the user when the batch of content has been processed. A report may be generated upon completion of the batch indicating those requests that completed successfully and those requiring user intervention.

Figure 17:
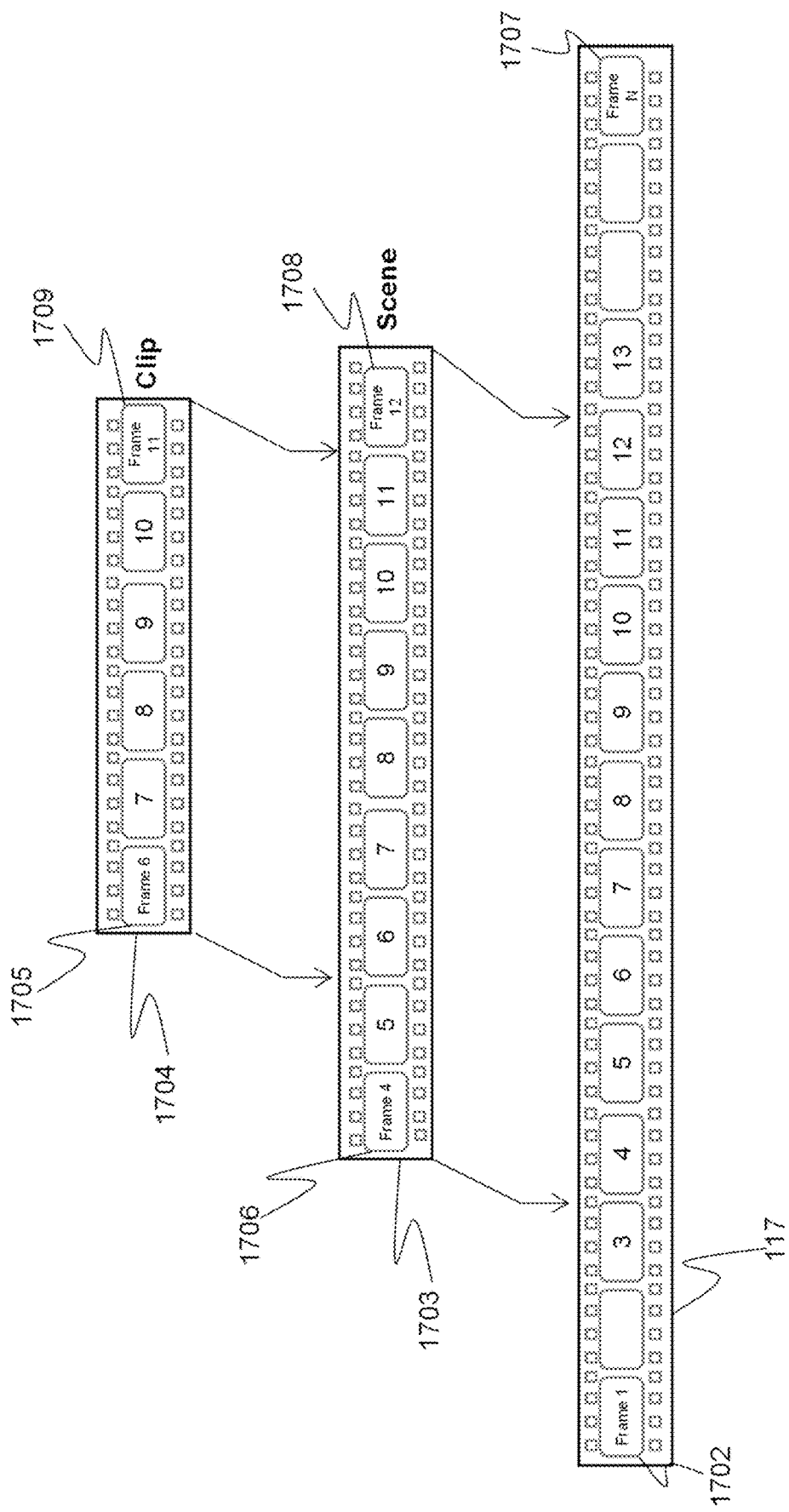
FIG. 17 is a diagram that shows a typical editorial relationship between footage to a cut of a scene to a cut of a clip.

FIG. 17 is a diagram that shows a typical editorial relationship between footage to a cut of a scene to a cut of a clip. The source footage 117 shown in FIG. 17 includes N frames of footage including frames $F_1$ 1702 to frame $F_N$ 1707. The source footage 117 includes one or more scenes, such as the scene 1703, captured by a camera or generated via computer graphics or other visual effects tools. The scene 1703 includes frames $F_4$ 1706 to frame $F_{12}$ 1708 in this example. During the editorial process, portions of or all the frames of the scene 1703 may be selected (or cut) as a clip 1704 for the purposes of creating final footage 113. In the example shown in FIG. 17, the clip 1704 includes frames $F_6$ 1705 to frame $F_{11}$ 1709. The specific number of frames that may be included in a scene or a clip may vary.

Figure 18:
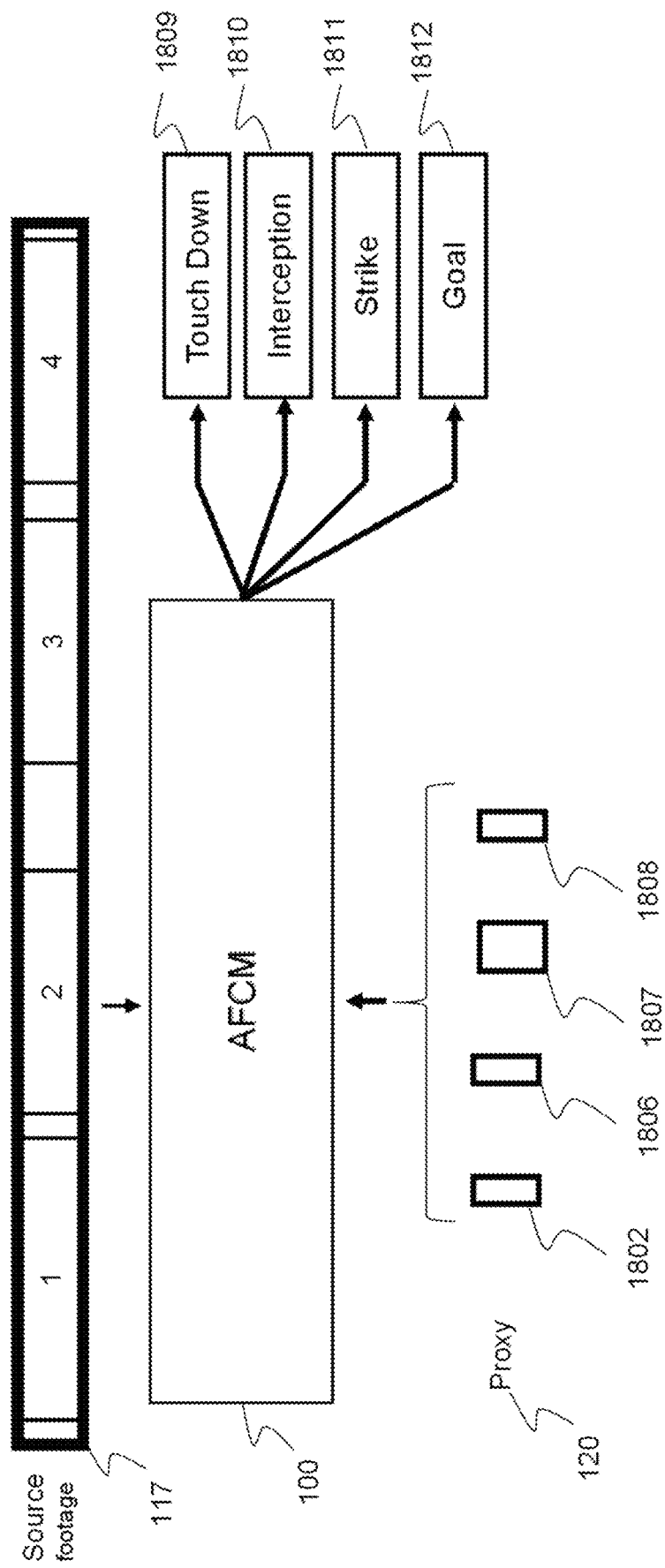
FIG. 18 is a diagram of an example use case in which clips of a video content of a sports broadcast are matched using the AFCM techniques provided herein.

FIG. 18 is a diagram of an example use case in which clips of a video content of a sports broadcast are matched using the techniques described herein. In this example, the proxy footage 120 includes four clips 1802, 1806, 1807, and 1808 for which the corresponding clips of high-resolution footage 117 are being sought. The AFCM system 100 performs the fingerprinting and matching operations discussed in the preceding examples to find the corresponding clips from the source footage 117. In this example, the AFCM system 100 has identified the high-resolution clips 1809, 1810, 1811, and 1812. In this example implementation, the four clips 1802, 1806, 1807, and 1808 may include a few seconds of highlights from a sports broadcast but the AFCM system 100 may use the clips to identify longer, high-resolution version of proxy clips.

Figure 20:
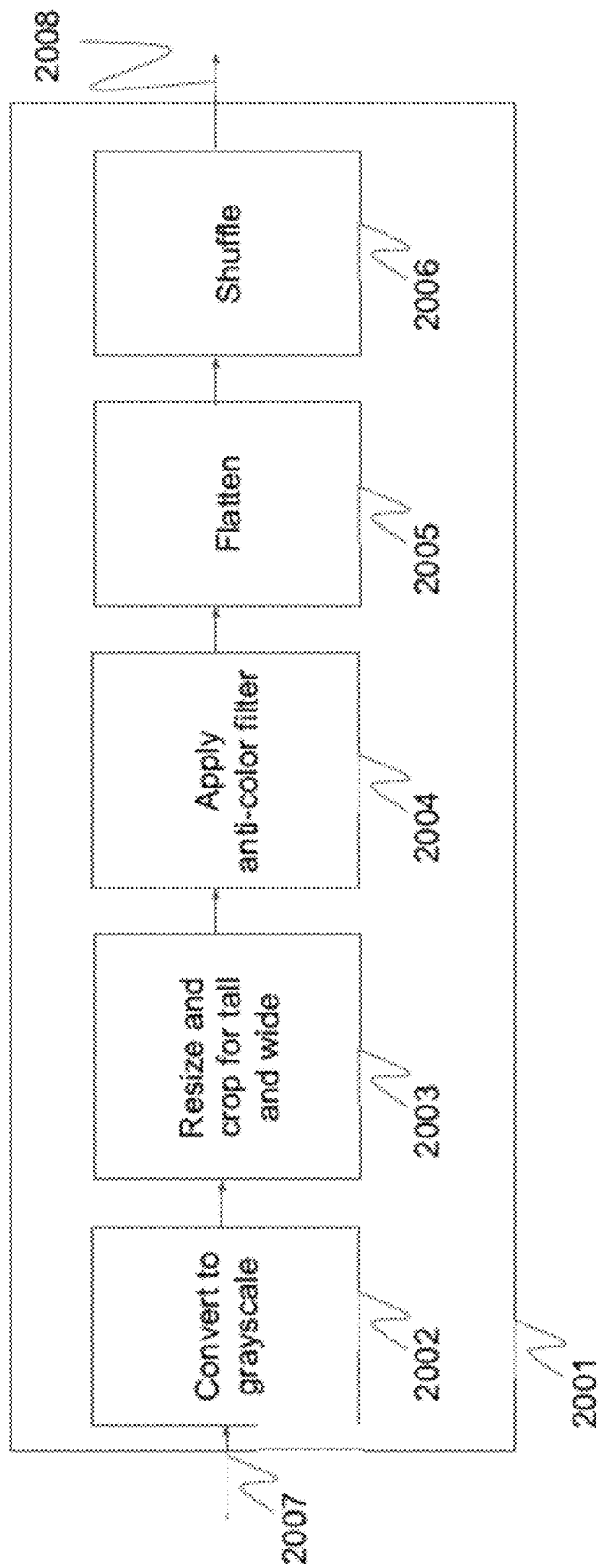
FIG. 20 is a diagram of an example process for preprocessing an image.

FIG. 20 is a diagram of an example process 2001 for preprocessing an image. The process 2001 may be used to implement the image preprocessing operation 503 shown in FIG. 5 for preprocessing an image frame for the coarse-grain fingerprinting pipeline 501 and the fine-grain fingerprinting pipeline 502. The input to the process 2001 is an image frame 2007 of any size or resolution.

The process 2001 may include an operation 2002 of converting the image frame 2007 to grayscale. Converting the image frame 2007 to grayscale from a color image may reduce errors introduced by color compression or color correction made to the frame.

The process 2001 may include an operation 2003 of resizing and cropping for tall and wide images. The grayscale image output by operation 2002 may be cropped and resize twice: a first version having a taller aspect ratio and a second version having a wider aspect ratio. The first version of the image may have an aspect ratio where the height of the image is greater than the width of the image, such as but not limited to a 3:4 aspect ratio. The second version of the image may have an aspect ratio where the width of the image is greater than the height of the image, such as but not limited to a 16:9 aspect ratio. However, the first version of the image may have an aspect ratio where the width of the image is greater than the height of the image. For example, the first version of the image may have an aspect ratio of 4:3 and the second version of the image may have an aspect ratio of 2:1. The aspect ratios discussed herein are merely examples that illustrate the concepts discussed herein do not limit the techniques in the instant application to these specific aspect ratios. The first and second version of the image are processed separately for each of the subsequent operations of the process 2001. The resizing and cropping operation may be performed by the process 2701 shown in FIG. 27.

The process 2001 may include an operation 2004 in which an anti-color filter is applied to the first and second images output by the operation 2004. An example of an anti-color filter that may be used to implement operation 2004 is shown in FIG. 21.

The process 2001 may include an operation 2005 of flattening the first and second images processed by the anti-color filter in operation 2004. The first image may be flattened from a two-dimensional vector into a first one-dimensional vector and the second image may be flattened from a two-dimensional vector into a second one-dimensional vector.

The process 2001 may include an operation 2006 of shuffling the elements of the vectors produced by the operation 2005. The elements of the vectors are shuffled using a predetermined shuffling routine so that the same reordering occurs each time that the operation 2006 is performed on a vector. The shuffling of the elements ensures that any correlation between pixel adjacency and vector element adjacency is eliminated. The shuffled vectors may be provided as an output 2008 from the process 2001.

Figure 21:
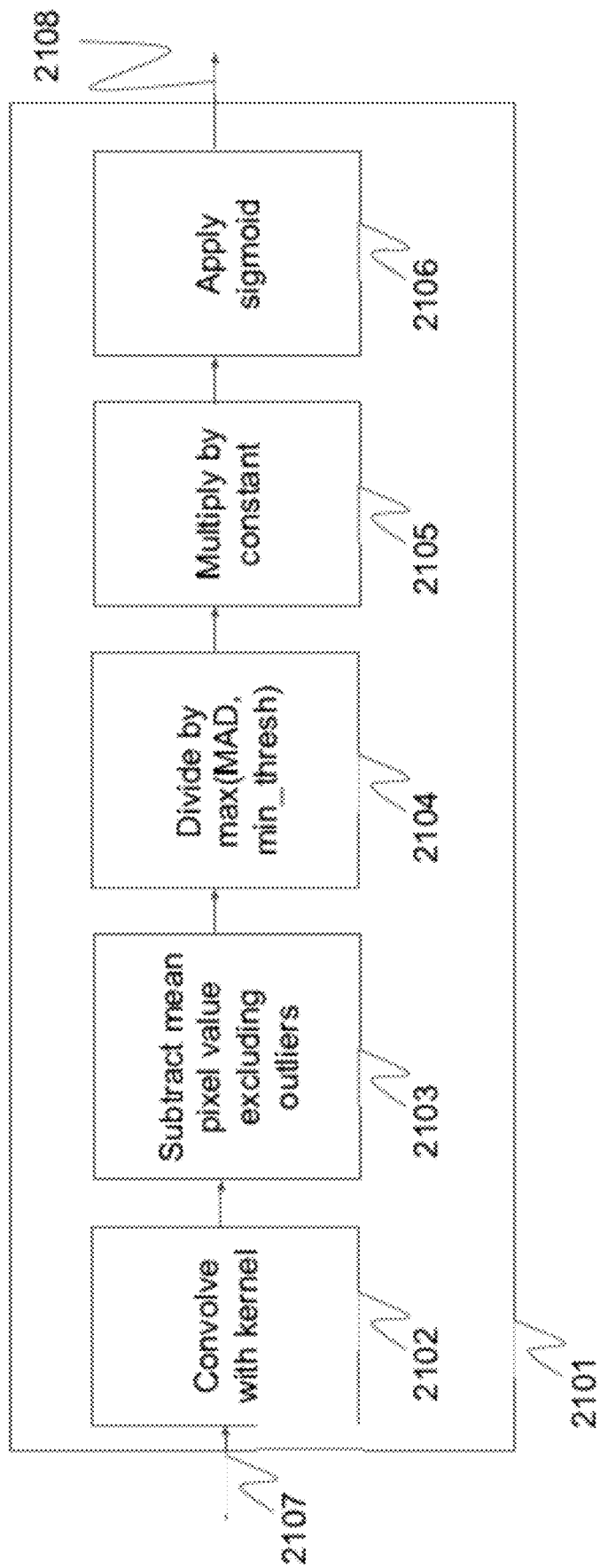
FIG. 21 is a diagram of an example process for applying an anti-color filter to an image.

FIG. 21 is a diagram of an example process 2101 for applying an anti-color filter to an image. The process 2101 may implement the operation 2004 of the process 2001 shown in FIG. 20 in which the process 2101 may be separately applied to the first and second images.

The input 2107 to the process 2101 may be an image frame of footage or other digital image. The image frame may have been preprocessed to grayscale, resized, cropped, and/or otherwise processed prior to the process 2101 being applied.

The process 2101 may include an operation 2102 of convolving the input image 2107 with a kernel. The kernel may be a difference of Gaussians (DoG) kernel in some implementations. Other implementations may utilize other filters that may serve a similar purpose as the DoG kernel.

The DoG kernel involves subtracting of a first Gaussian blurred version of the input image from a second Gaussian blurred version of the input image, where the second image is less blurred than the first image. Gaussian blurring may be used to suppress high-frequency spatial information and subtracting the first image from the second image may preserve the spatial information that falls within the range of frequencies which are preserved in the first blurred image and the second blurred image. Thus, the DOG may serve as a spatial band-pass filter that may attenuate frequencies in the original image which are farther from the band center. In some implementations, the sigma values for the DOG kernel may be $\sigma_1=1$ and $\sigma_2=10$. Other sigma values may be used in other implementations.

The process 2101 may include an operation 2103 of subtracting a mean pixel value excluding outliers. In operation 2103, the mean pixel value excluding the N largest and smallest values is calculated and subtracted from each of the pixels of the image output by operation 2102. In one implementation, the value of N may be 1000, which causes the 1000 largest and 1000 smallest values to be excluded from the calculation of the mean. Other values of N may be selected depending on the degree of clipping that exists in the color graded footage.

The process 2101 may include an operation 2104 of calculating a pixel variation value for the image output by operation 2103 and dividing the pixel values of the image by the pixel variation value. The pixel variation may be calculated using a technique such as mean absolute deviation (MAD) and normalized to effectively normalize variation. The MAD represents the average distance between each pixel value of the image and the mean pixel value. A minimum threshold may also be used to avoid divide by zero. The mean absolute deviation can be calculated by calculating the distance of each pixel from the mean pixel value excluding outlines obtained from operation 2103 and taking the average.

The process 2101 may include an operation 2105 of multiplying the pixel values resulting from the operation 2104 by a constant. The optimal value of the constant C may depend upon the convolution kernel that is being used in operation 2102 and the outlier trimming occurring in operation 2103. For example, the constant values C in one implementation is 5 based on these factors. However, other implementations may use a different constant value. The process 2101 may include an operation 2106 of applying a sigmoid function to the resulting pixel values from operation 2105. The results of operation 2106 may be provided as an output 2108 of the process 2101.

Figure 22:
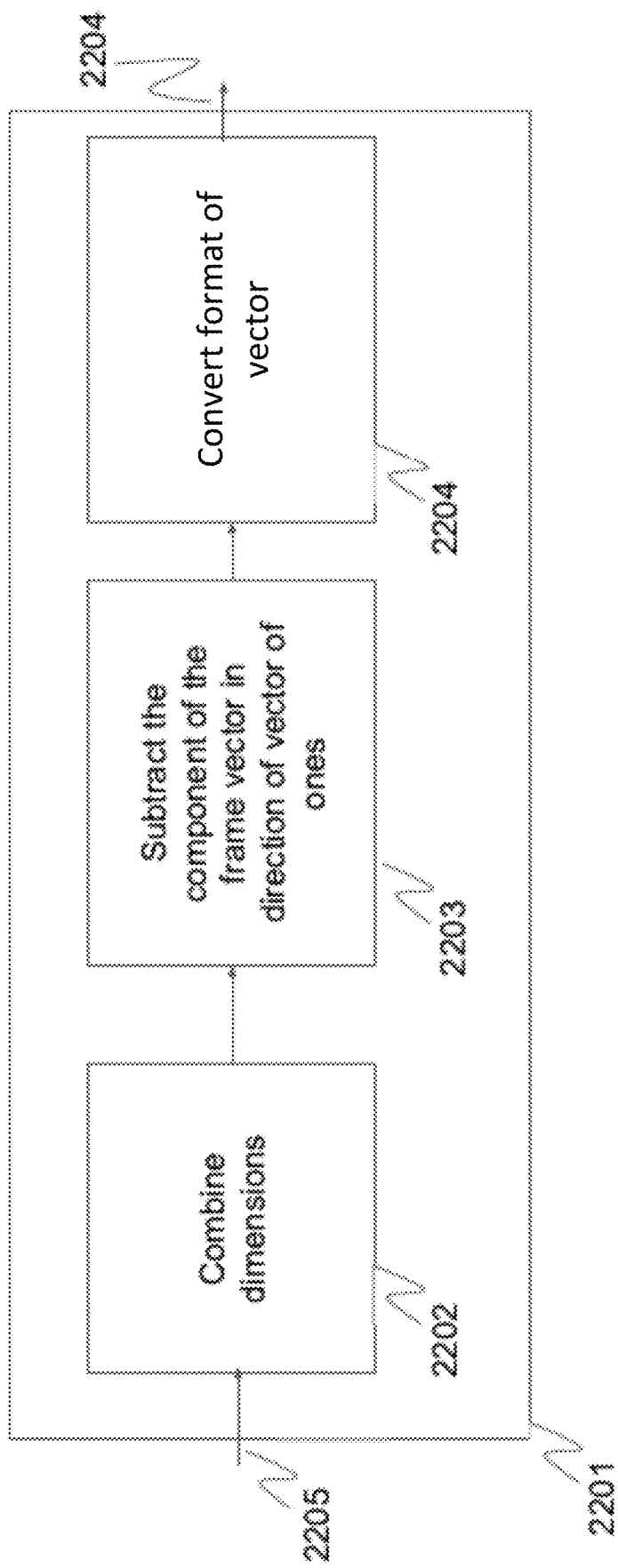
FIG. 22 is a diagram of an example process for fine-grain fingerprint generation.

FIG. 22 is a diagram of a process 2201 for fine-grained fingerprint generation. The process 2201 may be implemented as an alternative to the fine-grain fingerprinting pipeline 502 of the fingerprint generation process shown in FIG. 5. The output 2008 of the image preprocessing process 2001 may be provided as an input 2208 of the process 2201. The output 2008 of the image preprocessing process 2001 comprises vectors as discussed above with respect to FIG. 20.

Figure 24:
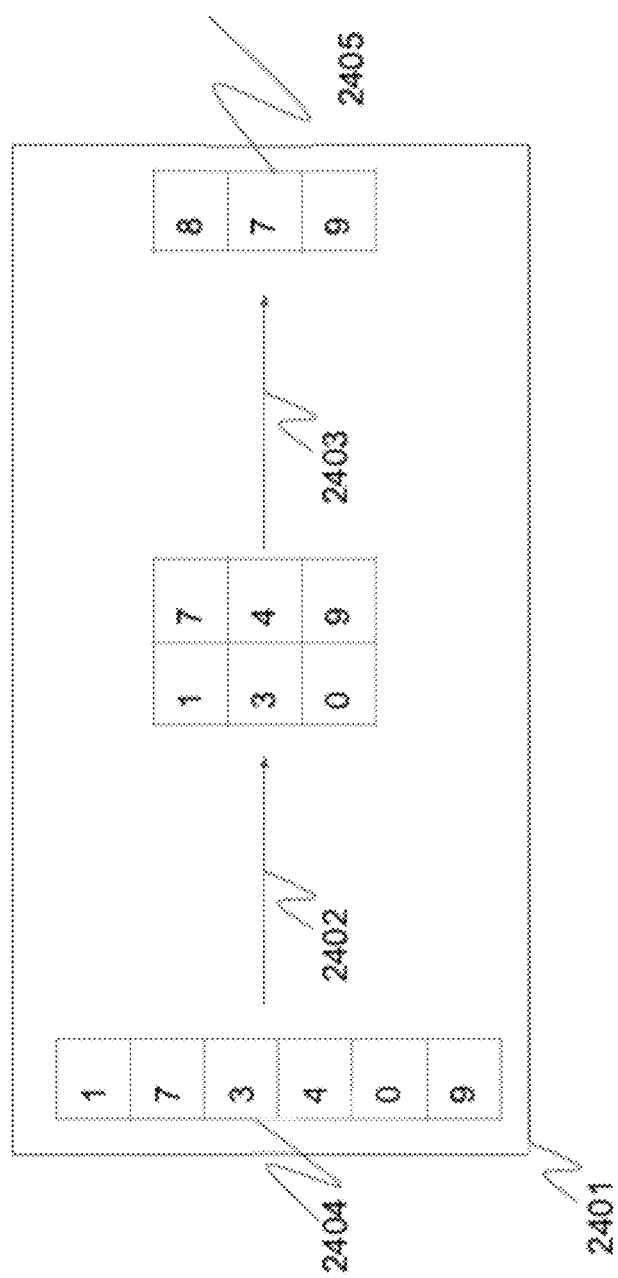
FIG. 24 is a diagram of an example dimension reduction process.

The process 2201 may include an operation 2202 of combining dimensions of a vector representing an image to produce a lower dimension vector. In one implementation, the number of dimensions of the lower dimension vector is 512 dimensions. FIG. 24 provides an example dimension reduction process 2401 that may be used to implement operation 2202.

The process 2201 may include an operation 2203 of subtracting the component of the frame vector in the direction of a vector of ones. The component of the resulting vector from operation 2202 in the direction of the vector of ones is subtracted from itself to produce a new vector that is orthogonal to the vector of ones.

The process 2201 may include an operation 2204 of converting the format of the vector output by operation 2203. In an example implementation, the operation 2204 may include converting a 64-bit floating point representation of the vector output by operation 2203 to a 16-bit or 32-bit floating-point precision representation. The representations may be converted to a different type of value for storage and computational purposes. The value obtained by converting the representation may be provided as the output 2204 of the process 2201 as the fine-grain fingerprint.

Figure 23:
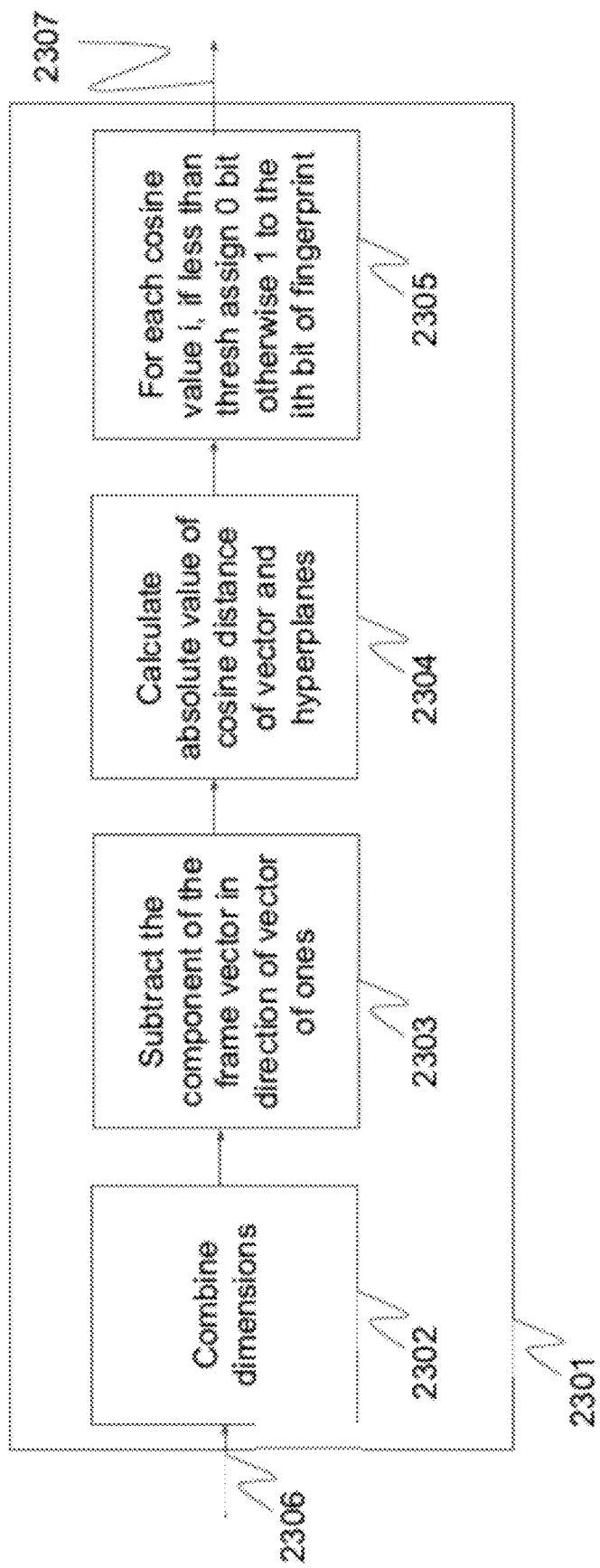
FIG. 23 is a diagram of an example process for fingerprint generation.

FIG. 23 is a diagram of a process 2301 for coarse-grained fingerprint generation. The process 2301 may be implemented as an alternative to the coarse-grain fingerprinting pipeline 501 of the fingerprint generation process shown in FIG. 5.

The process 2301 may include an operation 2302 of combining dimensions to produce a lower dimension vector. In one implementation, the number of dimensions of the lower dimension vector is 64 dimensions. FIG. 24 provides an example dimension reduction process 2401 that may be used to implement operation 2302.

The process 2301 may include an operation 2303 of subtracting the component of the vector from operation 2302 in the direction of a vector of ones. The component of the resulting vector from operation 2302 in the direction of the vector of ones is subtracted from itself to produce a new normalized vector that is orthogonal to the vector of ones.

The process 2301 may include an operation 2304 of matrix multiplying the normalized vector from operation 2303 and a matrix of hyperplanes resulting in a new vector of length P, where P is the number of hyperplanes. The orientation of the hyperplanes can either be precomputed randomly, selected, or discovered using machine learning methods such as gradient descent. The hyperplanes matrix is a predetermined set of unit vectors. The matrix multiplication results in the vector P of cosine distances. Some implementations may use random orientations of unit vectors orthogonal to the ones vector. As a result, the operation 2304 may function similar to a random projections strategy for dimensionality reduction.

The process 2301 may include an operation 2305 of converting the vector from operation 2301 into a bit vector by thresholding. The absolute value of each element of the vector may be compared to a threshold value. If the absolute value is greater than the threshold, then the bit value may be set to 1. Otherwise, the bit value is assigned to 0. The resulting bit value may be provided as output 2307 by the process 2301. The output 2307 is the coarse-grain fingerprint.

FIG. 24 is an example dimension reduction process 2401. The process 2401 is performed on the input 2404 which is a vector of length L. The vector is reshaped into a M×N matrix in operation 2402, where M and N are positive integers and M represents the number of rows and N represents the number of columns of the matrix. If the desired length of the new vector is not a divisor of L, the next largest divisor of L may be used and any additional elements in the resulting vector may be truncated. The dimensionally reduced vector 2405 may be determined by summing the vector values along the first axis, which results in the vector 2405 of length M. The vector 2405 is provided as output of the process 2401.

Figure 25:
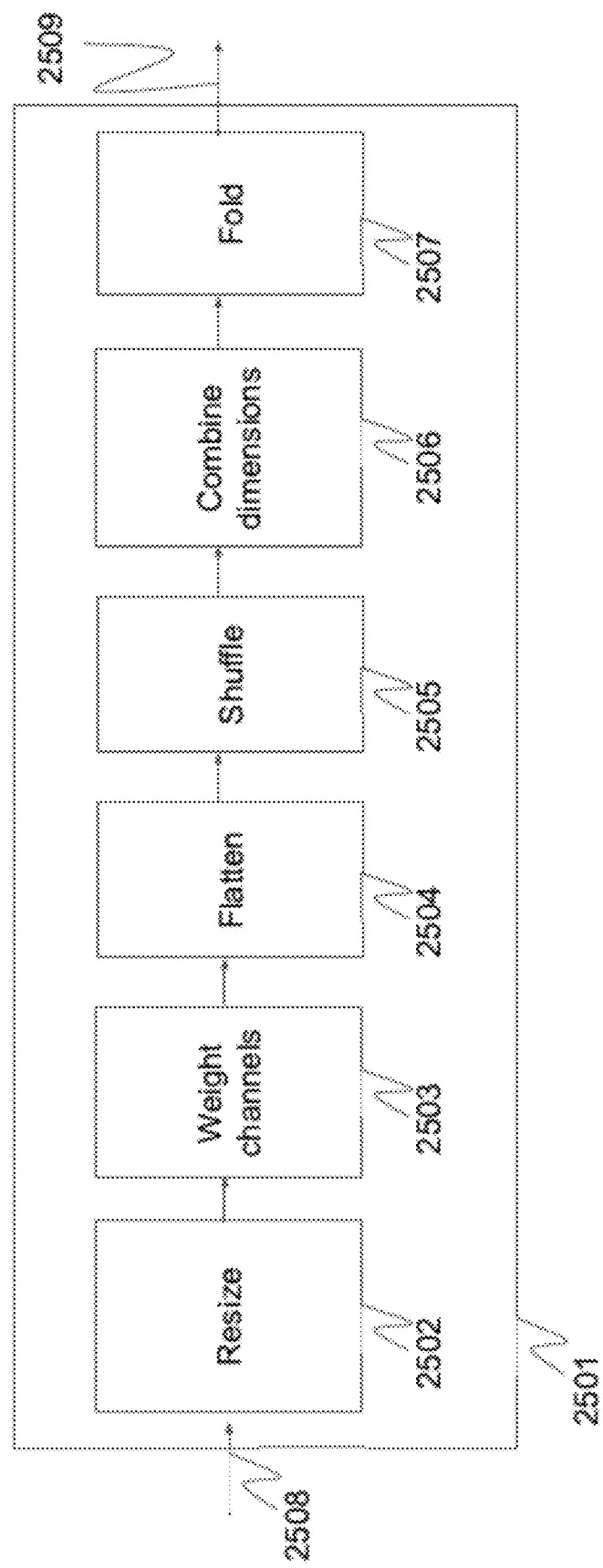
FIG. 25 is a diagram of an example process for generating a color-sensitive fingerprint.

FIG. 25 is a process 2501 for generating a color-sensitive fingerprint. The process 2501 may be used to detect minute differences in coloration between the proxy footage and source footage that may not otherwise be detectable by human users.

The process 2501 may include an operation 2502 of resizing the image frame 2508 received as input. The image frame 2508 may be resized to a standardized size, such as but not limited to 256×256 pixels. Other implementations may resize the image frame 2508 to a different standard size.

The process 2501 may include an operation 2503 in which weighting is applied to each channel of the color space of the resized image. The pixel values of each color channel may be multiplied by a predetermined weight. In one implementation, the image implements the Red Green Blue (RGB) color space and multiplies each channel by the predetermined weight [0.1, 0.7, 0.2]. Each channel is multiplied by a particular weight to scale the pixel value associated with that channel. The example weights and color space shown here show one possible implementation, but other color spaces and channel weighting may be applied in other implementations.

The process 2501 may include an operation 2504 of flattening the matrix representing the resized and weighted image output by operation 2503 into a vector.

The process 2501 may include an operation 2505 of shuffling the elements of the vector produced by the operation 2504. The elements of the vector are shuffled using a predetermined shuffling routine so that the same reordering occurs each time that the operation 2505 is performed on a vector. The shuffling of the elements ensures that any correlation between pixel adjacency and vector element adjacency is eliminated.

The process 2501 may include an operation 2506 of reducing the dimensionality of the vector. FIG. 24 provides an example dimension reduction process 2401 that may be used to implement operation 2302.

The process 2501 may include an operation 2507 of folding the vector output by operation 2506. An example of the folding process is shown in FIG. 12. The folding process may fine tune the sensitivity of the fingerprint matching and improve the storage requirements for the fingerprint. The fingerprint 2509 may be output by the process 2501.

Figure 19A:
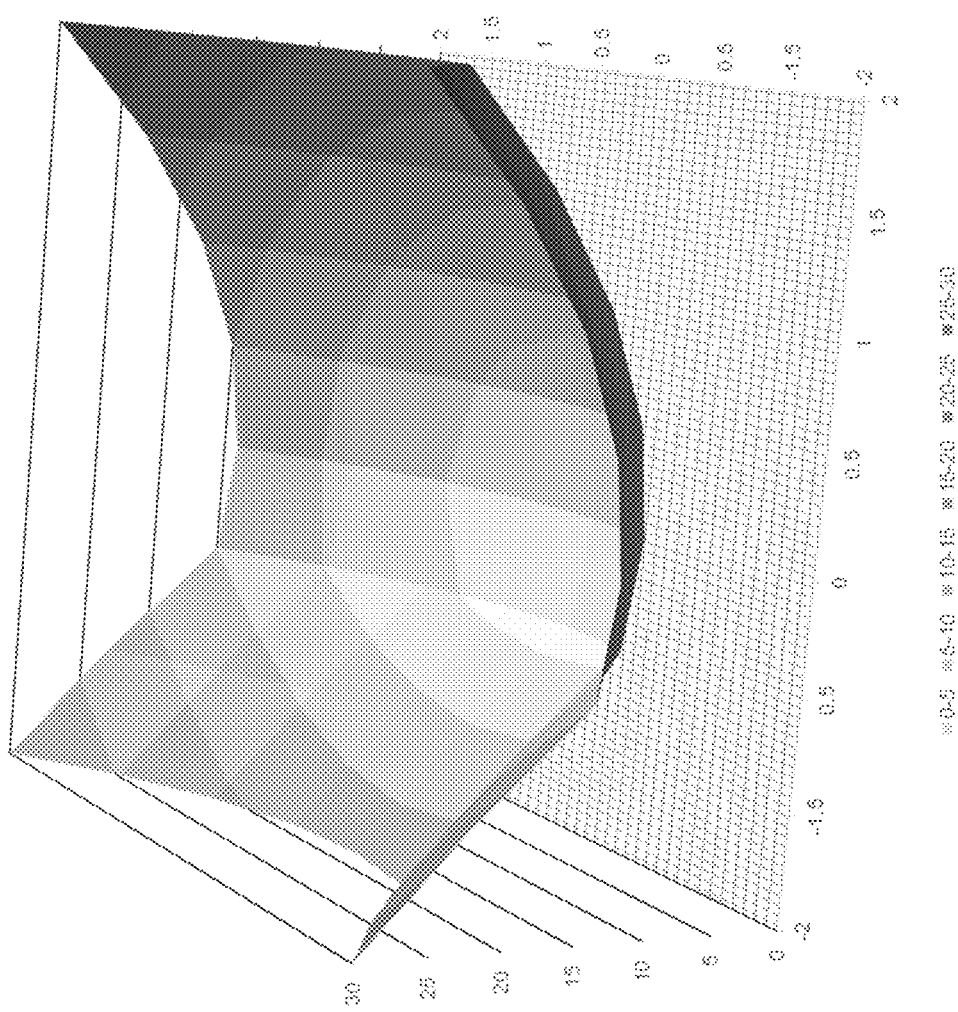
FIGS. 19A, 19B, 19C, 19D are diagrams showing example fingerprint visualizations.
Figure 19B:
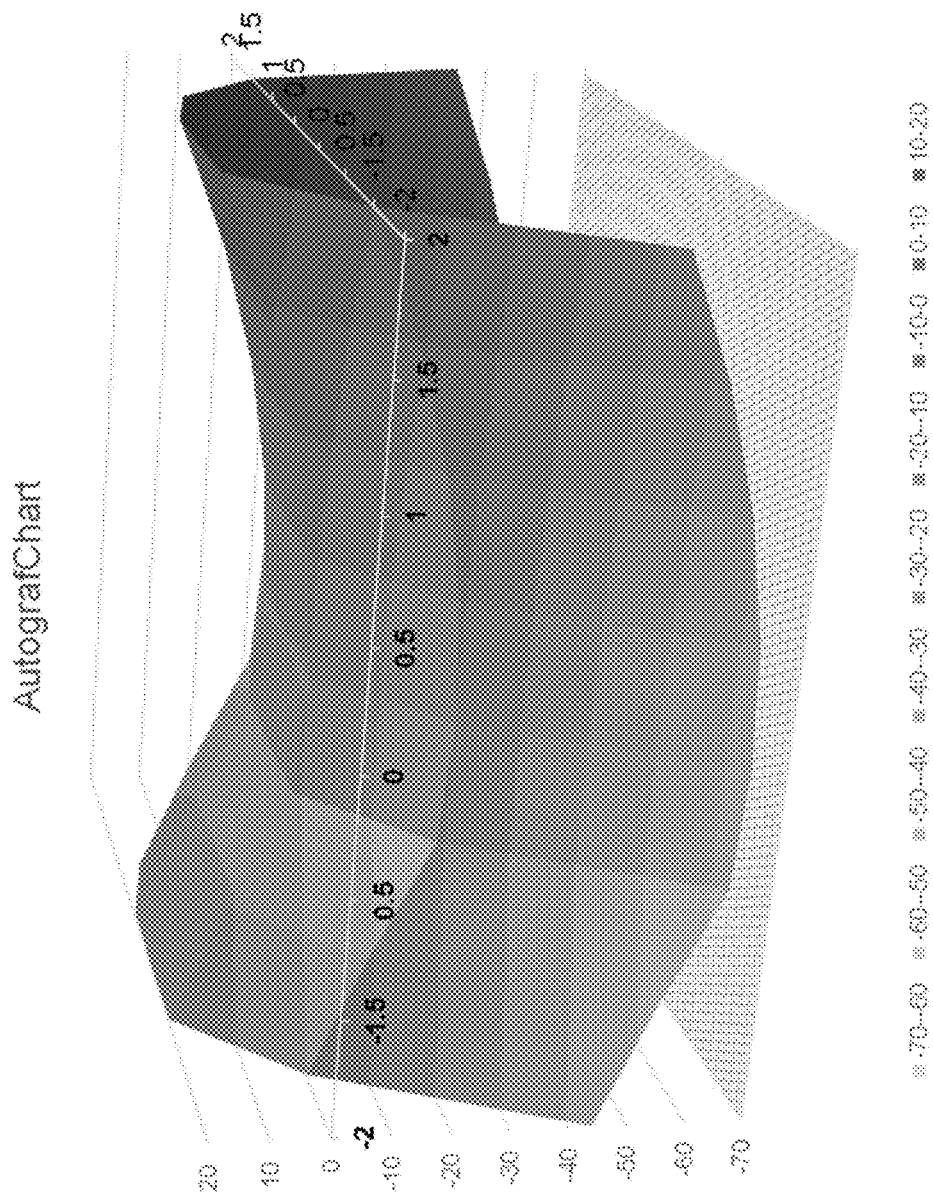
Figure 19C:
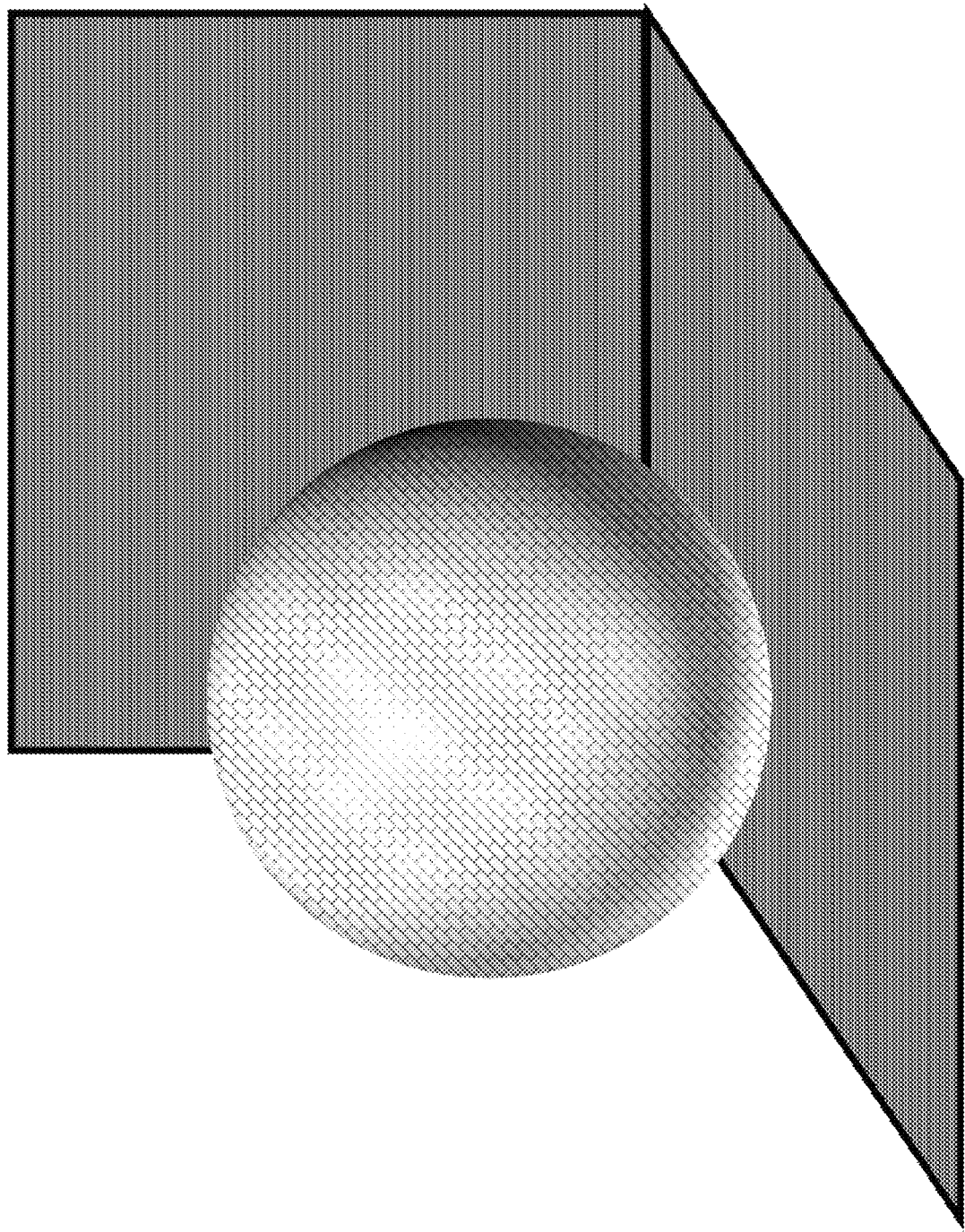
Figure 19D:
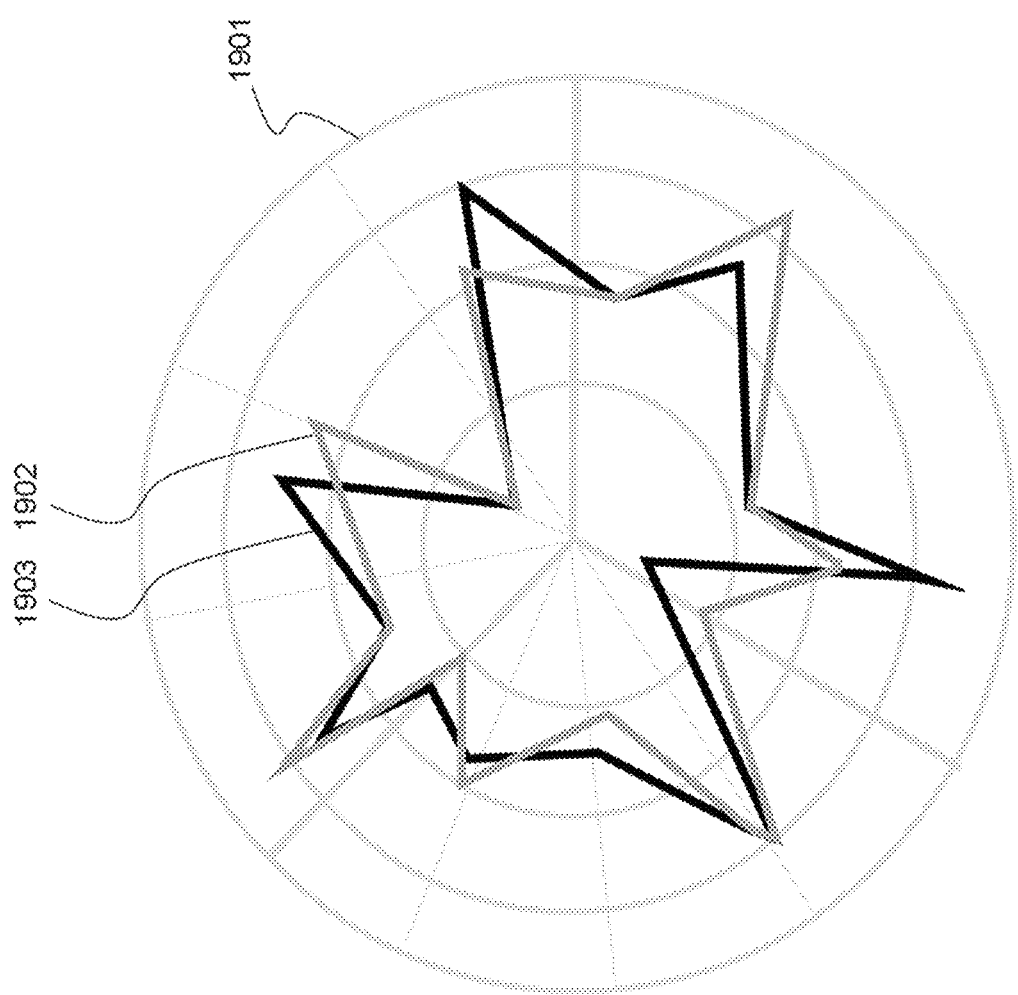
Figure 26:
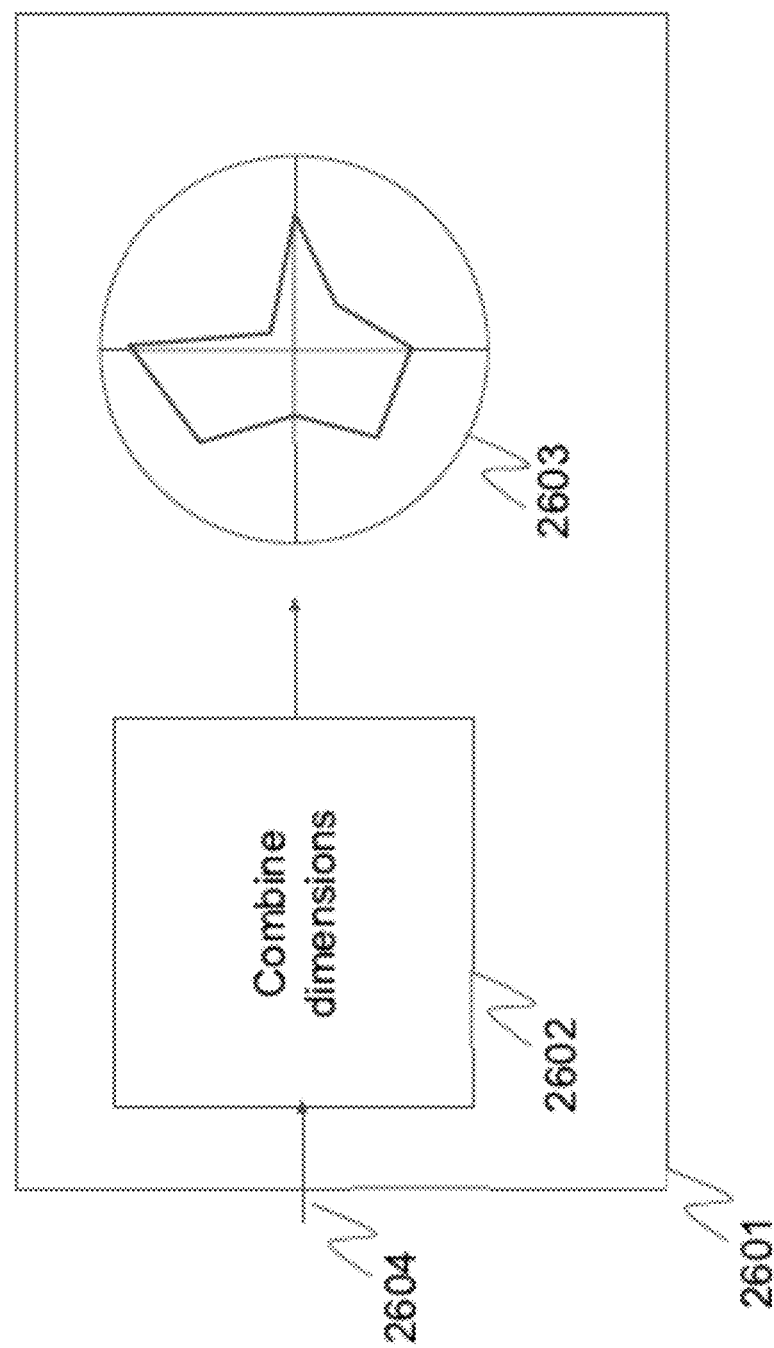
FIG. 26 is a diagram of an example process for generating a visual representation of a fingerprint.

FIG. 26 is a diagram of a process 2601 for generating a visual representation of a fingerprint. The process 2601 may take a fine-grain fingerprint as the input 2604. The process 2601 may include an operation 2602 of combining dimensions of the fingerprint to reduce the number of dimensions of the fingerprint to be represented in the visualization of the fingerprint. The process 2601 may include an operation 2603 of generating a visual graphical representation of the fingerprint. The visual representation may be a 2D or 3D representation of the fingerprint that a user may view to understand attributes of the fingerprint. FIGS. 19A. 19B, 19C, and 19D show three additional types of visualizations of fingerprints that may be provided. FIGS. 19A, 19B, and 19C are 3D examples of fingerprints. FIG. 19D is an example of an 2D visualization 1901 that shows a plot 1902 of the attributes of a references frame from the proxy footage and a plot 1903 of a candidate frame from the source footage. The visualization 1901 provides a visual representation of the attributes of the two frames that allows a user to quickly identify similarities and differences between the two frames of footage. While the fingerprint example shown in FIG. 19D shows a comparison of a frame of proxy footage with a frame of source footage, the fingerprint techniques and the visualizations generated therefrom may be used to provide a visual comparison of the attributes of other types of images as well.

Figure 27:
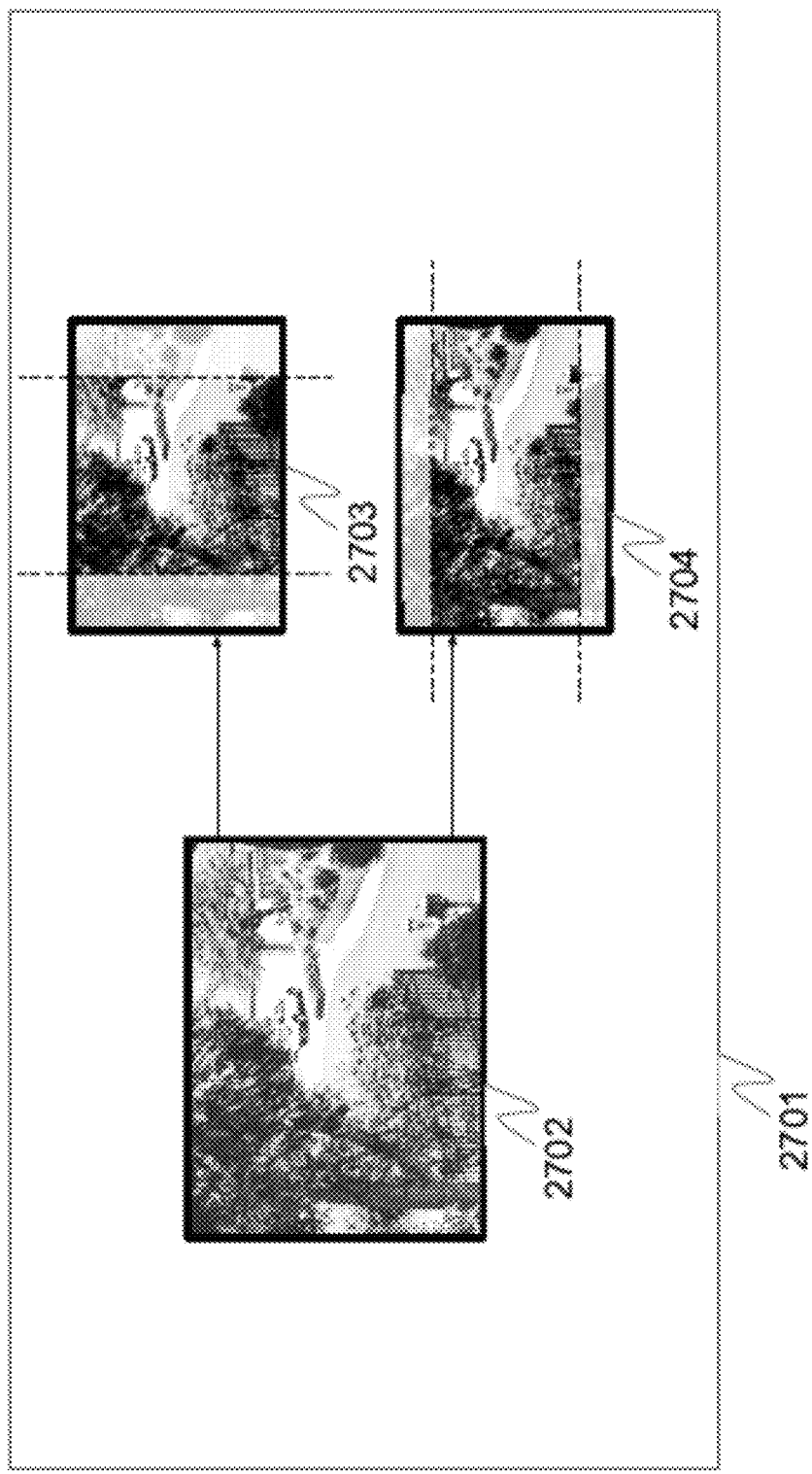
FIG. 27 is a diagram of a process for resizing and cropping a frame of footage.

FIG. 27 is a diagram of a process 2701 for resizing and cropping a frame of footage. The process 2701 may receive an input frame 2702 of any resolution. The process 2701 includes two operations that may be performed on the input frame 2702 in any order. The operation 2703 is a first cropping of the input frame 2702. In the first operation, the input frame is cropped in a tall aspect ratio. The specific aspect ratio represents the minimum aspect ratio for which matching is supported. A common number may be a 4:3 aspect ratio. Next the cropped image is resized to be as small as possible such that the number of pixels is still greater than a constant A such as A=250,000. The operation 2704 is a second cropping of the input frame 2701. In the second operation 2704, the input frame is cropped and scaled as in the first operation except using an ultra-wide aspect ratio such as 3:1. This aspect ratio represents the widest possible aspect ratio with which AFCM system may perform matches. The two resized and cropped images may be used in the various fingerprinting and matching techniques provided in the preceding examples.

Figure 28:
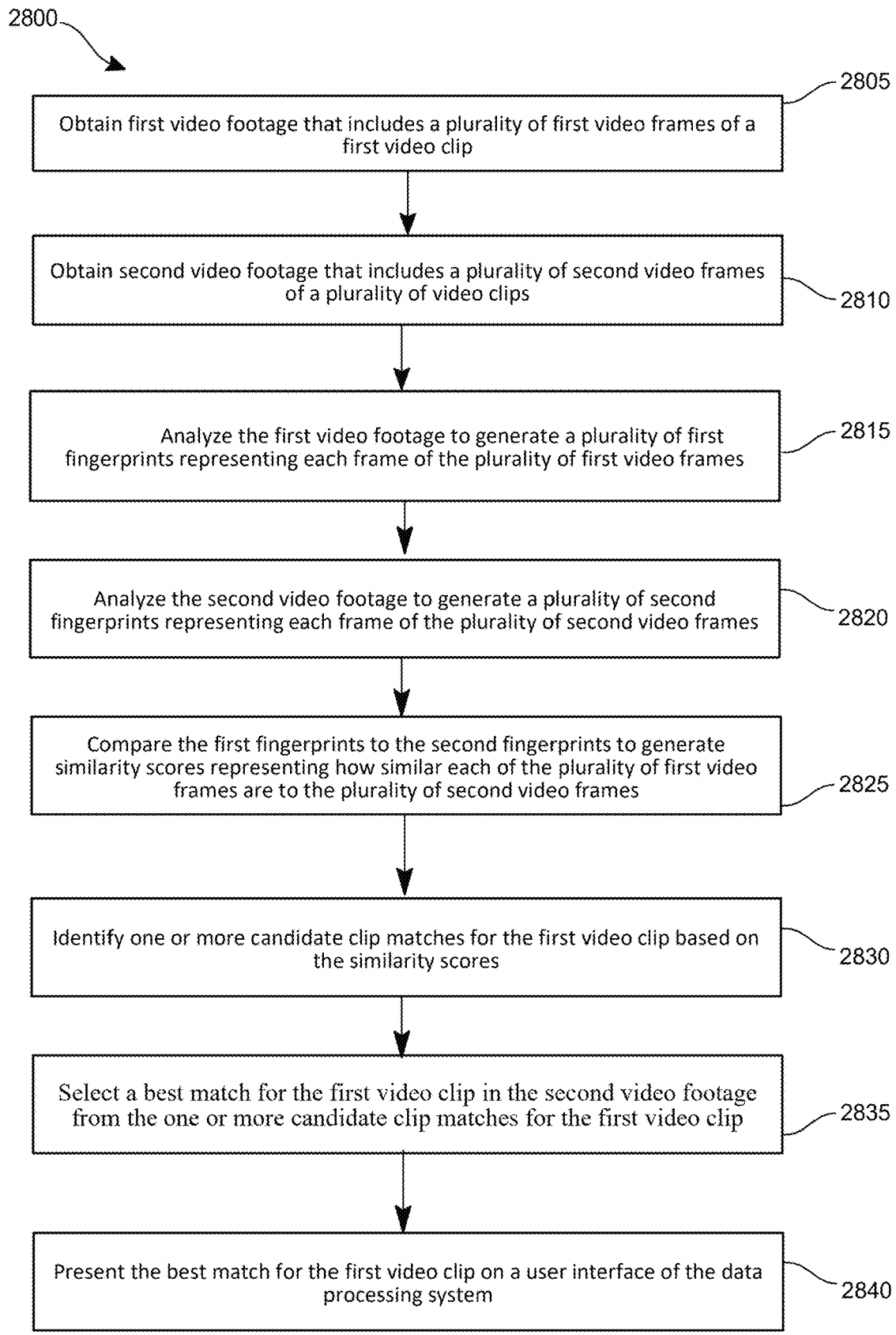
FIG. 28 is a flow diagram of an example process for matching proxy footage to source footage.

FIG. 28 is a flow chart of an example process 2800 for matching proxy footage 120 to source footage 117. The process 2800 may be implemented by the AFCM system 100 discussed in the preceding examples.

The process 2800 may include an operation 2805 of obtaining first video footage that includes a plurality of first video frames of a first video clip. The first video footage may be proxy footage 120 as discussed in the preceding examples or other footage for which matching footage is being sought. The first video footage may include a plurality of frames of video and at least one video clip for which matching footage is being sought. The first video footage may be video footage that has been selected by a user and for which another version of the video footage is being sought. For example, the user may be attempting to identify source footage from which the first video footage has been derived.

The process 2800 may include an operation 2810 of obtaining second video footage that includes a plurality of second video frames. The second video footage may be source footage 120 as discussed in the preceding examples. The second video footage may include a plurality of frames. The second video footage may include frames associated with a plurality of scenes captured for a video production. The second video footage may be higher-resolution footage than the first video footage, and the first video footage may be derived from the second video footage.

The process 2800 may include an operation 2815 of analyzing the first video footage to generate a plurality of first fingerprints representing each frame of the plurality of first video frames. The fingerprint generation unit 2901 shown in FIG. 29 may be configured to analyze each frame of the first video footage and to generate a fingerprint for each of the frames according to the fingerprint generation techniques provided herein. The fingerprint generation unit 2901 may store the plurality of first fingerprints in the fingerprint indexed datastore 304.

The process 2800 may include an operation 2820 of analyzing the second video footage to generate a plurality of second fingerprints representing each frame of the plurality of second video frames. The fingerprint generation unit 2901 may also generate fingerprints for each of the frames of the second video footage. The fingerprint generation unit 2901 may also store the plurality of first fingerprints in the fingerprint indexed datastore 304.

The process 2800 may include an operation 2825 of comparing the first fingerprints to the second fingerprints to identify one or more candidate clip matches for the first video clip in the second video footage. The matching unit 2902 shown in FIG. 29 may perform a matching operation to identify one or more candidates for the first video clip as discussed in the examples described herein.

The process 2800 may include an operation 2830 of comparing the first fingerprints to the second fingerprints to generate similarity scores representing how similar each of the plurality of first video frames are to the plurality of second video frames. The matching unit 2902 may calculate a score matrix and/or one or more pseudo-probability matrices that represent how similar each of the first video frame and the second video frames are. The similarity scores and/or the one or more pseudo-probability matrices may be determined using the various matching techniques described herein.

The process 2800 may include an operation 2835 of identifying one or more candidate clip matches for the first video clip based on the similarity scores. Once the similarity scores have been determined, the matching unit 2902 may identify one or more clips of video footage that may be a match for the first video clip. The matching unit 2902 may identify more than one potential match for the first video clip, because the second video footage may include multiple clips that may be quite similar. For example, a scene in a video production may be captured in multiple takes which are quite similar, and the first video clip may be derived from one of these takes.

The process 2800 may include an operation 2840 of selecting a best match for the first video clip in the second video footage from the one or more candidate clip matches for the first video clip. The matching unit 2902 may select a best match for the first video clip based on the various techniques discussed herein. For example, where a scene has been captured in multiple takes and the first video clip is derived from footage of one of these takes, the matching unit 2902 may identify the subtle similarities between the first video clip and a particular take to identify the correct source footage.

The process 2800 may include, in the operation 2840, presenting the best match for the first video clip on a user interface of the data processing system. The AFCM system 100 may provide a user interface for displaying the video clip of the second video footage which matched the first video clip. The user interface may provide means for the user to saving a copy of the video clip of the second video clip, to generate a report identifying a location of the first video clip in the second video footage, and/or to perform other actions on the video clip of the second video footage.

Figure 29:
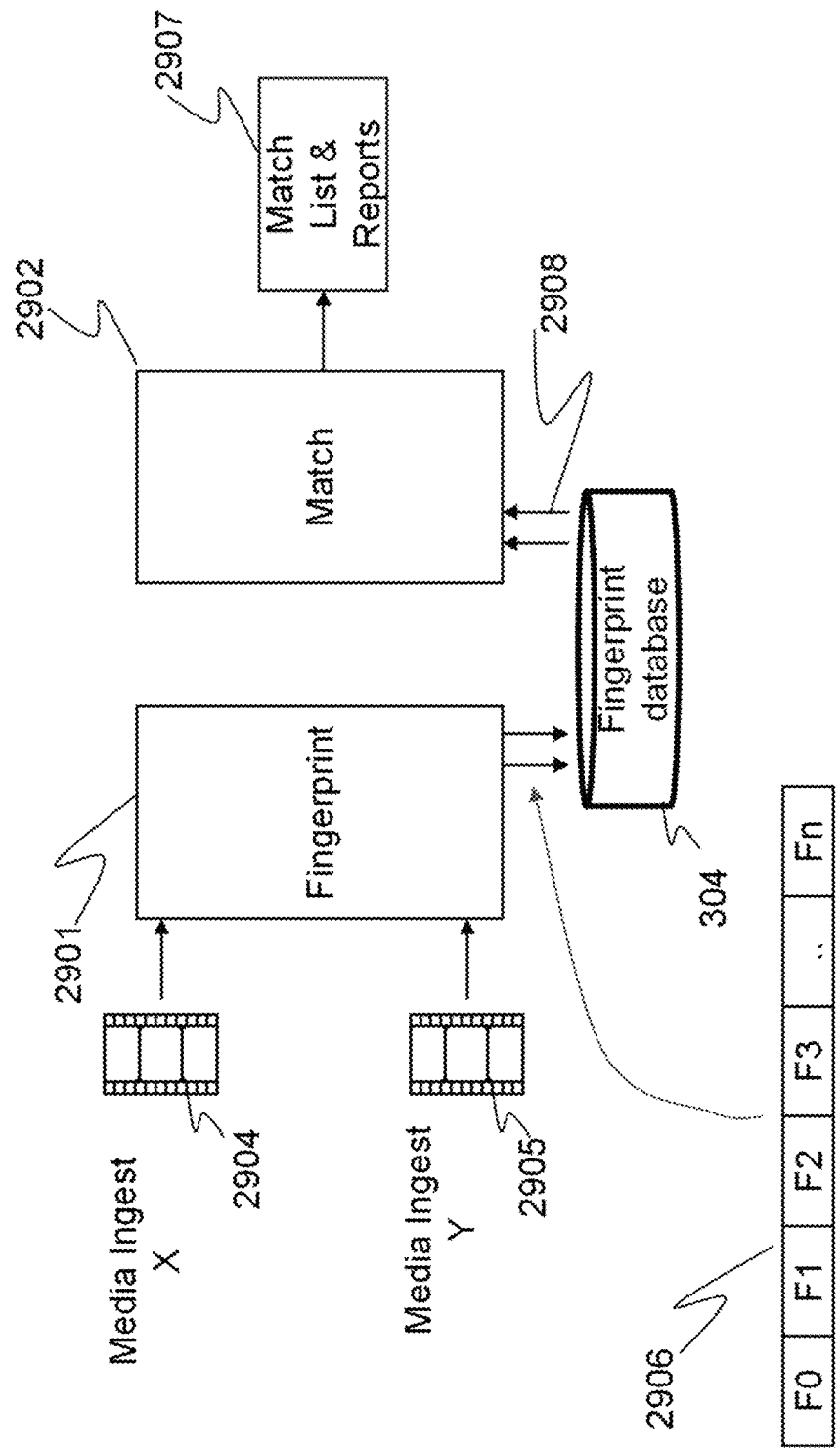
FIG. 29 is a diagram showing details of fingerprint generation and using the fingerprints generated to perform a matching operation.

FIG. 29 is a diagram showing details of fingerprint generation and using the fingerprints generated to perform a matching operation. The matching operation in this example is performed on first media 2904 and second media 2905. The first media 2904 may be first video footage that includes one or more frames of footage for which a match in the second media 2905 is being sought. The second media 2905 may be second video footage that includes multiple frames of footage. The first media 2904 may include frames associated with one or more clips of video footage that are being sought in the footage of the second media 2905. The first media 2904 may be proxy footage 117 or other footage for which a matching frames and/or clips of footage in the second media 2905 are being sought. The second media 2905 may be source footage 117 and/or other footage in which frames and/or clips of footage matching those of the first media 2904 are being sought. The AFCM system 100 may provide a user interface configured to allow a user to specify the first media 2904 identifying the content being sought and the second media 2905 to be searched for matches.

In the example shown in FIG. 29, the first media 2904 and second media 2905 are ingested by the AFCM system 100 and provided to the fingerprint generation unit 2901. The fingerprint generation unit 2901 may implement the process 500 shown in FIG. 5 for generating a fingerprint of a source image, such as a frame of proxy footage 120 or source footage 117. The fingerprint generation unit 2901 may be configured to generate a fingerprint for each of the frames of footage, and to store the fingerprints in the fingerprint indexed datastore 304.

In this example, the fingerprints 2908 for the first media 2904 may be passed to the matching unit 2902 and the match unit 2902 may search the fingerprint indexed datastore 304 for matches from the second media 2905. The first media 2904 may be proxy footage 117 and/or other footage for which matching frames and/or clips are being sought in the second media 2904. The matching unit 2902 may be configured to identify one or more frames, and/or one or more clips of the second media 2905 that match the first media 2904. The matching unit 2902 may generate a match list and reports 2907. The match list identifies the locations of the matching frames and/or clips of the second media 2905 that match one or more frames or clips of the first media 2904. The match unit 2902 may also generate reports identifying frames and/or clips included in the first media 2904 for which a match could not be found in the second media 2905. Additional details of the matching operations that may be performed by the matching unit 2902 are provided in the examples which follow.

Figure 30:
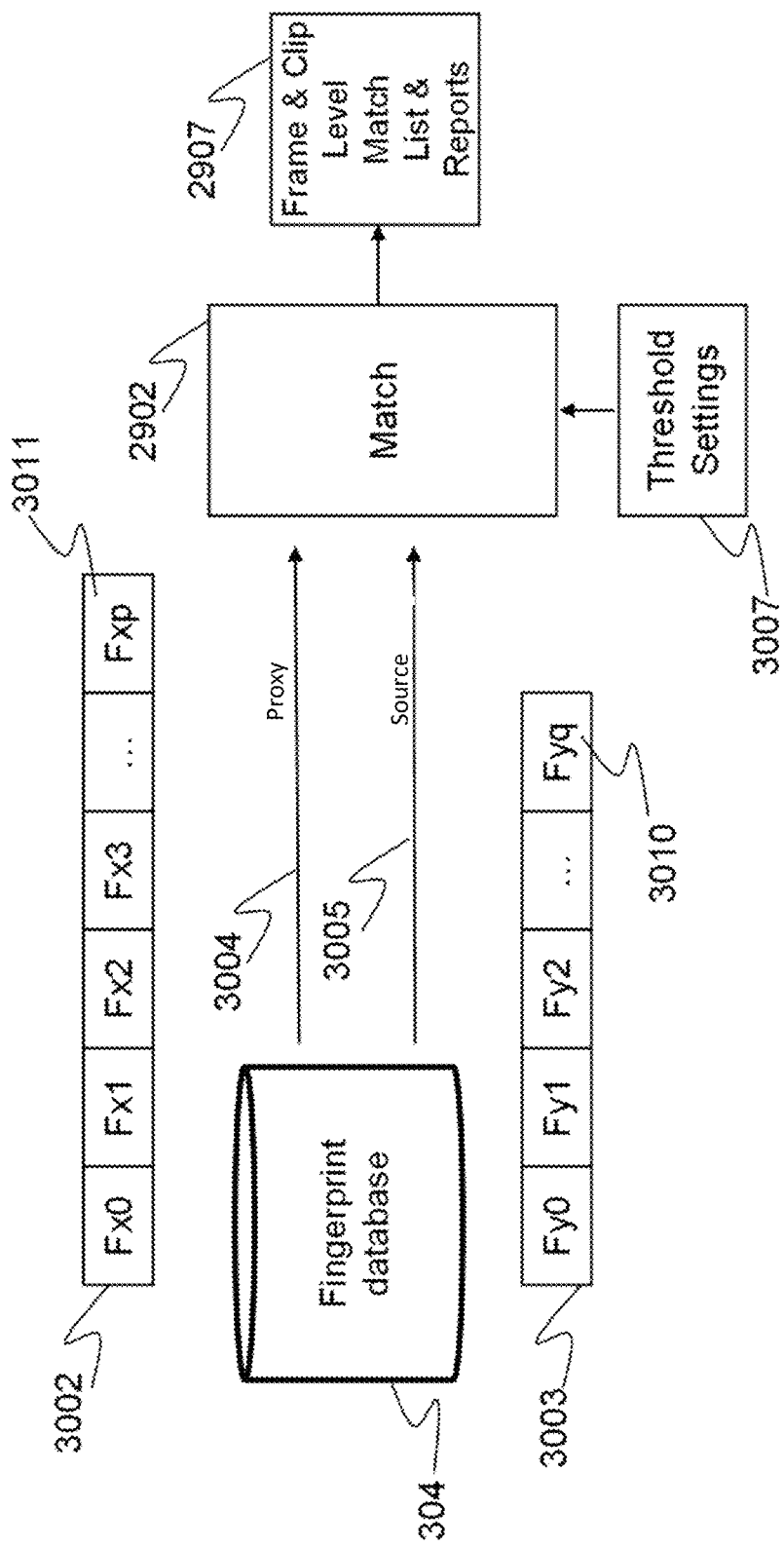
FIG. 30 is a diagram that shows additional details of the matching operations that may be performed by the matching unit shown in FIG. 29.

FIG. 30 is a diagram that shows additional details of the matching operations that may be performed by the matching unit 2902. In this example, the first media 2904 is proxy footage which has been converted to fingerprints 3004 by the fingerprint generation unit 2901, and the second media 2905 is source footage which has been converted to fingerprints 3005 by the fingerprint generation unit 2901. The fingerprints 3004 and 3005 have been stored in the fingerprint indexed datastore 304. The fingerprints 3004 include p fingerprints, where p is a positive integer. The fingerprints 3004 include a first proxy fingerprint 3002 representing the first frame of the proxy footage and a final proxy fingerprint 3011 representing the final frame of the proxy footage. The fingerprints 3005 include y fingerprints, where y is a positive integer. The fingerprints 3005 include a first source fingerprint 3003 representing the first frame of the source footage and a final source fingerprint 3010 representing the final frame of the proxy footage. The matching unit 2902 analyzes the fingerprints 3004 representing the proxy footage and attempts to find matches in the fingerprints 3005 representing the source footage. The matching unit 2902 may take into account threshold settings 3007 for determining how similar a fingerprint of the proxy footage and the source footage must be before determining that the frame of proxy footage is a match candidate. Additional details of the threshold settings 3007 are discussed with respect to the example implementations which follow. The matching unit 2902 may output the match list and reports 2907 as discussed in the preceding examples.

Figure 31:
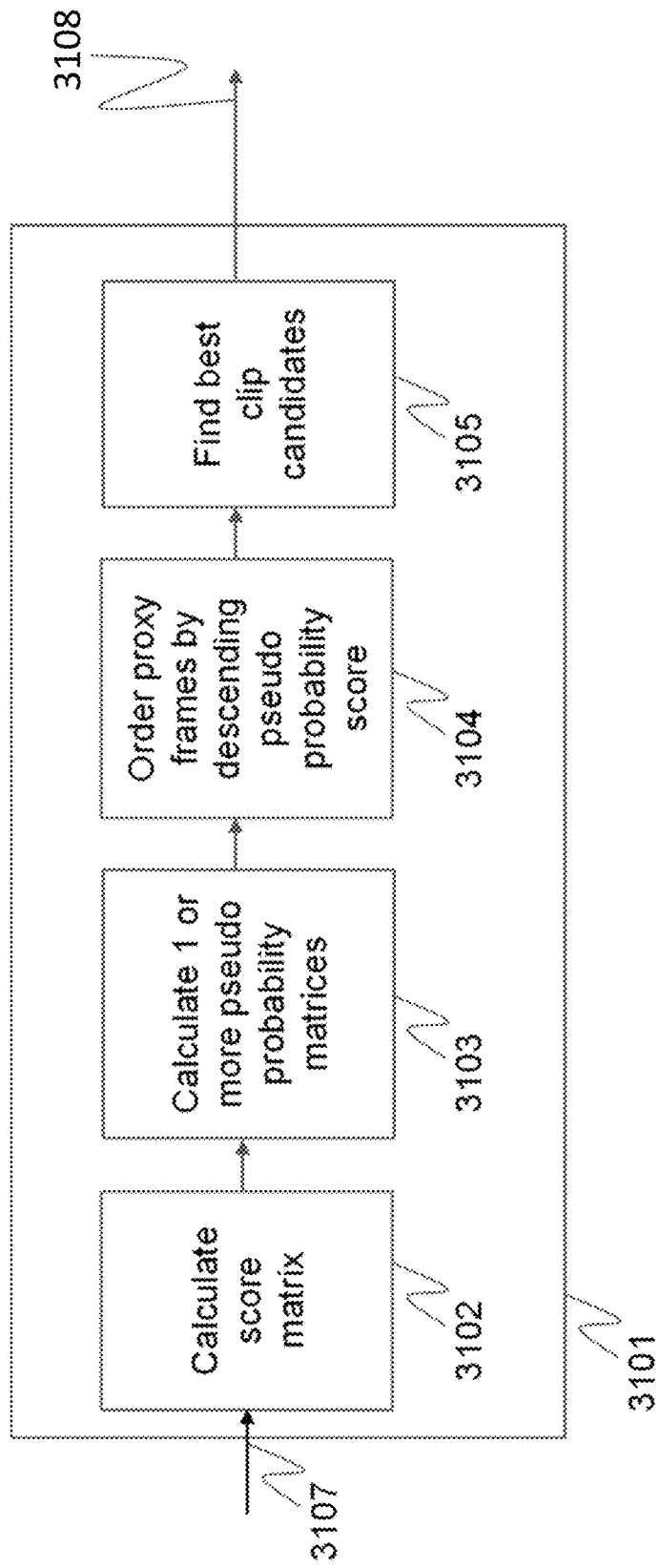
FIG. 31 is a diagram of a process for performing a matching operation.

FIG. 31 is a diagram of a process 3101 for performing a matching operation. The matching unit 2902 may be configured to perform the process 3101 shown in FIG. 31 to identify matches between one or more clips and/or frames of proxy footage 120 and source footage 120 in which frames and/or clips included in the proxy footage 120 are being sought.

The process 3101 receives an input 3107 that identifies the proxy footage 120 and the source footage 117 for which the matching operation is to be performed. As discussed in the preceding examples, the AFCM system 100 may provide a user interface that is configured to allow the user to identify the proxy footage 120 and the source footage 117 for which the matching operation is to be performed. The proxy footage 120 and the source 117 are processed by the fingerprint generation unit 2901 to generate the fingerprints of the proxy footage 120 and the source footage 117 if the fingerprints have not already been generated for the footage. The fingerprints may be stored in the fingerprint indexed datastore 304. The matching unit 2902 may be configured to obtain the fingerprints from the fingerprint indexed datastore 304 and provide them as an input to the process 3101.

The process 3101 may include an operation of calculating a score matrix 3102. A score matrix S is an M×N matrix, where M represents a number of frames included in the proxy footage 120 and N represents a number of frames included in the source footage 117. Each cell $S_{ij}$ of the score matrix includes a similarity score of the ith proxy frame with the jth source frame. The similarity score for each cell is determined based on the fingerprints associated with the proxy frame and source frame associated with that cell of the score matrix. The similarity score for each cell may be determined based on the cosine distance between the proxy frame and the source frame associated with the cell.

Figure 34:
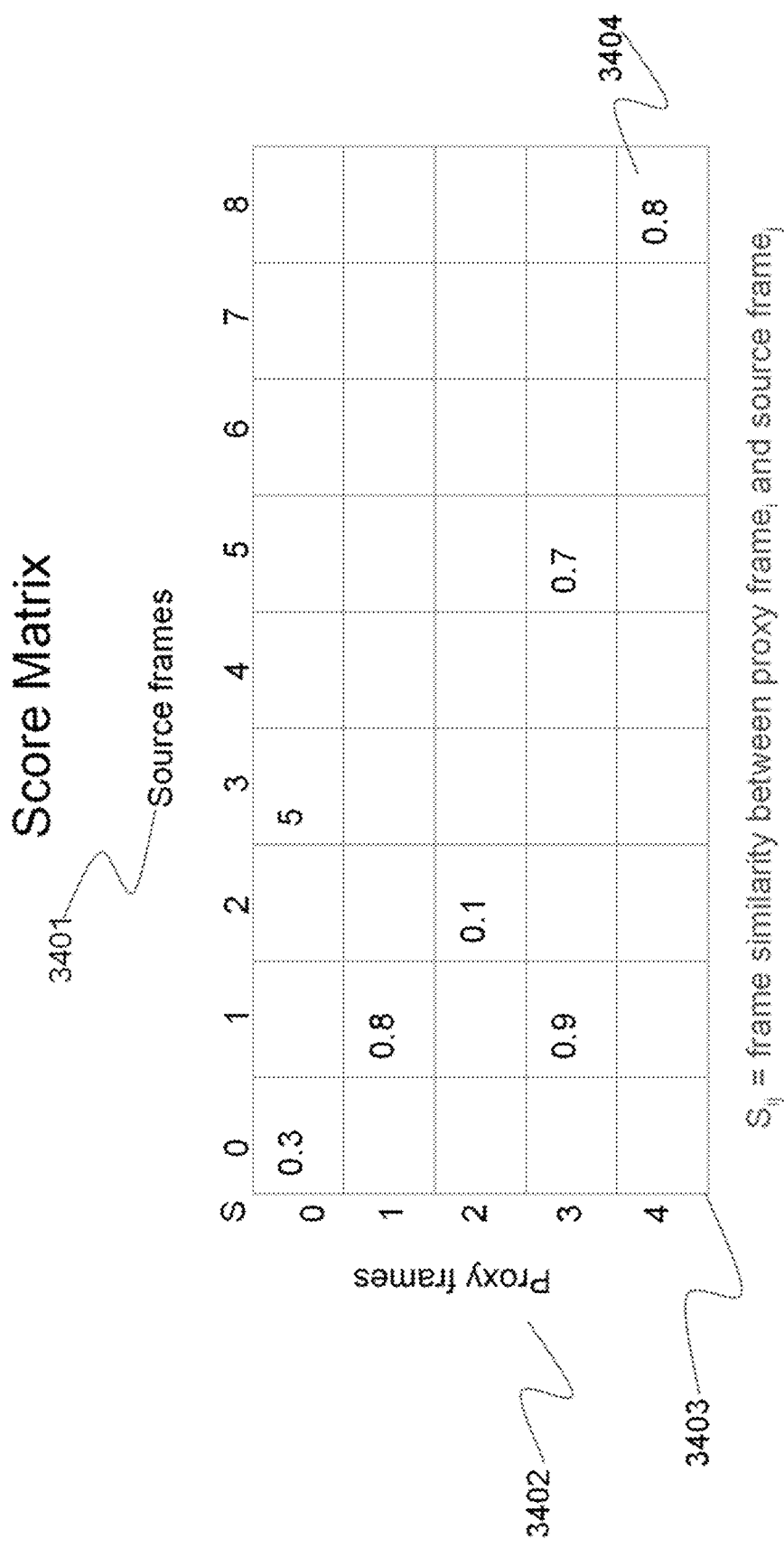
FIG. 34 is a diagram of an example score matrix.

FIG. 34 is a diagram of an example score matrix 3403. The rows of the score matrix 3403 each represent a proxy frame 3402 of the proxy footage 117. The columns of the score matrix 3403 each represent a respective source frame 3401 of the source footage 120. Each proxy frame 3402 is compared to each source frame 3401, and a similarity score is included populated in cells where the proxy frame and the source frame exceed a similarity threshold. Example score 3404 represents the similarity score of proxy frame 4 and source frame 8. The cells which are blank are associated with a proxy frame and source frame pair that was not sufficiently similar to cause the matching unit 2902 to determine a similarity score. As discussed above, an LSH operation or other heuristic means may be used to determine whether the source frame and the proxy frame are sufficiently similar to cause the matching unit 2902 to determine the similarity score. In other implementations, a similarity score may be determined for each of the cells of the score matrix 3403.

In some implementations, the score matrix may be a sparse matrix, and a similarity score may only be calculated for the fingerprints of the proxy frame and the source frame pairs that are sufficiently similar. This determination may be performed heuristically. In some implementations, an LSH operation may be applied to the fingerprints of the proxy frame and the source frame to determine whether the two frames are sufficiently similar for determining a similarity score. The LSH operation may group similar frames into a same "bucket" and group frames that are not similar into separate buckets. If the proxy frame and the source frame for a particular cell are grouped into the same bucket, the similarity score for that cell of the score matrix may be determined. Other threshold calculations may be performed for determining whether the proxy and source frames are sufficiently similar for determining the similarity score.

Figure 32:
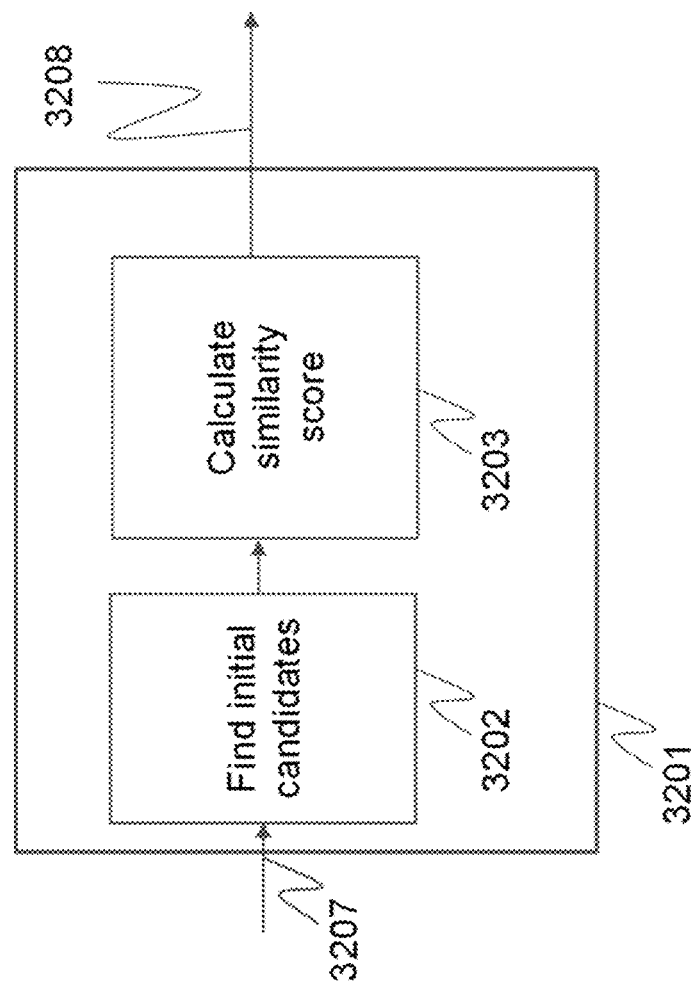
FIG. 32 is a diagram of an example process 3201 that may be used to calculate the score matrix in the process shown in FIG. 31.

FIG. 32 is a diagram of an example process 3201 that may be used to calculate the score matrix in operation 3102 of process 3101. The input 3207 to the process 3201 includes the fingerprints of the proxy footage 120 and the source footage 117. The process 3201 may perform an operation of finding initial candidates 3202 in which at least at least a subset of the pairs of proxy frames and source frames that may be included in the score matrix is selected based on the respective proxy frame and source frame satisfying a similarity threshold. As discussed above, the initial candidates may be selected by performing an LSH operation on the proxy frames and source frames to identify pairs of source and proxy frames to serve as candidates for further processing. The process 3201 may also include an operation of calculating a similarity score for the pairs of source and proxy frames selected in operation 3203. The output 3208 of the process 3201 is a score matrix, such as the score matrix 3403 shown in FIG. 34.

Returning now to FIG. 31, the process 3101 may include an operation of calculating one or more pseudo-probability matrices 3103. The purpose of the pseudo-probability matrixes is to represent the probability that any given frame level match candidate is indeed a match. Multiple pseudo-probability matrices may be calculated to account for potential inaccuracies in one or more of the calculated pseudo-probability matrices. In some implementations, the multiple pseudo-probability matrices may include a normalized pseudo-probability matrix and a denormalized pseudo-probability matrix. The pseudo-probability matrices may be calculated using one or more algorithms for estimating the probability that a particular frame level candidate match is a match. The particular algorithm used for determining the probability may vary from implementation to implementation. A normalized and denormalized pseudo-probability matrix may be calculated for each of the algorithms used to estimate the probability for each frame level candidate match. The estimated probabilities output by a respective algorithm may be used to generate the denormalized pseudo-probability matrix, and the normalized pseudo-probability matrix may be derived from the denormalized pseudo-probability matrix. In the normalized pseudo-probability matrix, the values of each of the cells of each column may be modified so that the sum of the values of each column is equal to 100%.

Figure 35:
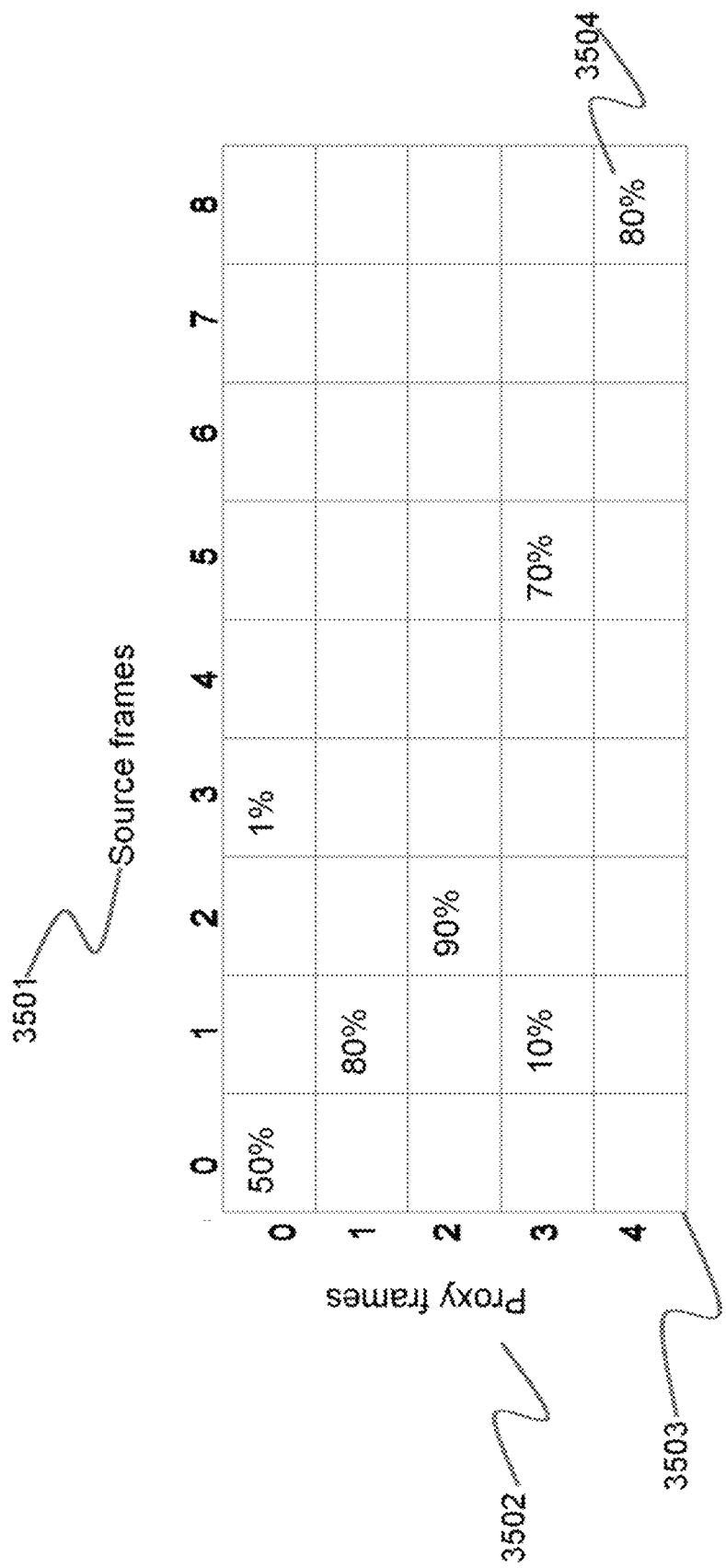
FIG. 35 is an example of denormalized probability matrix.

FIG. 35 is an example of denormalized probability matrix 3503. The rows of the probability matrix 3503 each represent a proxy frame 3502 of the proxy footage 117. The columns of the score matrix 3503 each represent a respective source frame 3501 of the source footage 120. The probability values included in the cells of the probability matrix 3503, such as the example entry 3504, represent a probability that the proxy frame and source frame associated with that cell are a match. A corresponding normalized probability matrix may be generated from the denormalized probability matrix by adjusting the values of the denormalized probability matrix so that each column of values adds up to 100%.

Returning again to FIG. 31, the process 3101 may include an operation 3104 of ordering the proxy frames by descending pseudo-probability score. For each row of the probability matrix, such as the denormalized probability matrix 3503, the values may be sorted from highest to lowest probability matches with a respective one of the source frames. The maximum probability value may be selected for each row representing a proxy frame, and then the remaining pairs of proxy frames and source frames may be sorted by probability. For example, referring to the denormalized probability matrix 3503, the maximum value for each frame is represented by a x, y, and p triplet, where x represents the proxy frame row, y represents the source frame column, and p represents the probability value. Thus, the values for the denormalized probability matrix 3503 would be: [0, 0, 50%], [1, 1, 80%], [2, 2, 90%], [3, 5, 70%], and [4, 8, 80%]. The values may then be reordered according to the probability of a match to be: [4, 8, 80%], [3, 5, 70%], [2, 2, 90%], [1, 1, 80%], and [0,0, 50%].

In instances where both a normalized and denormalized probability matrix are determined, the values each cell of the two matrices may be averaged to determine an overall probability score. In some instances, a weighted average may be used in which either the normalized or denormalized values may be weighted more heavily. Furthermore, in instances where there are more than one normalized and denormalized probability matrices calculated based on the results of multiple algorithms being used to calculate the probabilities, the values of each cell of the multiple denormalized matrices may be averaged to determine an overall denormalized probability matrix, and values of each cell of the multiple normalized probability matrices may be averaged to determine an overall normalized probability matrix. The overall denormalized and normalized may be averages to determine an overall score for each cell. Other techniques for determining a score for each pair of proxy and source frames may be used in other implementations.

The process 3101 may include an operation of finding the best clip candidates 3105. The proxy frame may be part of a clip that includes more than one frame. The clips may be identified using the processes shown in FIG. 33. The process 3101 may then provide the clip candidates selected by operation 3105 as output 3108. The clip candidates may be presented on a user interface of the AFCM system 100 and/or included in a match report generated by the matching unit 2902.

Figure 33:
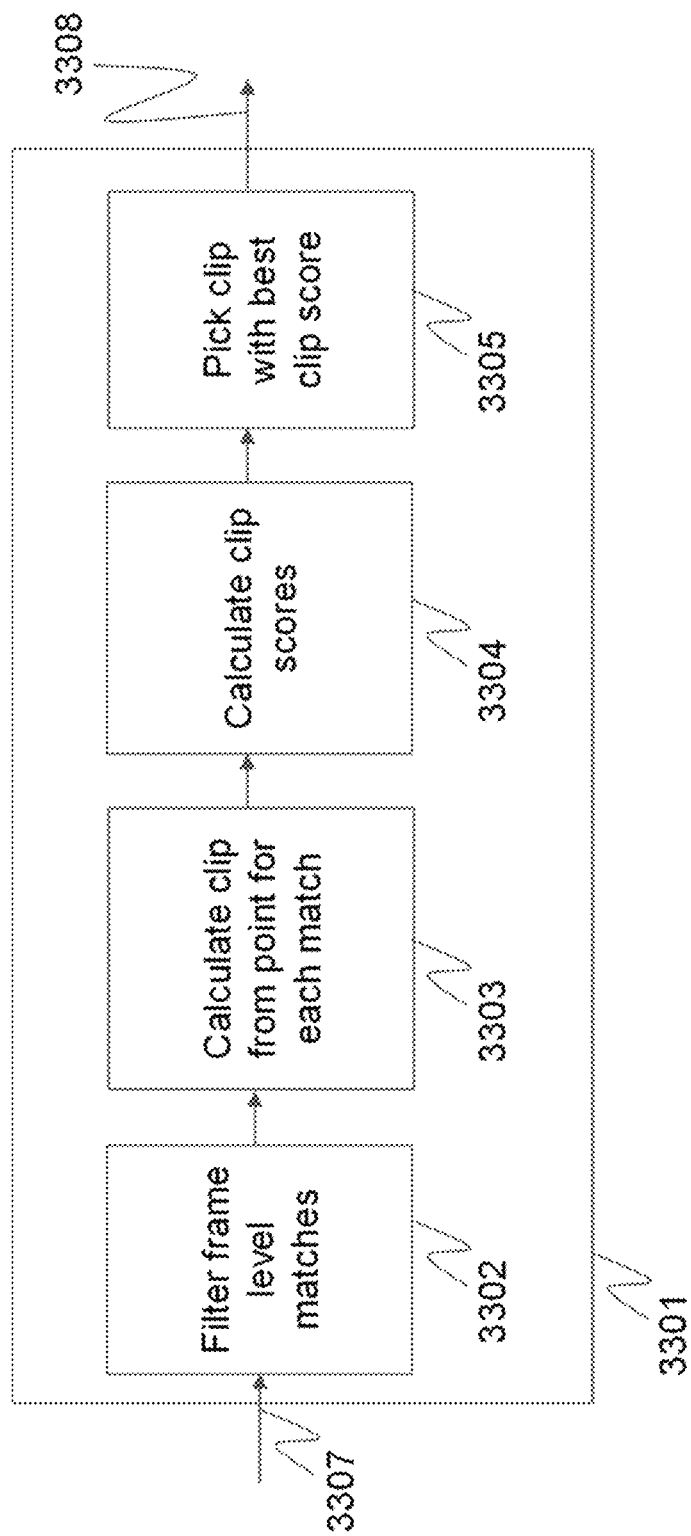
FIG. 33 is a diagram of a process that may be used to finding a best clip candidate in the process shown in FIG. 31.

FIG. 33 is a diagram of a process 3301 that may be used to implement operation 3105 for finding a best clip candidate in the process 3101 shown in FIG. 31. The process 3301 may be implemented by the matching unit 2902. The process 3301 may receive an input 3307 which may include the proxy frames ordered by descending pseudo-probability score output by operation 3104 of the process 3101.

The process 3301 may include an operation 3302 of filtering frame level matches. At least a portion of the candidate frames may be discarded based on the similarity score, the probability matrix or matrices values associated with the frame, or both. The matching unit 2902 may determine whether to discard a candidate from based on threshold information stored in the threshold settings 3007. The threshold settings 3007 may be stored in a persistent memory of the AFCM system 100 and may be configurable by users of the AFCM system 100. The AFCM system 100 may provide a user interface that permits a user to configure the threshold settings to be used for determining whether to discard potential matches. The user interface may provide guidance to the user for selecting an appropriate threshold value or set of values for the needs of the user.

The process 3301 may include an operation 3303 of calculating a clip from a point match of a frame of proxy footage. The clip may be identified by searching for other matching frames that are adjacent to a matching frame. FIGS. 36-39 demonstrate how a clip associated with a matching frame may be identified. The operation 3303 may potentially identify multiple matching clips.

The process 3301 may include an operation of calculating clip scores 3304. Each clip candidate may be analyzed and assigned a clip score that represents how well the clip of proxy footage 120 matches that of the source footage 117. Multiple clips may be very similar, and the scoring process may be used to identify which clip of the source footage 117 is most similar to that of the proxy footage 120. In some implementations, the clip score for the frame may be determined by summing the frame-level similarity scores for each of the frames of the clip. Other techniques for calculating the frame clip scores may also be used in addition to or instead of summing of the frame-level similarity scores.

The process 3301 may include an operation of selecting the clip with the best clip score 3305 and outputting the selected clip as output 3308. In some implementations, the clip having a clip score that represent a best match between the clip of proxy footage 120 and the clip of source footage 117 may be selected. This approach may be used to identify the clip of the source footage 117 that provides the closest match for that of the clip of the proxy footage 120. The differences between clip candidates may be very subtle and would be difficult and time consuming for a human user to attempt to identify the best match for the proxy footage using current tools. The approach provided in the process 3301 may quickly and accurately find the best match.

FIGS. 36-39 are diagrams showing examples of processes for identifying clips associated with a frame. As indicated above, a frame of proxy footage 120 that matches to a frame of the source footage 117 may be part of a clip that includes multiple claims of footage. Where the frame rate of the proxy footage 120 and the frame rate of the source footage 117 have a 1:1 correspondence, the clips may be identified by searching along diagonals within the score matrix 3503 and/or the pseudo-probability matrices to identify other frames of the proxy footage 120 and source footage 117 that matched. The clips may be identified by analyzing values along the diagonals of the matrices as shown in the examples which follow. Adjacent matching frames will be disposed along the diagonals of the matrices where the frame rates of the proxy footage 120 and the source footage 117 are the same.

Figure 36:
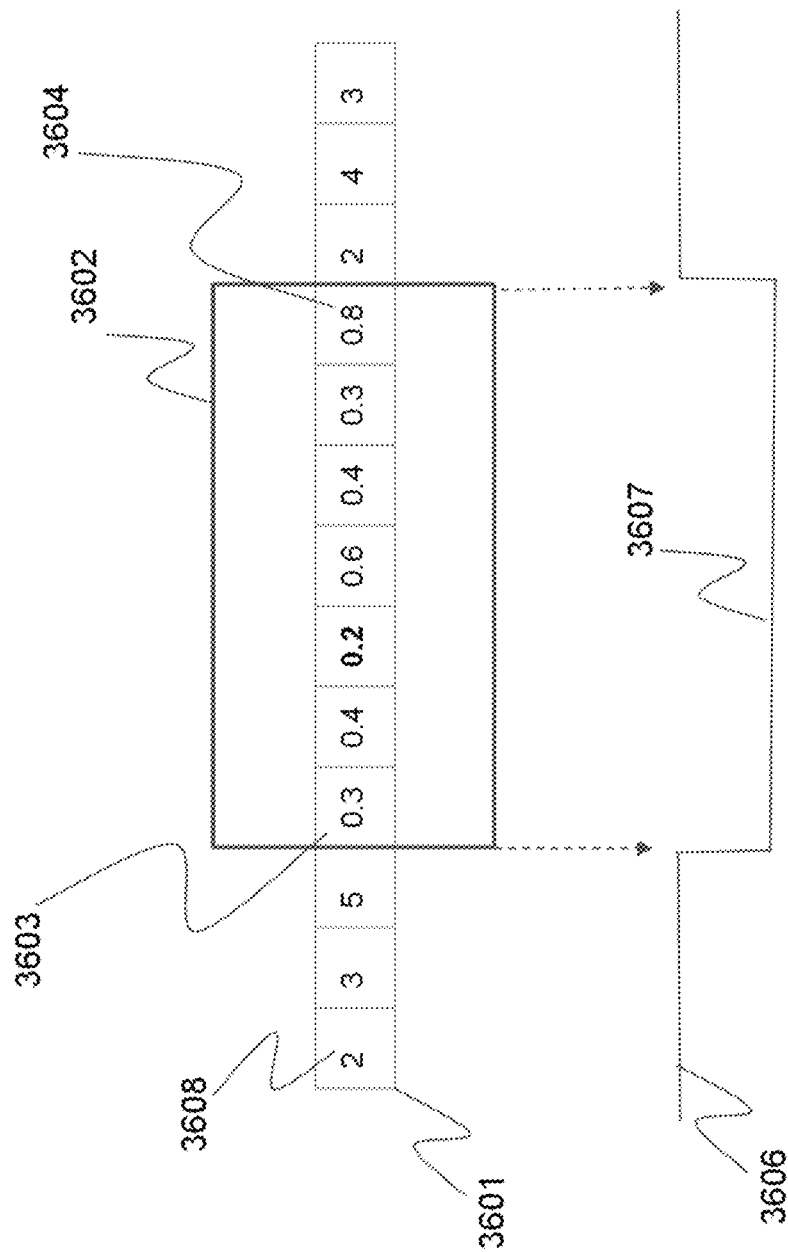
FIG. 36 shows an example process for identifying clip candidates from the source footage that match the clips in the proxy footage.

FIG. 36 shows an example of how the matrix values along a diagonal may be analyzed to identify clip candidates from the source footage 117 that match the clips in the proxy footage 120. In the example shown in FIG. 36, an array 3601 of values from a diagonal set of cells of a score matrix, such as the score matrix 3503. The length of the array 3601 depends upon the size of the score matrix, which in turn depends upon the number of proxy frames 120 and the number of source frames 117 that have been compared to generate the score matrix. The diagonal may be selected from the score matrix where the diagonal includes one or more non-blank cells that include a similarity score determined as discussed in the preceding examples. In the example shown in FIG. 36 there are similarity scores, such as the example score 3608, for each of the elements of the array. However, the score matrix may be sparsely populated, and at least some of the cells may be blank if the similarity of the proxy frame and source frame associated with that cell did not meet the threshold conditions discussed in the preceding examples. In the example shown in FIG. 36, the similarity score is lower for cells where the proxy frame and the source frame are more similar.

The values of the array 3601 may be evaluated to identify the frames comprising the clip. The similarity values at cell preceding cell 3603 and the similarity score of the cell following cell 3604 show a distinct change in the similarity scores. The similarity scores of the cell preceding cell 3603 and the similarity score of the cell following cell 3604 are significantly higher than the similarity scores of the cells 3603 and 3604. Furthermore, there are no substantial changes in the similarity scores of the cells between the cells 3603 and 3604. Therefore, the frames associated with the cell 3603 through and including cell 3604 form a single matching candidate clip 3602. The difference between the similarity scores associated with non-matching frames can be represented by the higher values 3606 and the lower values 3607 represent the matching claims which make up the candidate clip.

Figure 37:
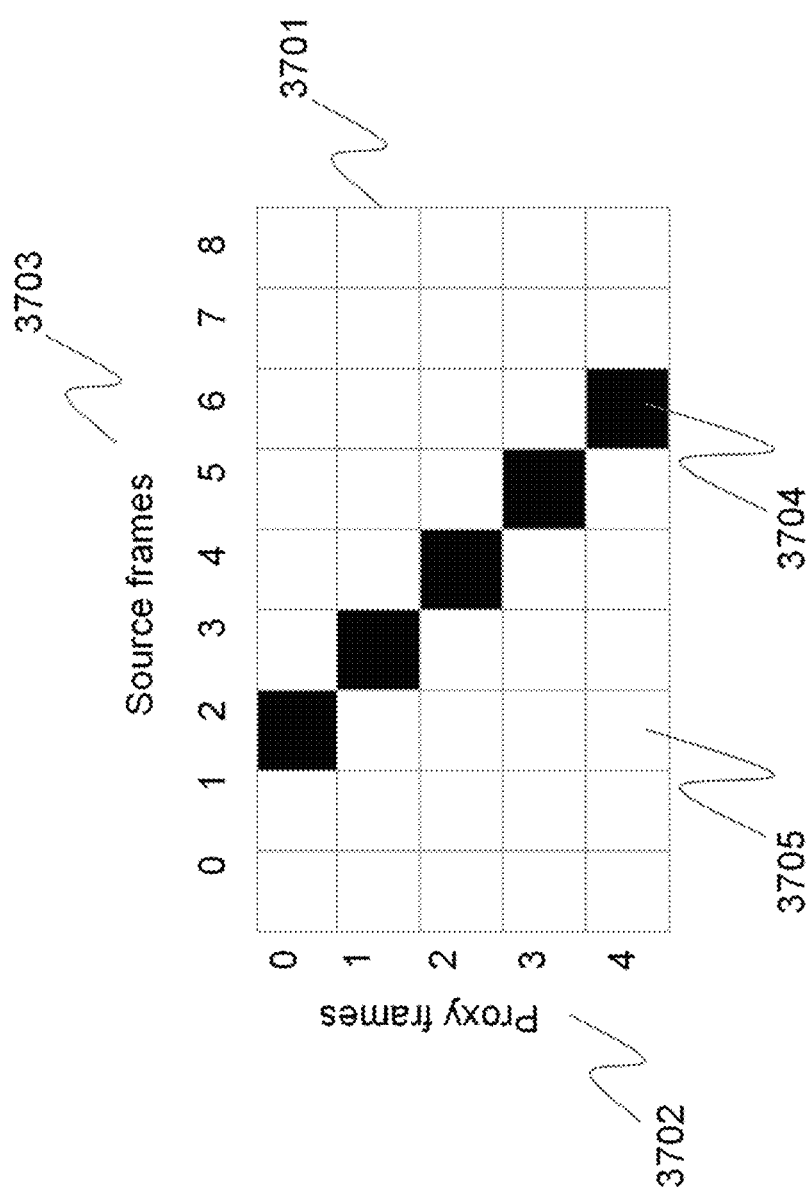
FIG. 37 shows an example matrix in which the matches for the proxy frames and the source frames have been shaded.
Figure 38:
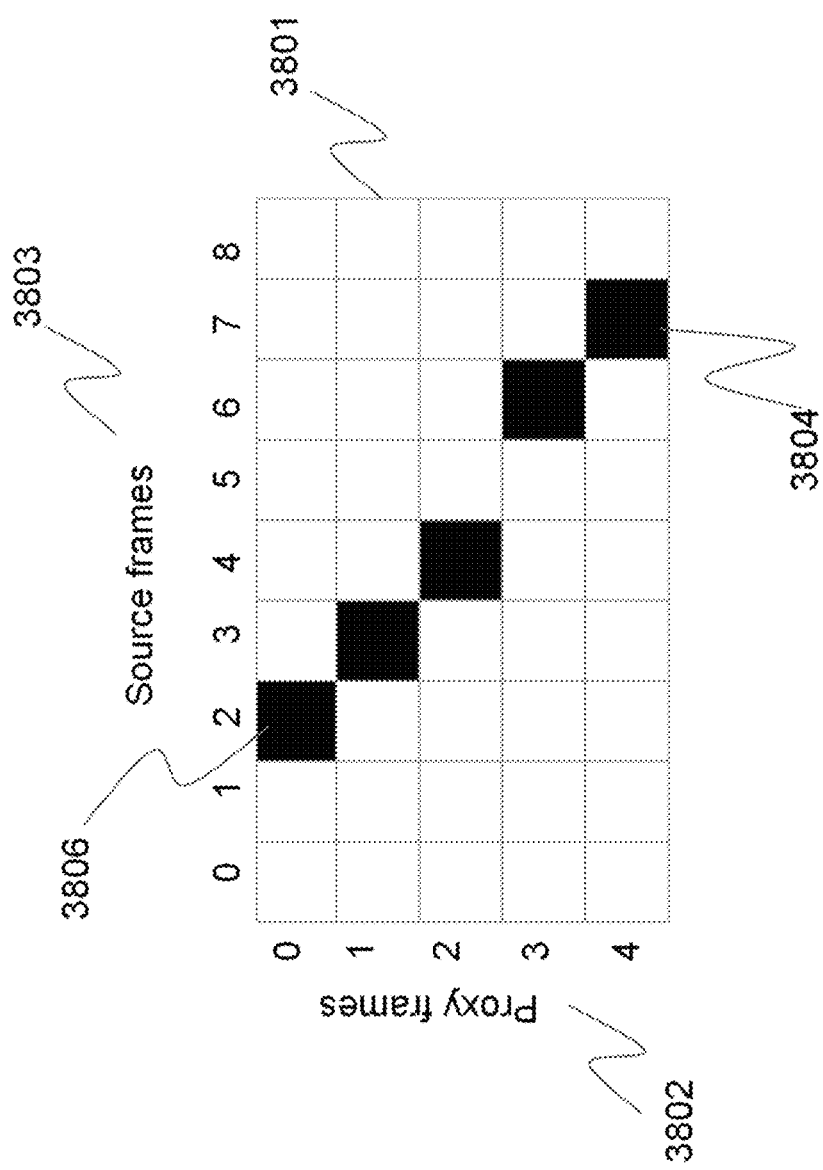
FIG. 38 shows another example matrix in which the matches for the proxy frames and the source frames have been shaded.
Figure 39:
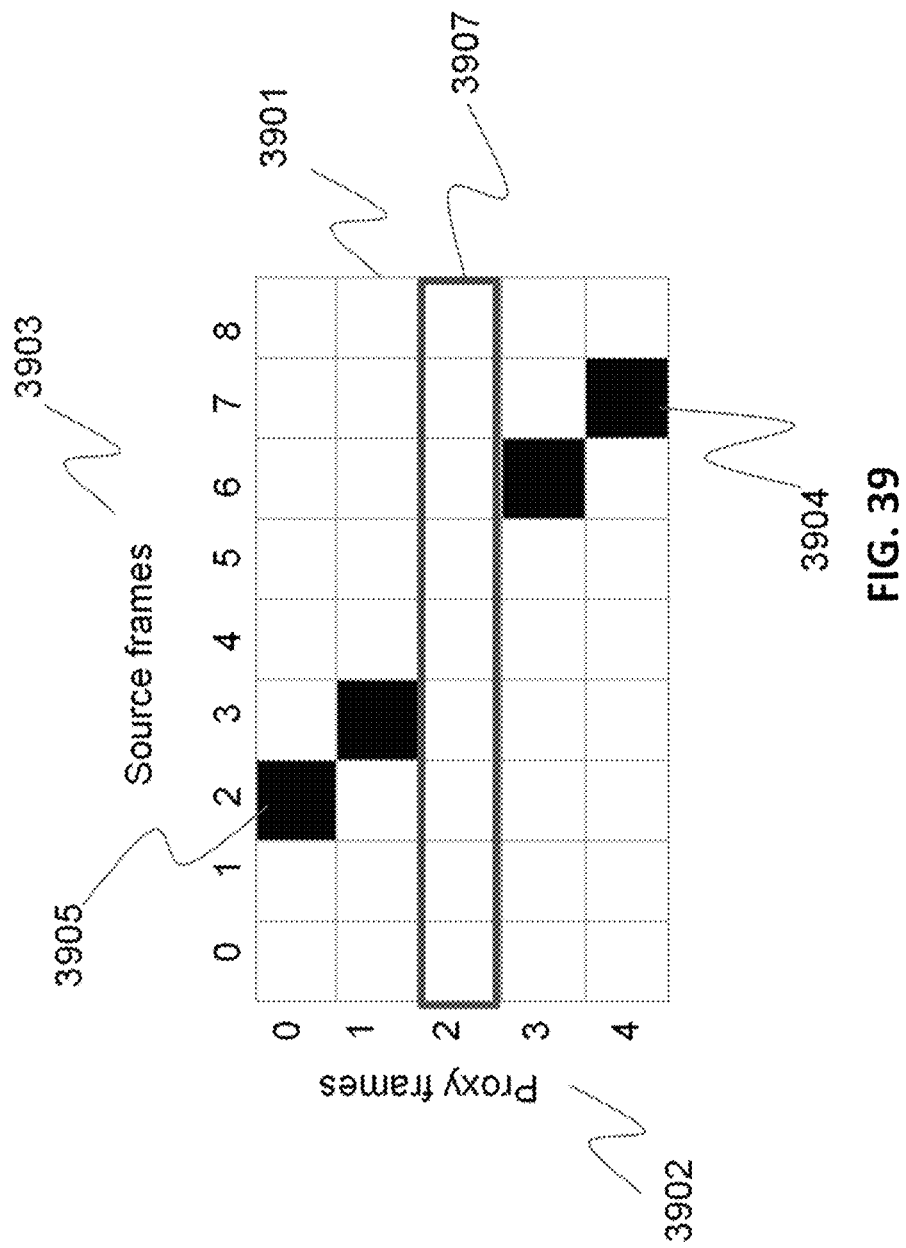
FIG. 39 shows another example matrix in which the matches for the proxy frames and the source frames have been shaded.

FIGS. 37-39 show examples in which the candidate clips are marked in a matrix of the same size as the score matrix. The frames identified by the process shown in FIG. 36 may be used to mark the cells corresponding to frames that make up a candidate clip in which source and proxy frames matched. In FIGS. 37-39, the frames that are shaded black are the frames for which a match between the proxy footage 120 and the source footage 117 were found.

FIG. 37 shows an example matrix 3701 in which the matches for the proxy frames 3702 and the source frames 3703 have been shaded. The matrix 3701 may be a sparse matrix in which the shaded cells include a value indicating a match between the respective proxy frame and source frame associated with that cell. The cell 3705 has been left unshaded because the matching unit 2902 determined that the proxy frame and the source frame pair [4, 2] were not a match. However, the cell 3704 has been shaded because the matching unit 2902 determined the proxy frame and the source frame pair [4, 6] were a match. In some implementations, the matching cells may be set with a 1-bit value indicating there is a match. The shading shown in FIG. 37 is merely intended to demonstrate the matching process described herein. The example matrices shown in FIGS. 37-39 may be utilized internally by the matching unit 2902 for performing the matching operations described herein, and the AFCM 100 may not present a representation of the matrices on a user interface of the AFCM 100.

In the example shown in FIG. 37, a single candidate clip that includes five frames has been identified by the matching operation, which includes the frames associated with cells [0, 2], [1, 3], [2, 4], [3, 5], and [4, 6]. The length of a matched clip may include a different number of frames. The specific number of frames matched in this example and the examples shown in FIGS. 38 and 39 demonstrate examples of the matching techniques provided herein and do not limit the matching techniques to these specific matches.

FIG. 38 shows an example matrix 3801 in which the matches for the proxy frames 3802 and the source frames 3803 have been shaded. Two clips 3804 and 3806 have been identified in this example. The clip 3804 includes two frames and the clip 3806 includes three frames. As previously indicated, the length of the clips matched may vary and are not limited to these specific examples. For example, a clip may include 24 or more frames per second, and thus, the number of frames of a matched clip may be much longer than the examples shown in FIGS. 37-38, depending upon the frame rate of the footage that is being analyzed for a match.

FIG. 39 shows an example matrix 3901 in which the matches for the proxy frames 3902 and the source frames 3903 have been shaded. Two clips 3904 and 3905 have been identified in this example. The example shown in FIG. 39 includes a row 3907 for where there was no match found for the proxy frame 2. The proxy frame 2 may be identified by the matching unit 2902 and included in the match list and reports 2907.

The detailed examples of systems, devices, and techniques described in connection with FIGS. 1-39 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-39 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 40:
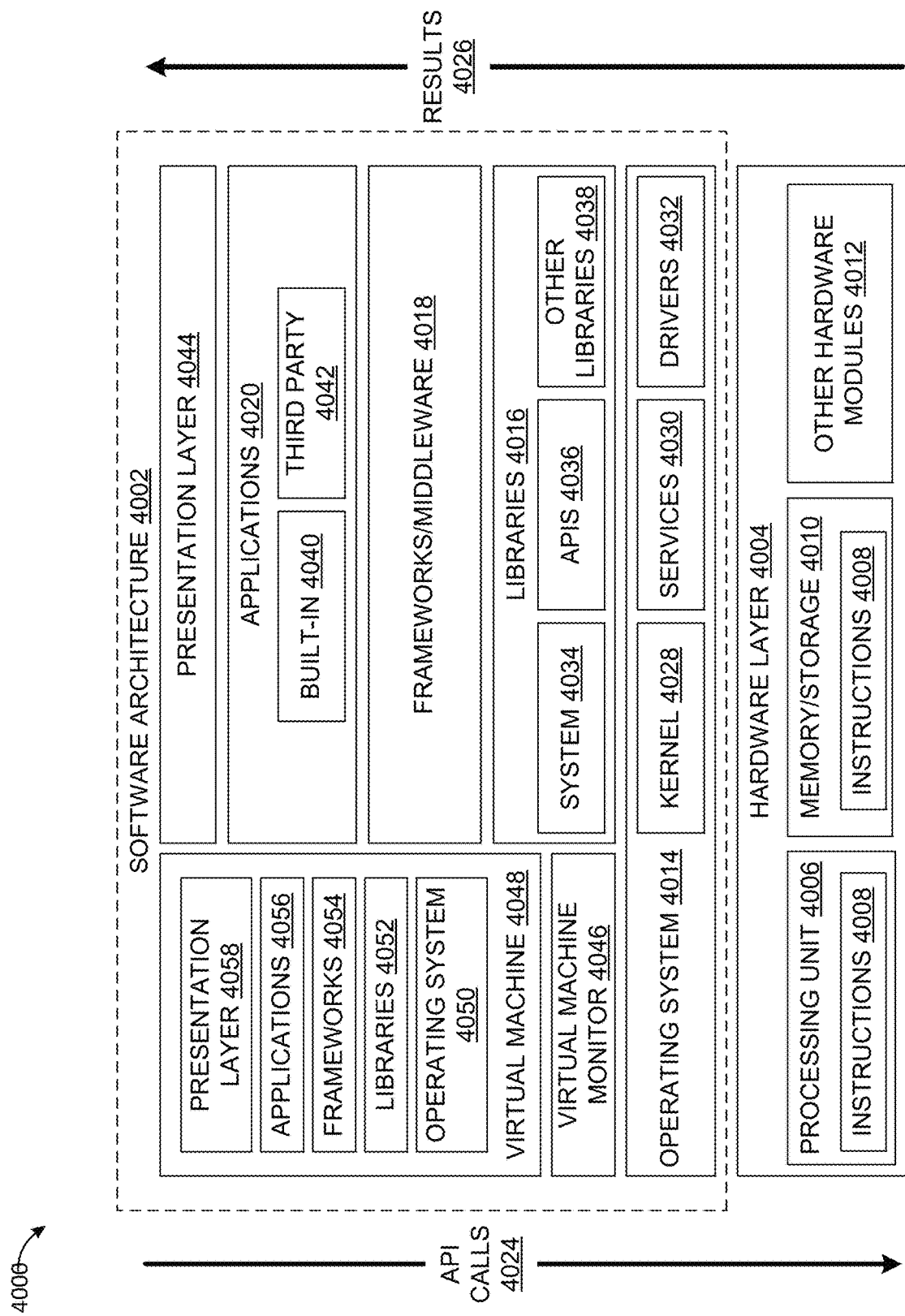
FIG. 40 is a block diagram showing an example software architecture, various portions of which may be used in conjunction with various hardware architectures herein described, which may implement any of the described features.

FIG. 40 is a block diagram 4000 illustrating an example software architecture 4002, various portions of which may be used in conjunction with various hardware architectures herein described, which may implement any of the above-described features. FIG. 40 is a non-limiting example of a software architecture, and it will be appreciated that many other architectures may be implemented to facilitate the functionality described herein. The software architecture 4002 may execute on hardware such as a machine 4100 of FIG. 41 that includes, among other things, processors 4110, memory 4130, and input/output (I/O) components 4150. A representative hardware layer 4004 is illustrated and can represent, for example, the machine 4100 of FIG. 41. The representative hardware layer 4004 includes a processing unit 4006 and associated executable instructions 4008. The executable instructions 4008 represent executable instructions of the software architecture 4002, including implementation of the methods, modules and so forth described herein. The hardware layer 4004 also includes a memory/storage 4010, which also includes the executable instructions 4008 and accompanying data. The hardware layer 4004 may also include other hardware modules 4012. Instructions 4008 held by processing unit 4006 may be portions of instructions 4008 held by the memory/storage 4010.

The example software architecture 4002 may be conceptualized as layers, each providing various functionality. For example, the software architecture 4002 may include layers and components such as an operating system (OS) 4014, libraries 4016, frameworks 4018, applications 4020, and a presentation layer 4044. Operationally, the applications 4020 and/or other components within the layers may invoke API calls 4024 to other layers and receive corresponding results 4026. The layers illustrated are representative in nature and other software architectures may include additional or different layers. For example, some mobile or special purpose operating systems may not provide the frameworks/middleware 4018.

The OS 4014 may manage hardware resources and provide common services. The OS 4014 may include, for example, a kernel 4028, services 4030, and drivers 4032. The kernel 4028 may act as an abstraction layer between the hardware layer 4004 and other software layers. For example, the kernel 4028 may be responsible for memory management, processor management (for example, scheduling), component management, networking, security settings, and so on. The services 4030 may provide other common services for the other software layers. The drivers 4032 may be responsible for controlling or interfacing with the underlying hardware layer 4004. For instance, the drivers 4032 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 4016 may provide a common infrastructure that may be used by the applications 4020 and/or other components and/or layers. The libraries 4016 typically provide functionality for use by other software modules to perform tasks, rather than rather than interacting directly with the OS 4014. The libraries 4016 may include system libraries 4034 (for example, C standard library) that may provide functions such as memory allocation, string manipulation, file operations. In addition, the libraries 4016 may include API libraries 4036 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 4016 may also include a wide variety of other libraries 4038 to provide many functions for applications 4020 and other software modules.

The frameworks 4018 (also sometimes referred to as middleware) provide a higher-level common infrastructure that may be used by the applications 4020 and/or other software modules. For example, the frameworks 4018 may provide various graphic user interface (GUI) functions, high-level resource management, or high-level location services. The frameworks 4018 may provide a broad spectrum of other APIs for applications 4020 and/or other software modules.

The applications 4020 include built-in applications 4040 and/or third-party applications 4042. Examples of built-in applications 4040 may include, but are not limited to, a contacts application, a browser application, a location application, a media application, a messaging application, and/or a game application. Third-party applications 4042 may include any applications developed by an entity other than the vendor of the particular platform. The applications 4020 may use functions available via OS 4014, libraries 4016, frameworks 4018, and presentation layer 4044 to create user interfaces to interact with users.

Some software architectures use virtual machines, as illustrated by a virtual machine 4048. The virtual machine 4048 provides an execution environment where applications/modules can execute as if they were executing on a hardware machine (such as the machine 4100 of FIG. 41, for example). The virtual machine 4048 may be hosted by a host OS (for example, OS 4014) or hypervisor, and may have a virtual machine monitor 4046 which manages operation of the virtual machine 4048 and interoperation with the host operating system. A software architecture, which may be different from software architecture 4002 outside of the virtual machine, executes within the virtual machine 4048 such as an OS 4050, libraries 4052, frameworks 4054, applications 4056, and/or a presentation layer 4058.

Figure 41:
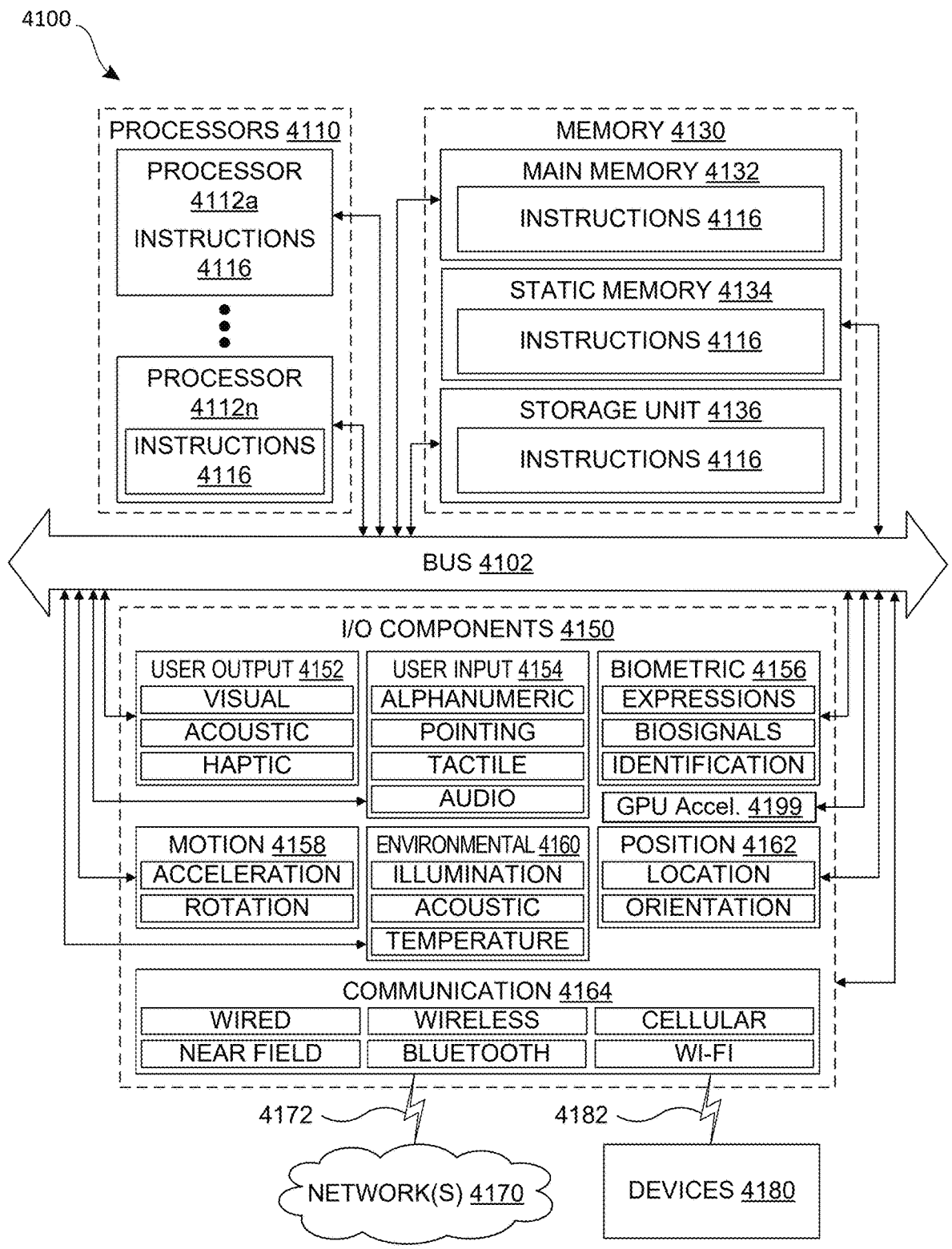
FIG. 41 is a block diagram showing components of an example machine configured to read instructions from a machine-readable medium and perform any of the features described herein.

FIG. 41 is a block diagram illustrating components of an example machine 4100 configured to read instructions from a machine-readable medium (for example, a machine-readable medium) and perform any of the features described herein. The example machine 4100 is in a form of a computer system, within which instructions 4116 (for example, in the form of software components) for causing the machine 4100 to perform any of the features described herein may be executed. As such, the instructions 4116 may be used to implement modules or components described herein. The instructions 4116 cause unprogrammed and/or unconfigured machine 4100 to operate as a particular machine configured to carry out the described features. The machine 4100 may be configured to operate as a standalone device or may be coupled (for example, networked) to other machines. In a networked deployment, the machine 4100 may operate in the capacity of a server machine or a client machine in a server-client network environment, or as a node in a peer-to-peer or distributed network environment. Machine 4100 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 4100 is illustrated, the term "machine" includes a collection of machines that individually or jointly execute the instructions 4116.

The machine 4100 may include processors 4110, memory 4130, and I/O components 4150, which may be communicatively coupled via, for example, a bus 4102. The bus 4102 may include multiple buses coupling various elements of machine 4100 via various bus technologies and protocols. In an example, the processors 4110 (including, for example, a central processing unit (CPU), a graphics processing unit (GPU), a digital signal processor (DSP), an ASIC, or a suitable combination thereof) may include one or more processors 4112a to 4112n that may execute the instructions 4116 and process data. In some examples, one or more processors 4110 may execute instructions provided or identified by one or more other processors 4110. The term "processor" includes a multi-core processor including cores that may execute instructions contemporaneously. Although FIG. 41 shows multiple processors, the machine 4100 may include a single processor with a single core, a single processor with multiple cores (for example, a multi-core processor), multiple processors each with a single core, multiple processors each with multiple cores, or any combination thereof. In some examples, the machine 4100 may include multiple processors distributed among multiple machines.

The memory/storage 4130 may include a main memory 4132, a static memory 4134, or other memory, and a storage unit 4136, both accessible to the processors 4110 such as via the bus 4102. The storage unit 4136 and memory 4132, 4134 store instructions 4116 embodying any one or more of the functions described herein. The memory/storage 4130 may also store temporary, intermediate, and/or long-term data for processors 4110. The instructions 4116 may also reside, completely or partially, within the memory 4132, 4134, within the storage unit 4136, within at least one of the processors 4110 (for example, within a command buffer or cache memory), within memory at least one of I/O components 4150, or any suitable combination thereof, during execution thereof. Accordingly, the memory 4132, 4134, the storage unit 4136, memory in processors 4110, and memory in I/O components 4150 are examples of machine-readable media.

As used herein, "machine-readable medium" refers to a device able to temporarily or permanently store instructions and data that cause machine 4100 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 4116) for execution by a machine 4100 such that the instructions, when executed by one or more processors 4110 of the machine 4100, cause the machine 4100 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 4150 may include a wide variety of hardware components adapted to receive input, provide output, produce output, transmit information, exchange information, capture measurements, and so on. The specific I/O components 4150 included in a particular machine will depend on the type and/or function of the machine. For example, mobile devices such as mobile phones may include a touch input device, whereas a headless server or IoT device may not include such a touch input device. The particular examples of I/O components illustrated in FIG. 41 are in no way limiting, and other types of components may be included in machine 4100. The grouping of I/O components 4150 are merely for simplifying this discussion, and the grouping is in no way limiting. In various examples, the I/O components 4150 may include user output components 4152 and user input components 4154. User output components 4152 may include, for example, display components for displaying information (for example, a liquid crystal display (LCD) or a projector), acoustic components (for example, speakers), haptic components (for example, a vibratory motor or force-feedback device), and/or other signal generators. User input components 4154 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 4150 may include biometric components 4156, motion components 4158, environmental components 4160, and/or position components 4162, among a wide array of other physical sensor components. The biometric components 4156 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 4158 may include, for example, acceleration sensors (for example, an accelerometer) and rotation sensors (for example, a gyroscope). The environmental components 4160 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 4162 may include, for example, location sensors (for example, a Global Position System (GPS) receiver), altitude sensors (for example, an air pressure sensor from which altitude may be derived), and/or orientation sensors (for example, magnetometers).

The I/O components 4150 may include communication components 4164, implementing a wide variety of technologies operable to couple the machine 4100 to network(s) 4170 and/or device(s) 4180 via respective communicative couplings 4172 and 4182. The communication components 4164 may include one or more network interface components or other suitable devices to interface with the network(s) 4170. The communication components 4164 may include, for example, components adapted to provide wired communication, wireless communication, cellular communication, Near Field Communication (NFC), Bluetooth communication, Wi-Fi, and/or communication via other modalities. The device(s) 4180 may include other machines or various peripheral devices (for example, coupled via USB). GPU-accelerated computing 4199 may also be provided to facilitate processing-intensive operations, such as but not limited to image analysis, deep learning and/or other machine learning techniques, and/or other computationally intensive tasks.

In some examples, the communication components 4164 may detect identifiers or include components adapted to detect identifiers. For example, the communication components 4164 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 4162, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
a processor; and
a machine-readable medium storing executable instructions that, when executed, cause the processor to perform operations comprising:
  obtaining first video footage that includes a plurality of first video frames of a first video clip;
  obtaining second video footage that includes a plurality of second video frames;
  analyzing the first video footage to generate a plurality of first fingerprints representing each frame of the plurality of first video frames, wherein each fingerprint of the plurality of first fingerprints is generated based on a respective video frame of the plurality of first video frames, each fingerprint comprising a first coarse-grain fingerprint element and a first fine-grain fingerprint element, the first coarse-grain fingerprint element being generated from a reduced-sized version of the respective video frame that is smaller than a version of the respective video frame used to generate the first fine-grain fingerprint element, wherein generating the plurality of first fingerprints includes:
    generating the first coarse-grain fingerprint element based on a frame of the first video footage by:
      resizing the frame of the first video footage to a first standard image size to generate a first resized frame;
      subdividing the first resized frame into a plurality of cells; and
      analyzing each of the plurality of cells using a folding locality-sensitive hashing (LSH) algorithm to generate a plurality of hash values comprising a hash value for each cell of the plurality of cells; and
    generating the first fine-grain fingerprint element based on a frame of the first video footage by:
      generating a first vector by reducing a dimensionality of a first vector representation of the frame;
      generating a second vector orthogonal to a vector of ones by subtracting a component of the first vector in a direction of the vector of ones from the component of the first vector; and
      converting the second vector into a bit string representing values of elements of the second vector;
  analyzing the second video footage to generate a plurality of second fingerprints representing each frame of the plurality of second video frames, wherein each fingerprint of the plurality of second fingerprints is generated based on a respective video frame of the plurality of second video frames, each fingerprint comprising a second coarse-grain fingerprint element and a second fine-grain fingerprint element, the second coarse-grain fingerprint element being generated from a reduced-sized version of the respective video frame that is smaller than the version of the respective video frame used to generate the second fine-grain fingerprint element;
  comparing the plurality of first fingerprints to the plurality of second fingerprints to generate similarity scores representing how similar each of the plurality of first video frames are to the plurality of second video frames;
  identifying one or more candidate clip matches for the first video clip based on the similarity scores;
  selecting a best match for the first video clip in the second video footage from the one or more candidate clip matches for the first video clip; and
  presenting the best match for the first video clip on a user interface of the data processing system.

2. The data processing system of claim 1, wherein to compare the plurality of first fingerprints to the plurality of second fingerprints to generate the similarity scores, the machine-readable medium includes further executable instructions that, when executed by the processor, cause the data processing system to perform operations comprising:
  generating a score matrix comparing each respective fingerprint of the plurality of first fingerprints with each respective fingerprint of the plurality of second fingerprints, each cell of the score matrix comprising a similarity score representing a similarity of a respective fingerprint of the plurality of first fingerprints and a respective fingerprint of the plurality of second fingerprints.

3. The data processing system of claim 2, wherein the score matrix comprises a sparse matrix, and wherein the machine-readable medium includes further executable instructions that, when executed by the processor, cause the data processing system to perform operations comprising:
  applying a filter to the respective fingerprint of the plurality of first fingerprints and the respective fingerprint of the plurality of second fingerprints associated with each cell of the score matrix to determine whether a similarity threshold is exceeded;
  determining a respective similarity score for each cell of the score matrix for which the similarity threshold is exceeded; and
  storing the respective similarity score in each cell for which the similarity score was determined.

4. The data processing system of claim 2, wherein the machine-readable medium includes further executable instructions that, when executed by the processor, cause the data processing system to perform operations comprising:
  generating a pseudo-probability matrix based on the score matrix, the pseudo-probability matrix including a probability that the respective fingerprint of the plurality of first fingerprints associated with a respective cell of the pseudo-probability matrix is a match for the respective fingerprint of the plurality of second fingerprints.

5. The data processing system of claim 4, wherein the machine-readable medium includes further executable instructions that, when executed by the processor, cause the data processing system to perform operations comprising:
  for each respective frame of the plurality of first video frames, selecting a respective frame of the plurality of second video frames having a highest probability that the respective frame of the plurality of second video frames is a match for the respective frame of the plurality of first video frames.

6. The data processing system of claim 5, wherein the machine-readable medium includes further executable instructions that, when executed by the processor, cause the data processing system to perform operations comprising:
  identifying the one or more candidate clip matches by analyzing the similarity scores of cells along a diagonal of the score matrix in which the respective frame having the highest probability of matching each respective frame of the plurality of first video frames resides.

7. The data processing system of claim 6, wherein, to select the best match for the first video clip in the second video footage from the one or more candidate clip matches for the first video clip, the machine-readable medium includes further executable instructions that, when executed by the processor, cause the data processing system to perform operations comprising:
calculating a matching score for each clip of the one or more candidate clip matches based on the similarity scores of video frames comprising each clip of the one or more candidate clip matches; and
selecting the best match from the one or more candidate clip matches, the best match having a matching score indicative of the best match being a better match for the first video clip than other candidate clips of the one or more candidate clip matches.

8. The data processing system of claim 4, wherein to compare the plurality of first fingerprints to the plurality of second fingerprints to generate similarity scores the machine-readable medium includes further executable instructions that, when executed by the processor, cause the data processing system to perform operations comprising:
generating a normalized pseudo-probability matrix based on the pseudo-probability matrix by modifying values of columns of the pseudo-probability matrix so that a total of the values of each column equals one hundred percent.

9. The data processing system of claim 8, wherein the machine-readable medium includes further executable instructions that, when executed by the processor, cause the data processing system to perform operations comprising:
averaging values of each cell of the normalized pseudo-probability matrix with a corresponding cell of the pseudo-probability matrix to determine an overall probability score for each cell of the pseudo-probability matrix.

10. The data processing system of claim 8, wherein the machine-readable medium includes further executable instructions that, when executed by the processor, cause the data processing system to perform operations comprising:
determining a weighted average values of each cell of the normalized pseudo-probability matrix with a corresponding cell of the pseudo-probability matrix to determine an overall probability score for each cell of the pseudo-probability matrix.

11. A method in a data processing system for matching video content, the method comprising:
obtaining first video footage that includes a plurality of first video frames of a first video clip;
obtaining second video footage that includes a plurality of second video frames;
analyzing the first video footage to generate a plurality of first fingerprints representing each frame of the plurality of first video frames, wherein each fingerprint of the plurality of first fingerprints is generated based on a respective video frame of the plurality of first video frames, each fingerprint comprising a first coarse-grain fingerprint element and a first fine-grain fingerprint element, the first coarse-grain fingerprint element being generated from a reduced-sized version of the respective video frame that is smaller than a version of the respective video frame used to generate the first fine-grain fingerprint element, wherein generating the plurality of first fingerprints includes:
generating the first coarse-grain fingerprint element based on a frame of the first video footage by:
resizing the frame of the first video footage to a first standard image size to generate a first resized frame;
subdividing the first resized frame into a plurality of cells; and
analyzing each of the plurality of cells using a folding locality-sensitive hashing (LSH) algorithm to generate a plurality of hash values comprising a hash value for each cell of the plurality of cells; and
generating the first fine-grain fingerprint element based on a frame of the first video footage by:
generating a first vector by reducing a dimensionality of a first vector representation of the frame;
generating a second vector orthogonal to a vector of ones by subtracting a component of the first vector in a direction of the vector of ones from the component of the first vector; and
converting the second vector into a bit string representing values of elements of the second vector;
analyzing the second video footage to generate a plurality of second fingerprints representing each frame of the plurality of second video frames, wherein each fingerprint of the plurality of second fingerprints is generated based on a respective video frame of the plurality of second video frames, each fingerprint comprising a second coarse-grain fingerprint element and a second fine-grain fingerprint element, the second coarse-grain fingerprint element being generated from a reduced-sized version of the respective video frame that is smaller than the version of the respective video frame used to generate the second fine-grain fingerprint element;
comparing the plurality of first fingerprints to the plurality of second fingerprints to generate similarity scores representing how similar each of the plurality of first video frames are to the plurality of second video frames;
identifying one or more candidate clip matches for the first video clip based on the similarity scores;
selecting a best match for the first video clip in the second video footage from the one or more candidate clip matches for the first video clip; and
presenting the best match for the first video clip on a user interface of the data processing system.

12. The method of claim 11, wherein comparing the plurality of first fingerprints to the plurality of second fingerprints to generate the similarity scores further comprises:
generating a score matrix comparing each respective fingerprint of the plurality of first fingerprints with each respective fingerprint of the plurality of second fingerprints, each cell of the score matrix comprising a similarity score representing a similarity of a respective fingerprint of the plurality of first fingerprints and a respective fingerprint of the plurality of second fingerprints;
applying a filter to the respective fingerprint of the plurality of first fingerprints and the respective fingerprint of the plurality of second fingerprints associated with each cell of the score matrix to determine whether a similarity threshold is exceeded;
determining a respective similarity score for each cell of the score matrix for which the similarity threshold is exceeded; and
storing the respective similarity score in each cell for which the similarity score was determined.

13. The method of claim 12, further comprising:
for each respective frame of the plurality of first video frames, selecting a respective frame of the plurality of second video frames having a highest probability that the respective frame of the plurality of second video frames is a match for the respective frame of the plurality of first video frames.

14. The method of claim 13, further comprising:
identifying the one or more candidate clip matches by analyzing the similarity scores of cells along a diagonal of the score matrix in which the respective frame having the highest probability of matching each respective frame of the plurality of first video frames resides.

15. The method of claim 14, wherein selecting the best match for the first video clip in the second video footage from the one or more candidate clips matches for the first video clip further comprises:
calculating a matching score for each clip of the one or more candidate clip matches based on the similarity scores of video frames comprising each clip of the one or more candidate clip matches; and
selecting the best match from the one or more candidate clip matches, the best match having a matching score indicative of the best match being a better match for the first video clip than other candidate clips of the one or more candidate clip matches.

16. A machine-readable medium on which are stored instructions that, when executed, cause a processor of a programmable device to perform operations of:
obtaining first video footage that includes a plurality of first video frames of a first video clip;
obtaining second video footage that includes a plurality of second video frames;
analyzing the first video footage to generate a plurality of first fingerprints representing each frame of the plurality of first video frames, wherein each fingerprint of the plurality of first fingerprints is generated based on a respective video frame of the plurality of first video frames, each fingerprint comprising a first coarse-grain fingerprint element and a first fine-grain fingerprint element, the first coarse-grain fingerprint element being generated from a reduced-sized version of the respective video frame that is smaller than a version of the respective video frame used to generate the first fine-grain fingerprint element, wherein generating the plurality of first fingerprints includes:
generating the first coarse-grain fingerprint element based on a frame of the first video footage by:
resizing the frame of the first video footage to a first standard image size to generate a first resized frame;
subdividing the first resized frame into a plurality of cells; and
analyzing each of the plurality of cells using a folding locality-sensitive hashing (LSH) algorithm to generate a plurality of hash values comprising a hash value for each cell of the plurality of cells; and
generating the first fine-grain fingerprint element based on a frame of the first video footage by:
generating a first vector by reducing a dimensionality of a first vector representation of the frame;
generating a second vector orthogonal to a vector of ones by subtracting a component of the first vector in a direction of the vector of ones from the component of the first vector; and
converting the second vector into a bit string representing values of elements of the second vector;
analyzing the second video footage to generate a plurality of second fingerprints representing each frame of the plurality of second video frames, wherein each fingerprint of the plurality of second fingerprints is generated based on a respective video frame of the plurality of second video frames, each fingerprint comprising a second coarse-grain fingerprint element and a second fine-grain fingerprint element, the second coarse-grain fingerprint element being generated from a reduced-sized version of the respective video frame that is smaller than the version of the respective video frame used to generate the second fine-grain fingerprint element;
comparing the plurality of first fingerprints to the plurality of second fingerprints to generate similarity scores representing how similar each of the plurality of first video frames are to the plurality of second video frames;
identifying one or more candidate clip matches for the first video clip based on the similarity scores;
selecting a best match for the first video clip in the second video footage from the one or more candidate clip matches for the first video clip; and
presenting the best match for the first video clip on a user interface of the programmable device.

17. The machine-readable medium of claim 16, wherein, to compare the plurality of first fingerprints to the plurality of second fingerprints generate the similarity scores, the machine-readable medium includes further executable instructions that, when executed by the processor, cause the programmable device to perform operations comprising:
generating a score matrix comparing each respective fingerprint of the plurality of first fingerprints with each respective fingerprint of the plurality of second fingerprints, each cell of the score matrix comprising a similarity score representing a similarity of a respective fingerprint of the plurality of first fingerprints and a respective fingerprint of the plurality of second fingerprints;
applying a filter to the respective fingerprint of the plurality of first fingerprints and the respective fingerprint of the plurality of second fingerprints associated with each cell of the score matrix to determine whether a similarity threshold is exceeded;
determining a respective similarity score for each cell of the score matrix for which the similarity threshold is exceeded; and
storing the respective similarity score in each cell for which the similarity score was determined.

18. The machine-readable medium of claim 17, wherein the machine-readable medium includes further executable instructions that, when executed by the processor, cause the programmable device to perform operations comprising:
for each respective frame of the plurality of first video frames, selecting a respective frame of the plurality of second video frames having a highest probability that the respective frame of the plurality of second video frames is a match for the respective frame of the plurality of first video frames;
identifying the one or more candidate clip matches by analyzing the similarity scores of cells along a diagonal of the score matrix in which the respective frame having the highest probability of matching each respective frame of the plurality of first video frames resides;
calculating a matching score for each clip of the one or more candidate clip matches based on the similarity scores of video frames comprising each clip of the one or more candidate clip matches; and selecting the best match from the one or more candidate clip matches, the best match having a matching score indicative of the best match being a better match for the first video clip than other candidate clips of the one or more candidate clip matches.

* * * * *